US012512055B2

(12) United States Patent
Wang et al.

(10) Patent No.: US 12,512,055 B2
(45) Date of Patent: Dec. 30, 2025

(54) PIXEL DRIVING CIRCUIT, DISPLAY APPARATUS, AND METHOD OF DRIVING DISPLAY APPARATUS

(71) Applicant: BOE Technology Group Co., Ltd., Beijing (CN)

(72) Inventors: Zhichong Wang, Beijing (CN); Dacheng Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 1 day.

(21) Appl. No.: 18/690,039

(22) PCT Filed: Apr. 11, 2023

(86) PCT No.: PCT/CN2023/087591
§ 371 (c)(1),
(2) Date: Mar. 7, 2024

(87) PCT Pub. No.: WO2024/212106
PCT Pub. Date: Oct. 17, 2024

(65) Prior Publication Data
US 2025/0225931 A1 Jul. 10, 2025

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2300/0861; G09G 2310/08; G09G 2320/0233
See application file for complete search history.

(56) References Cited

U.S. PATENT DOCUMENTS

2010/0177024 A1* 7/2010 Choi .................... G09G 3/3233 345/76
2019/0049766 A1* 2/2019 Xing ..................... G02F 1/1368
(Continued)

FOREIGN PATENT DOCUMENTS

CN 104036726 A 9/2014
CN 105405402 A 3/2016
(Continued)

OTHER PUBLICATIONS

International Search Report & Written Opinion mailed Nov. 28, 2023, regarding PCT/CN2023/087591.

*Primary Examiner* — Chanh D Nguyen
*Assistant Examiner* — Gloryvid Figueroa-Gibson
(74) *Attorney, Agent, or Firm* — Intellectual Valley Law. P.C.

(57) ABSTRACT

A pixel driving circuit is provided. The pixel driving circuit includes a first circuit, a second circuit, and one or more third circuits. The first circuit is configured to compensate for a variation in a threshold voltage in a driving transistor in the one or more third circuits. The first circuit is coupled to a first control signal line, a second control signal line, a first light emitting control signal line, and a second light emitting control signal line. The second circuit is coupled to the first light emitting control signal line and the second light emitting control signal line. The first light emitting control signal line and the second light emitting control signal line are configured to transmit light emitting control signals having reversed phases.

20 Claims, 32 Drawing Sheets

(52) U.S. Cl.
CPC . *G09G 2300/0861* (2013.01); *G09G 2310/08* (2013.01); *G09G 2320/0233* (2013.01)

(56) References Cited

U.S. PATENT DOCUMENTS

| | | | | |
|---|---|---|---|---|
| 2021/0335233 | A1* | 10/2021 | Chen | G09G 3/2025 |
| 2021/0359054 | A1* | 11/2021 | Gao | H10K 59/126 |
| 2021/0376026 | A1* | 12/2021 | Mou | G09G 3/2003 |

FOREIGN PATENT DOCUMENTS

| | | | | | |
|---|---|---|---|---|---|
| CN | 108806612 | A | | 11/2018 | |
| CN | 113257176 | A | | 8/2021 | |
| CN | 113707087 | A | * | 11/2021 | G09G 3/3208 |
| KR | 20160108668 | A | | 9/2016 | |
| KR | 20200043637 | A | | 4/2020 | |
| WO | 2022249869 | A1 | | 12/2022 | |

* cited by examiner

PIXEL DRIVING CIRCUIT, DISPLAY APPARATUS, AND METHOD OF DRIVING DISPLAY APPARATUS

CROSS-REFERENCE TO RELATED APPLICATION

This application is a national stage application under 35 U.S.C. § 371 of International Application No. PCT/CN2023/087591, filed Apr. 11, 2023, the contents of which are incorporated by reference in the entirety.

TECHNICAL FIELD

The present invention relates to display technology, more particularly, to a pixel driving circuit, a display apparatus, and a method of driving a display apparatus.

BACKGROUND

Organic light emitting diode display technology has been developed in many applications. Organic light emitting diode display has an issue of non-uniformity in emitted light from individual diode and needs certain compensation to ensure display quality. Many internal and external compensation methods have been developed to enhance display quality of organic light emitting diode display panels.

SUMMARY

In one aspect, the present disclosure provides a pixel driving circuit, comprising a first circuit, a second circuit, and one or more third circuits; wherein the first circuit is configured to compensate for a variation in a threshold voltage in a driving transistor in the one or more third circuits; wherein the first circuit is coupled to a first control signal line, a second control signal line, a first light emitting control signal line, and a second light emitting control signal line; the second circuit is coupled to the first light emitting control signal line and the second light emitting control signal line; and the first light emitting control signal line and the second light emitting control signal line are configured to transmit light emitting control signals having reversed phases.

Optionally, the one or more third circuits are capable of being operated in a compensation mode or a non-compensation mode; in the compensation mode, the one or more third circuits are configured to drive a light emitting element to emit light with the variation in the threshold voltage in the driving transistor in the one or more third circuits being compensated; in the non-compensation mode, the one or more third circuits are configured to drive the light emitting element to emit light without the variation in the threshold voltage in the driving transistor in the one or more third circuits being compensated.

Optionally, the one or more third circuits are capable of being operated in a compensation mode or a non-compensation mode; in the compensation mode, the second control signal line and the second light emitting control signal line are configured to transmit light emitting control signals having reversed phases; and in the non-compensation mode, the second control signal line and the second light emitting control signal line are configured to transmit light emitting control signals having a same phase.

Optionally, the first circuit comprises a first transistor, a second transistor, a third transistor, a fourth transistor, and a fifth transistor; wherein the first transistor comprises a gate electrode coupled to the second light emitting control signal line, a first electrode coupled to a reference signal line, and a second electrode coupled to a second electrode of the third transistor; the second transistor comprises a gate electrode coupled to a second electrode of the fourth transistor and a first electrode of the fifth transistor, a first electrode configured to receive a second voltage signal from a second voltage supply line, and a second electrode coupled to a first electrode of the third transistor and a second electrode of the fifth transistor; the third transistor comprises a gate electrode coupled to the first light emitting control signal line, a first electrode coupled to the second electrode of the second transistor and a second electrode of the fifth transistor, and a second electrode coupled to the second electrode of the first transistor; the fourth transistor comprises a gate electrode coupled to a first control signal line, a first electrode coupled to a reset signal line, and a second electrode coupled to the gate electrode and the second electrode of the second transistor, and a first electrode of the fifth transistor; and the fifth transistor comprises a gate electrode coupled to the second control signal line, a first electrode coupled to the gate electrode of the second transistor and the second electrode of the fourth transistor, and a second electrode coupled to the first electrode of the third transistor and the second electrode of the second transistor.

Optionally, the first circuit further comprises a sixth transistor having agate electrode coupled to the first light emitting control signal line, a first electrode coupled to the second voltage supply line, and a second electrode coupled to the first electrode of the second transistor.

Optionally, the first circuit further comprises a seventh transistor having a gate electrode coupled to a reset control signal line, a first electrode coupled to a second reset signal line, and a second electrode coupled to the first electrode of the second transistor and the second electrode of the sixth transistor.

Optionally, the first circuit further comprises an eighth transistor having a gate electrode coupled to a third control signal line, a first electrode coupled to the second electrodes of the first transistor and the third transistor, and a second electrode coupled to a sense line.

Optionally, the first circuit further comprises a ninth transistor and a tenth transistor; a gate electrode of the ninth transistor is coupled to a third control signal line, a first electrode of the ninth transistor is coupled to the reference signal line, and a second electrode of the ninth transistor is coupled to the first electrode of the first transistor and a first electrode of the tenth transistor; a gate electrode of the tenth transistor is coupled to a fourth control signal line, a first electrode of the tenth transistor is coupled to the first electrode of the first transistor and the second electrode of the ninth transistor, and a second electrode of the tenth transistor is coupled to a sense line; and the sense line is coupled to an external compensation circuit configured to further compensate the variation in the threshold voltage in a driving transistor in the one or more third circuits.

Optionally, the first circuit further comprises a first capacitor having a first capacitor electrode coupled to the second voltage supply line, and a second capacitor electrode coupled to the second electrode of the first transistor and the second electrode of the third transistor.

Optionally, the first circuit further comprises a first capacitor having a first capacitor electrode coupled to the second electrode of the sixth transistor and the first electrode of the second transistor, and a second capacitor electrode coupled to the second electrode of the first transistor and the second electrode of the third transistor.

Optionally, the second control signal line is the same as the first light emitting control signal line; and the gate electrode of the fifth transistor is configured to receive a first light emitting control signal from the first light emitting control signal line.

Optionally, the first control signal line is the same as a first gate line configured to provide gate scanning signal to a row of third circuit; and the gate electrode of the fourth transistor is configured to receive a gate scanning signal from the first gate line.

Optionally, the second voltage supply line is the same as a first voltage supply line; and the first voltage supply line is configured to provide a first voltage supply signal to the second circuit and to the first electrode of the second transistor.

Optionally, the second circuit comprises a first light emitting control transistor and a second light emitting control transistor; wherein the first light emitting control transistor comprises a gate electrode coupled to the first light emitting control signal line, a first electrode coupled to a first voltage supply line, and a second electrode coupled to a second electrode of the second light emitting control transistor; and the second light emitting control transistor comprises a gate electrode coupled to the second light emitting control signal line, a first electrode coupled to a reset signal line, and a second electrode coupled to the second electrode of the first light emitting control transistor.

Optionally, a respective third circuit of the one or more third circuits comprises a driving transistor, a data write transistor, and a second capacitor; wherein the driving transistor comprises a gate electrode coupled to a second capacitor electrode of the second capacitor and a second electrode of the data write transistor, a first electrode coupled to a second electrode of a first light emitting control transistor and a second electrode of a second light emitting control transistor in the second circuit, and a second electrode coupled to an anode of a light emitting element; the data write transistor comprises a gate electrode coupled to a respective gate line of a plurality of gate lines, a first electrode coupled to a respective data line of a plurality of data lines, and a second electrode coupled to the gate electrode of the driving transistor and the second capacitor electrode of the second capacitor; and the second capacitor comprises a first capacitor electrode coupled to a second electrode of a first transistor and a second electrode of a third transistor in the first circuit.

Optionally, the one or more third circuits are arranged in an array having rows and columns; third circuits in a same column are coupled to a same data line; third circuits in a same row are coupled to a same gate line; second capacitors in third circuits in different rows have different capacitances; and capacitances of the second capacitors in third circuits decrease gradually row-by-row.

Optionally, the pixel driving circuit is configured to drive light emission in a plurality of subpixels, includes a first subpixel configured to emit a light of a first color, a second subpixel configured to emit a light of a second color, and a third subpixel configured to emit a light of a third color; driving transistors in third circuits in a pixel driving circuit configured to driving light emission in the first subpixel, the second subpixel, and the third subpixel have a same ratio of channel length to channel width; and $$\left|\frac{W2*Ld1}{L2*Wd1}-1\right|<0.05;$$

wherein W2 stands for a channel width of the second transistor, L2 stands for a channel length of the second transistor, Wd1 stands for a channel width of the driving transistor in the respective third circuit, Ld1 stands for a channel length of the driving transistor in the respective third circuit.

Optionally, pixel driving circuit is configured to drive light emission in first subpixels of a same color; driving transistors in third circuits in the pixel driving circuit configured to driving light emission in the first subpixels of a same color have a same ratio of channel length to channel width; and $$\left|\frac{W12*Ld11}{L12*Wd11}-1\right|<0.05;$$

wherein W12 stands for a channel width of the second transistor in the pixel driving circuit, L12 stands for a channel length of the second transistor in the pixel driving circuit, Wd11 stands for a channel width of the driving transistor in a respective third circuit in the pixel driving circuit, Ld11 stands for a channel length of the driving transistor in the respective third circuit in the pixel driving circuit.

In another aspect, the present disclosure provides a display apparatus, comprising the pixel driving circuit described herein, and a plurality of light emitting elements coupled to the pixel driving circuit.

In another aspect, the present disclosure provides a method of driving a display apparatus, wherein the display apparatus comprises a pixel driving circuit, and a plurality of light emitting elements coupled to the pixel driving circuit; wherein the pixel driving circuit comprises a first circuit, a second circuit, and one or more third circuits; wherein the first circuit is coupled to a first control signal line, a second control signal line, a first light emitting control signal line, and a second light emitting control signal line; and the second circuit is coupled to the first light emitting control signal line and the second light emitting control signal line; and wherein the method comprises providing a first light emitting control signal through the first light emitting control signal line to the first circuit and to the second circuit; and providing a second light emitting control signal through the second light emitting control signal line to the first circuit and to the second circuit; wherein the first light emitting control signal line and the second light emitting control signal line are configured to transmit light emitting control signals having reversed phases.

Optionally, the method further comprises operating the one or more third circuits in one of a compensation mode or a non-compensation mode; in the compensation mode, driving, by the one or more third circuits, a light emitting element to emit light with a variation in a threshold voltage in a driving transistor in the one or more third circuits being compensated; and in the non-compensation mode, driving, by the one or more third circuits, the light emitting element to emit light without the variation in the threshold voltage in the driving transistor in the one or more third circuits being compensated.

Optionally, the method further comprises operating the one or more third circuits in one of a compensation mode or a non-compensation mode; in the compensation mode, providing the second control signal line and the second light emitting control signal line with light emitting control signals having reversed phases, respectively; and in the non-compensation mode, providing the second control signal line and the second light emitting control signal line with light emitting control signals having a same phase.

Optionally, the first circuit comprises a first transistor, a second transistor, a third transistor, a fourth transistor, and a fifth transistor, wherein the first transistor comprises a gate electrode coupled to the second light emitting control signal line, a first electrode coupled to a reference signal line, and a second electrode coupled to a second electrode of the third transistor; the second transistor comprises a gate electrode coupled to a second electrode of the fourth transistor and a first electrode of the fifth transistor, a first electrode configured to receive a second voltage signal from a second voltage supply line, and a second electrode coupled to a first electrode of the third transistor and a second electrode of the fifth transistor; the third transistor comprises a gate electrode coupled to the first light emitting control signal line, a first electrode coupled to the second electrode of the second transistor and a second electrode of the fifth transistor, and a second electrode coupled to the second electrode of the first transistor; the fourth transistor comprises a gate electrode coupled to a first control signal line, a first electrode coupled to a reset signal line, and a second electrode coupled to the gate electrode and the second electrode of the second transistor M2, and a first electrode of the fifth transistor; and the fifth transistor comprises a gate electrode coupled to the second control signal line, a first electrode coupled to the gate electrode of the second transistor and the second electrode of the fourth transistor, and a second electrode coupled to the first electrode of the third transistor and the second electrode of the second transistor; wherein, in the compensation mode, the method comprises, in a first phase, providing a turning-on control signal through the first control signal line to the gate electrode of the fourth transistor, providing a turning-off control signal through the second control signal line to the gate electrode of the fifth transistor, providing a turning-off control signal through the first light emitting control signal line to the gate electrodes of the third transistor, providing a turning-on control signal through the second light emitting control signal line to the gate electrode of the first transistor; in a second phase, providing a turning-off control signal through the first control signal line to the gate electrode of the fourth transistor, providing a turning-on control signal through the second light emitting control signal line to the gate electrode of the first transistor; and in a light emission phase, providing a turning-off control signal through the second light emitting control signal line to the gate electrode of the first transistor, providing a turning-on control signal through the second control signal line to the gate electrode of the fifth transistor, providing a turning-on control signal through the first light emitting control signal line to the gate electrode of the third transistor.

Optionally, in a non-compensation mode, the method comprises providing a turning-on control signal by the first light emitting control signal line throughout a frame of image; providing a turning-off control signal by the second light emitting control signal line throughout the frame of image; and providing a turning-off control signal by the second control signal line throughout the frame of image.

Optionally, the second control signal line is the same as the first light emitting control signal line; and the method comprises providing a first light emitting control signal through the first light emitting control signal line to the gate electrode of the fifth transistor.

Optionally, the first control signal line is the same as a first gate line configured to provide gate scanning signal to a row of third circuit; and the method comprises providing a gate scanning signal through the first gate line to the gate electrode of the fourth transistor.

Optionally, the second voltage supply line is the same as a first voltage supply line; and the method comprises providing a first voltage supply signal through the first voltage supply line to the second circuit and to the first electrode of the second transistor.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Accordingly, the present disclosure provides, inter alia, a pixel driving circuit, a display apparatus, and a method of driving a display apparatus that substantially obviate one or more of the problems due to limitations and disadvantages of the related art. In one aspect, the present disclosure provides a pixel driving circuit. In some embodiments, the pixel driving circuit includes a first circuit, a second circuit, and one or more third circuits. Optionally, the first circuit is configured to compensate for a variation in a threshold voltage in a driving transistor in the one or more third circuits. Optionally, the first circuit is coupled to a first control signal line, a second control signal line, a first light emitting control signal line, and a second light emitting control signal line. Optionally, the second circuit is coupled to the first light emitting control signal line and the second light emitting control signal line. Optionally, the first light emitting control signal line and the second light emitting control signal line are configured to transmit light emitting control signals having reversed phases.

Figure 1:
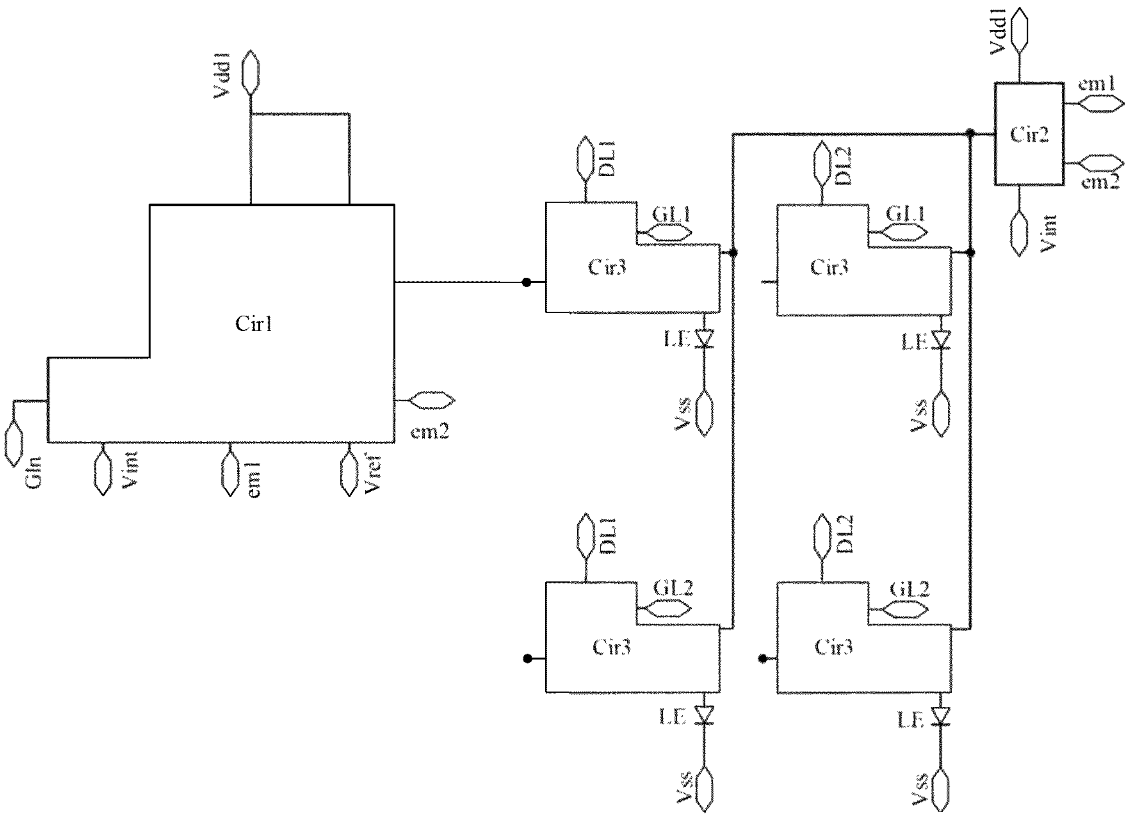
FIG. 1 is a schematic diagram illustrating the structure of a pixel driving circuit in some embodiments according to the present disclosure.

FIG. 1 is a schematic diagram illustrating the structure of a pixel driving circuit in some embodiments according to the present disclosure. Referring to FIG. 1, the pixel driving circuit in some embodiments includes a first circuit Cir1, a second circuit Cir2, and one or more third circuits Cir3. The first circuit Cir1 is configured to compensate for a variation in a threshold voltage in a driving transistor in the one or more third circuits Cir3. The second circuit Cir2 is configured to provide a voltage supply signal to the driving transistor. A respective third circuit of the one or more third circuits Cir3 is configured to generate a driving current for driving a light emitting element to emit light.

In some embodiments, the first circuit Cir1 is coupled to a first voltage supply line Vdd1, a first light emitting control signal line em1, a second light emitting control signal line em2, a respective gate line Gln of a plurality of gate lines, a reset signal line Vint, and a reference signal line Vref. Optionally, the first light emitting control signal line em1 and the second light emitting control signal line em2 are configured to transmit light emitting control signals having reversed phases. For example, at a same time point, the first light emitting control signal line em1 is configured to transmit an effective voltage signal whereas the second light emitting control signal line em2 is configured to transmit an ineffective voltage signal. In another example, at a same time point, the first light emitting control signal line em1 is configured to transmit an ineffective voltage signal whereas the second light emitting control signal line em2 is configured to transmit an effective voltage signal. Optionally, the respective gate line Gln is one of N number of gate lines configured to provide gate scanning signals to N number of rows of third circuits, N being a positive integer.

In some embodiments, the second circuit Cir2 is coupled to a reset signal line Vint, a first light emitting control signal line em1, a second light emitting control signal line em2, and a first voltage supply line Vdd1.

In some embodiments, a respective third circuit of the one or more third circuits Cir3 is coupled to a respective gate line (e.g., a first gate line GL1 or a second gate line GL2 as depicted in FIG. 1) of a plurality of gate lines, an anode of a respective light emitting element LE, and a respective data line (e.g., a first data line DL1 or a second data line DL2 as depicted in FIG. 1) of a plurality of data lines. A cathode of the respective light emitting element LE is coupled to a low voltage signal line Vss. The respective third circuit is coupled to the first circuit Cir1, and is coupled to the second circuit Cir2.

In some embodiments, the one or more third circuits Cir3 include a plurality of third circuits configured to drive light emission in a plurality of light emitting elements. In some embodiments, the plurality of third circuits are arranged in an array. For example, FIG. 1 depicts an array of third circuits arranged in two rows and two columns. In some embodiments, third circuits in a same column are coupled to a same data line. For example, third circuits in a first column are coupled to a first data line DL1, and third circuits in a second column are coupled to a second data line DL2. In some embodiments, third circuits in a same row are coupled to a same gate line. For example, third circuits in a first row are coupled to a first gate line GL1, and third circuits in a second row are coupled to a second data line DL2.

Figure 2:
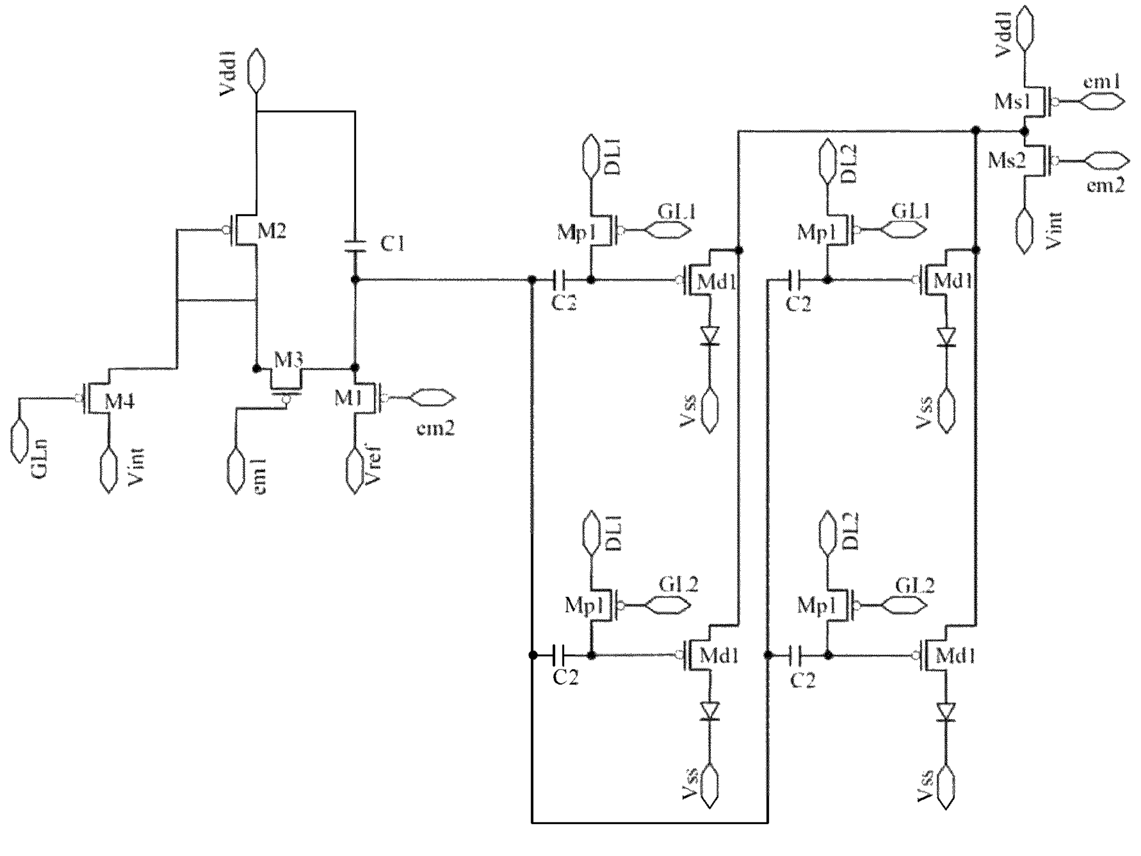
FIG. 2 is circuit diagram of a pixel driving circuit in some embodiments according to the present disclosure.

FIG. 2 is circuit diagram of a pixel driving circuit in some embodiments according to the present disclosure. Referring to FIG. 1 and FIG. 2, the first circuit Cir1 in some embodiments includes a first transistor M1, a second transistor M2, a third transistor M3, a fourth transistor M4, and a first capacitor C1.

In some embodiments, agate electrode of the first transistor M1 is coupled to the second light emitting control signal line em2, a first electrode of the first transistor M1 is coupled to the reference signal line Vref, and a second electrode of the first transistor M1 is coupled to the second electrode of the third transistor M3 and a second capacitor electrode of the first capacitor C1.

In some embodiments, a gate electrode and a second electrode of the second transistor M2 are coupled to a second electrode of the fourth transistor M4 and a first electrode of the third transistor M3, and a first electrode of the second transistor M2 is coupled to the first voltage supply line Vdd1.

In some embodiments, a gate electrode of the third transistor M3 is coupled to the first light emitting control signal line em1; a first electrode of the third transistor M3 is coupled to the gate electrode and the second electrode of the second transistor M2, and the second electrode of the fourth transistor M4; and a second electrode of the third transistor M3 is coupled to the second electrode of the first transistor M1 and the second capacitor electrode of the first capacitor C1.

In some embodiments, a gate electrode of the fourth transistor M4 is coupled to the respective gate line Gln of a plurality of gate lines; a first electrode of the fourth transistor M4 is coupled to the reset signal line Vint; and a second electrode of the fourth transistor M4 is coupled to the gate electrode and the second electrode of the second transistor M2, and the first electrode of the third transistor M3.

In some embodiments, a first capacitor electrode of the first capacitor C1 is coupled to the first electrode of the second transistor M2 and the first voltage supply line Vdd1, and the second capacitor electrode of the first capacitor C1 is coupled to the second electrode of the first transistor M1 and the second electrode of the third transistor M3.

In some embodiments, the second capacitor electrode of the first capacitor C1, the second electrode of the first transistor M1, and the second electrode of the third transistor M3 are coupled to the respective third circuit. Optionally, the second capacitor electrode of the first capacitor C1, the second electrode of the first transistor M1, and the second electrode of the third transistor M3 are coupled to a first capacitor electrode of a second capacitor C2 of the respective third circuit.

In some embodiments, the second circuit Cir2 includes a first light emitting control transistor Ms1 and a second light emitting control transistor Ms2.

In some embodiments, a gate electrode of the first light emitting control transistor Ms1 is coupled to the first light emitting control signal line em1, a first electrode of the first light emitting control transistor Ms1 is coupled to the first voltage supply line Vdd1, and a second electrode of the first light emitting control transistor Ms1 is coupled to a second electrode of the second light emitting control transistor Ms2.

In some embodiments, a gate electrode of the second light emitting control transistor Ms2 is coupled to the second light emitting control signal line em2, a first electrode of the second light emitting control transistor Ms2 is coupled to the reset signal line Vint, and a second electrode of the second light emitting control transistor Ms2 is coupled to the second electrode of the first light emitting control transistor Ms1.

In some embodiments, the second electrode of the first light emitting control transistor Ms1 and the second electrode of the second light emitting control transistor Ms2 are coupled to the respective third circuit. Optionally, the second electrode of the first light emitting control transistor Ms1 and the second electrode of the second light emitting control transistor Ms2 are coupled to a first electrode of a driving transistor Md1 of the respective third circuit.

In some embodiments, the respective third circuit includes a driving transistor Md1, a data write transistor Mp1, and a second capacitor C2.

In some embodiments, a gate electrode of the driving transistor Md1 is coupled to a second capacitor electrode of the second capacitor C2 and a second electrode of the data write transistor Mp1, a first electrode of the driving transistor Md1 is coupled to the second electrode of the first light emitting control transistor Ms1 and the second electrode of the second light emitting control transistor Ms2, and a second electrode of the driving transistor Md1 is coupled to an anode of a respective light emitting element LE.

In some embodiments, a gate electrode of the data write transistor Mp1 is coupled to a respective gate line of the plurality of gate lines (e.g., a first gate line GL1 for a third circuit in a first row, a second gate line GL2 for a third circuit in a second row), a first electrode of the data write transistor Mp1 is coupled to a respective data line of the plurality of data lines (e.g., a first data line DL1 for a third circuit in a first column, a second data line DL2 for a third circuit in a second column), and a second electrode of the data write transistor Mp1 is coupled to the gate electrode of the driving transistor Md1 and the second capacitor electrode of the second capacitor C2.

In some embodiments, a first capacitor electrode of the second capacitor C2 is coupled to the first circuit Cir1. Optionally, the first capacitor electrode of the second capacitor C2 is coupled to the second capacitor electrode of the first capacitor C1, the second electrode of the first transistor M1, and the second electrode of the third transistor M3.

In some embodiments, a second capacitor electrode of the second capacitor C2 is coupled to the second electrode of the data write transistor Mp1 and the gate electrode of the driving transistor Md1.

As used herein, a first electrode or a second electrode refers to one of a first terminal and a second terminal of a transistor, the first terminal and the second terminal being connected to an active layer of the transistor. A direction of a current flowing through the transistor may be configured to be from a first electrode to a second electrode, or from a second electrode to a first electrode. Accordingly, depending on the direction of the current flowing through the transistor, in one example, the first electrode is configured to receive an input signal and the second electrode is configured to output an output signal; in another example, the second electrode is configured to receive an input signal and the first electrode is configured to output an output signal.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal. Referring to FIG. 2, the transistors are p-type transistors such as polysilicon transistors. In alternative example, one or more transistors of the pixel driving circuit may be an n-type transistor.

Figure 3:
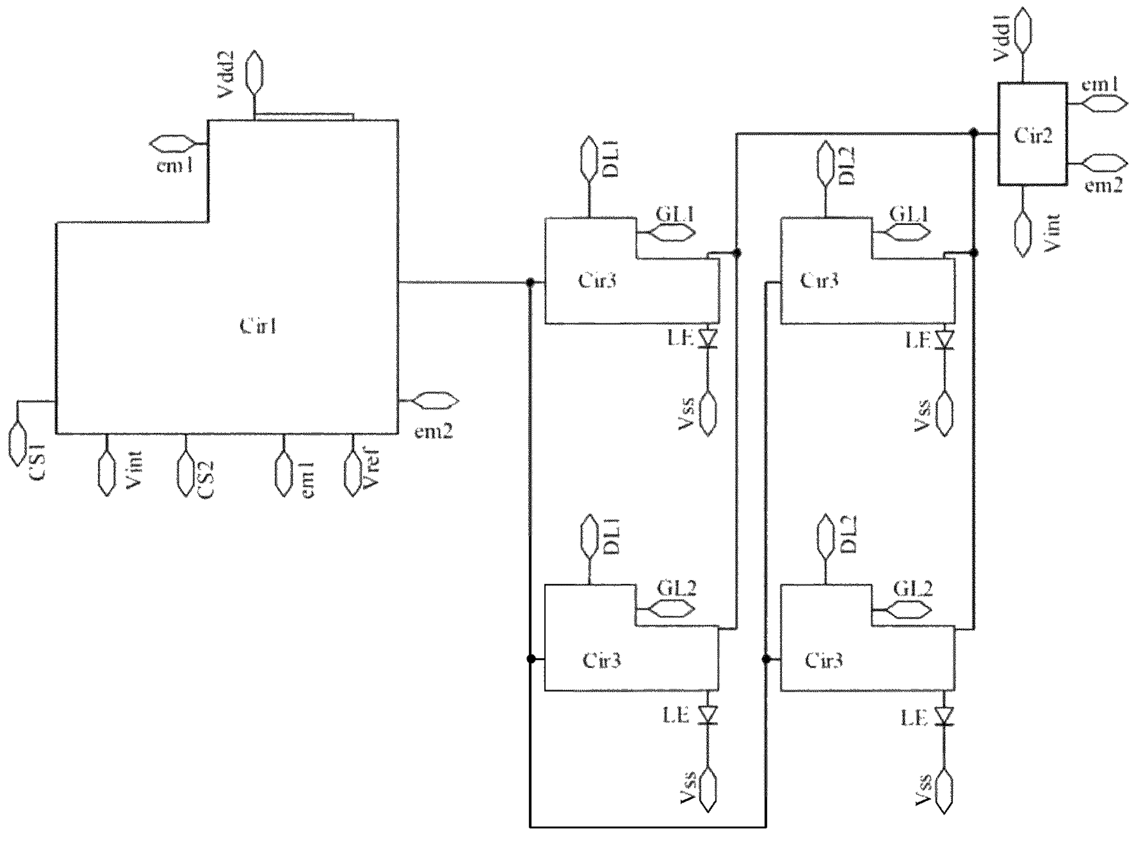
FIG. 3 is a schematic diagram illustrating the structure of a pixel driving circuit in some embodiments according to the present disclosure.

FIG. 3 is a schematic diagram illustrating the structure of a pixel driving circuit in some embodiments according to the present disclosure. Referring to FIG. 3, the pixel driving circuit in some embodiments includes a first circuit Cir1, a second circuit Cir2, and one or more third circuits Cir3. The first circuit Cir1 is coupled to a second voltage supply line Vdd2, a first light emitting control signal line em1, a second light emitting control signal line em2, a first control signal line CS1, a second control signal line CS2, a reset signal line Vint, and a reference signal line Vref.

In some embodiments, the first light emitting control signal line em1 and the second light emitting control signal line em2 are configured to transmit light emitting control signals having reversed phases. For example, at a same time point, the first light emitting control signal line em1 is configured to transmit an effective voltage signal whereas the second light emitting control signal line em2 is configured to transmit an ineffective voltage signal. In another example, at a same time point, the first light emitting control signal line em1 is configured to transmit an ineffective voltage signal whereas the second light emitting control signal line em2 is configured to transmit an effective voltage signal.

In some embodiments, the second control signal line CS2 and the second light emitting control signal line em2 are configured to transmit control signals having reversed phases. For example, at a same time point, the second control signal line CS2 is configured to transmit an effective voltage signal whereas the second light emitting control signal line em2 is configured to transmit an ineffective voltage signal. In another example, at a same time point, the second control signal line CS2 is configured to transmit an ineffective voltage signal whereas the second light emitting control signal line em2 is configured to transmit an effective voltage signal.

In alternative embodiments, the second control signal line CS2 and the second light emitting control signal line em2 are configured to transmit control signals having a same phase. For example, at a same time point, the second control signal line CS2 is configured to transmit an effective voltage signal, and the second light emitting control signal line em2 is also configured to transmit an effective voltage signal. In another example, at a same time point, the second control signal line CS2 is configured to transmit an ineffective voltage signal, and the second light emitting control signal line em2 is also configured to transmit an ineffective voltage signal.

In some embodiments, when the first gate line GL1 is configured to provide gate scanning signals, the first control signal line CS1 and the first gate line GL1 are configured to provide signals having a same phase. For example, at a same time point, the first gate line GL1 is configured to transmit an effective voltage signal, and the first control signal line CS1 is also configured to transmit an effective voltage signal. In another example, at a same time point, the first gate line GL1 is configured to transmit an ineffective voltage signal, and the first control signal line CS1 is also configured to transmit an ineffective voltage signal.

In some embodiments, the second circuit Cir2 is coupled to a reset signal line Vint, a first light emitting control signal line em1, a second light emitting control signal line em2, and a first voltage supply line Vdd1.

In some embodiments, a respective third circuit of the one or more third circuits Cir3 is coupled to a respective gate line (e.g., a first gate line GL1 or a second gate line GL2 as depicted in FIG. 3) of a plurality of gate lines, an anode of a respective light emitting element LE, and a respective data line (e.g., a first data line DL1 or a second data line DL2 as depicted in FIG. 3) of a plurality of data lines. A cathode of the respective light emitting element LE is coupled to a low voltage signal line Vss. The respective third circuit is coupled to the first circuit Cir1, and is coupled to the second circuit Cir2.

In some embodiments, the one or more third circuits Cir3 include a plurality of third circuits configured to drive light emission in a plurality of light emitting elements. In some embodiments, the plurality of third circuits are arranged in an array. For example, FIG. 3 depicts an array of third circuits arranged in two rows and two columns. In some embodiments, third circuits in a same column are coupled to a same data line. For example, third circuits in a first column are coupled to a first data line DL1, and third circuits in a second column are coupled to a second data line DL2 In some embodiments, third circuits in a same row are coupled to a same gate line. For example, third circuits in a first row are coupled to a first gate line GL1, and third circuits in a second column are coupled to a second gate line GL2.

Figure 4:
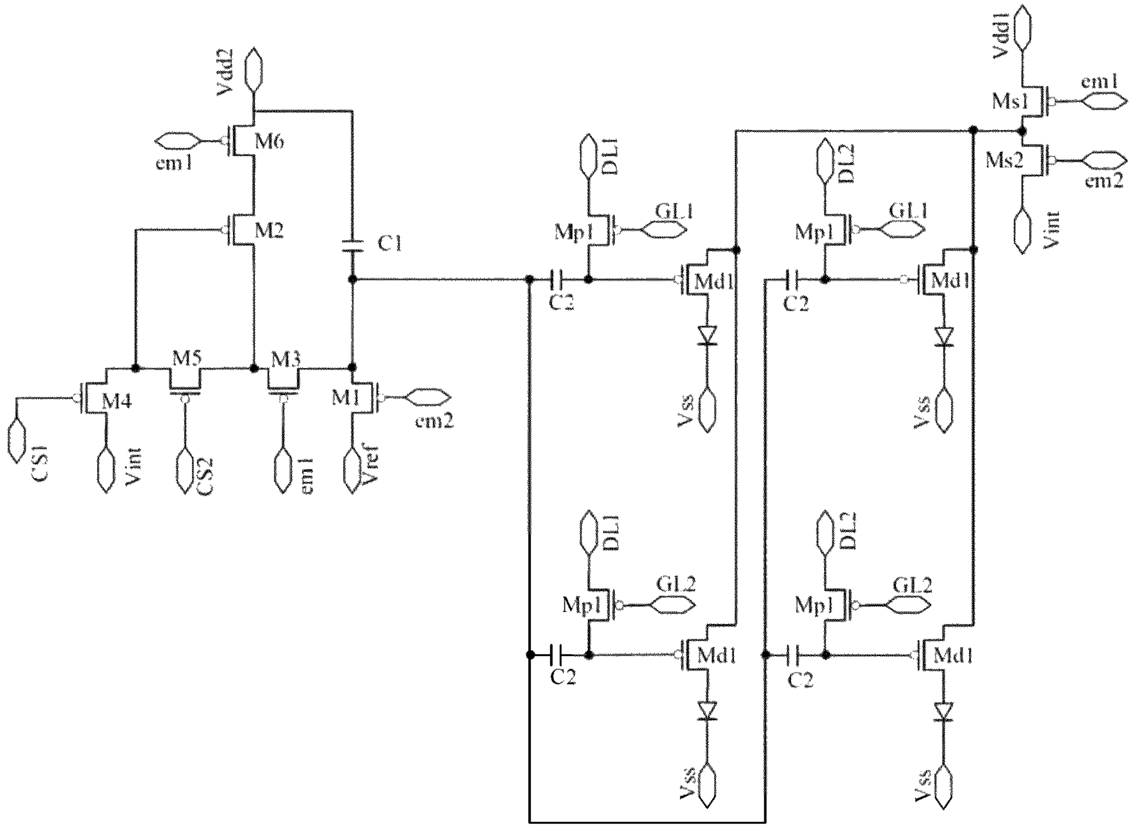
FIG. 4 is circuit diagram of a pixel driving circuit in some embodiments according to the present disclosure.

FIG. 4 is circuit diagram of a pixel driving circuit in some embodiments according to the present disclosure. Referring to FIG. 3 and FIG. 4, the first circuit Cir1 in some embodiments includes a first transistor M1, a second transistor M2, a third transistor M3, a fourth transistor M4, a fifth transistor M5, a sixth transistor M6, and a first capacitor C1.

In some embodiments, a gate electrode of the first transistor M1 is coupled to the second light emitting control signal line em2, a first electrode of the first transistor M1 is coupled to the reference signal line Vref, and a second electrode of the first transistor M1 is coupled to the second electrode of the third transistor M3 and a second capacitor electrode of the first capacitor C1.

In some embodiments, agate electrode of the second transistor M2 is coupled to a second electrode of the fourth transistor M4 and a first electrode of the fifth transistor M5, a first electrode of the second transistor M2 is coupled to a second electrode of the sixth transistor M6, and a second electrode of the second transistor M2 is coupled to a first electrode of the third transistor M3 and a second electrode of the fifth transistor M5.

In some embodiments, a gate electrode of the third transistor M3 is coupled to the first light emitting control signal line em1; a first electrode of the third transistor M3 is coupled to the second electrode of the second transistor M2 and a second electrode of the fifth transistor M5; and a second electrode of the third transistor M3 is coupled to the second electrode of the first transistor M1 and the second capacitor electrode of the first capacitor C1.

In some embodiments, a gate electrode of the fourth transistor M4 is coupled to a first control signal line CS1; a first electrode of the fourth transistor M4 is coupled to the reset signal line Vint; and a second electrode of the fourth transistor M4 is coupled to the gate electrode of the second transistor M2, and a first electrode of the fifth transistor M5.

In some embodiments, a gate electrode of the fifth transistor M5 is coupled to the second control signal line CS2, a first electrode of the fifth transistor M5 is coupled to the gate electrode of the second transistor M2 and the second electrode of the fourth transistor M4, and a second electrode of the fifth transistor M5 is coupled to the first electrode of the third transistor M3 and the second electrode of the second transistor M2.

In some embodiments, a gate electrode of the sixth transistor M6 is coupled to the first light emitting control signal line em1, a first electrode of the sixth transistor M6 is coupled to a second voltage supply line Vdd2, and a second electrode of the sixth transistor M6 is coupled to the first electrode of the second transistor M2.

In some embodiments, a first capacitor electrode of the first capacitor C1 is coupled to the first electrode of the sixth transistor M6 and the second voltage supply line Vdd2, and the second capacitor electrode of the first capacitor C1 is coupled to the second electrode of the first transistor M1 and the second electrode of the third transistor M3.

In some embodiments, the second capacitor electrode of the first capacitor C1, the second electrode of the first transistor M1, and the second electrode of the third transistor M3 are coupled to the respective third circuit. Optionally, the second capacitor electrode of the first capacitor C1, the second electrode of the first transistor M1, and the second electrode of the third transistor M3 are coupled to a first capacitor electrode of a second capacitor C2 of the respective third circuit.

In some embodiments, the second circuit Cir2 includes a first light emitting control transistor Ms1 and a second light emitting control transistor Ms2.

In some embodiments, a gate electrode of the first light emitting control transistor Ms1 is coupled to the first light emitting control signal line em1, a first electrode of the first light emitting control transistor Ms1 is coupled to the first voltage supply line Vdd1, and a second electrode of the first light emitting control transistor Ms1 is coupled to a second electrode of the second light emitting control transistor Ms2.

In some embodiments, a gate electrode of the second light emitting control transistor Ms2 is coupled to the second light emitting control signal line em2, a first electrode of the second light emitting control transistor Ms2 is coupled to the reset signal line Vint, and a second electrode of the second light emitting control transistor Ms2 is coupled to the second electrode of the first light emitting control transistor Ms1.

In some embodiments, the second electrode of the first light emitting control transistor Ms1 and the second electrode of the second light emitting control transistor Ms2 are coupled to the respective third circuit. Optionally, the second electrode of the first light emitting control transistor Ms1 and the second electrode of the second light emitting control transistor Ms2 are coupled to a first electrode of a driving transistor Md1 of the respective third circuit.

In some embodiments, the respective third circuit includes a driving transistor Md1, a data write transistor Mp1, and a second capacitor C2.

In some embodiments, a gate electrode of the driving transistor Md1 is coupled to a second capacitor electrode of the second capacitor C2 and a second electrode of the data write transistor Mp1, a first electrode of the driving transistor Md1 is coupled to the second electrode of the first light emitting control transistor Ms1 and the second electrode of the second light emitting control transistor Ms2, and a second electrode of the driving transistor Md1 is coupled to an anode of a respective light emitting element LE.

In some embodiments, agate electrode of the data write transistor Mp1 is coupled to a respective gate line of the plurality of gate lines (e.g., a first gate line GL1 for a third circuit in a first row, a second gate line GL2 for a third circuit in a second row), a first electrode of the data write transistor Mp1 is coupled to a respective data line of the plurality of data lines (e.g., a first data line DL1 for a third circuit in a first column, a second data line DL2 for a third circuit in a second column), and a second electrode of the data write transistor Mp1 is coupled to the gate electrode of the driving transistor Md1 and the second capacitor electrode of the second capacitor C2.

In some embodiments, a first capacitor electrode of the second capacitor C2 is coupled to the first circuit Cir1. Optionally, the first capacitor electrode of the second capacitor C2 is coupled to the second capacitor electrode of the first capacitor C1, the second electrode of the first transistor M1, and the second electrode of the third transistor M3.

In some embodiments, a second capacitor electrode of the second capacitor C2 is coupled to the second electrode of the data write transistor Mp1 and the gate electrode of the driving transistor Md1.

The inventors of the present disclosure discover that the pixel driving circuits depicted in FIG. 3 and FIG. 4 are advantageous over the pixel driving circuits depicted in FIG. 1 and FIG. 2 in several aspects. For example, in an initial phase in operating the pixel driving circuits depicted in FIG. 1 and FIG. 2, the inventors of the present disclosure observe a leakage current flowing from the first voltage supply line Vdd1 through the second transistor M2 and the fourth transistor M4 to the respective reset signal line. In the pixel driving circuits depicted in FIG. 3 and FIG. 4, by having the sixth transistor M6, the leakage current in the initial phase can be prevented, significantly reducing power consumption in the pixel driving circuit.

Moreover, the inventors of the present disclosure discover that, by having the second control signal line CS2 in addition to the first light emitting control signal line em1 and the second light emitting control signal line em2, the respective third circuit can be operated in a compensation mode (a first mode) or a non-compensation mode (a second mode) by having different control signals and light emitting control signals for different operation modes, respectively. The pixel driving circuits depicted in FIG. 1 and FIG. 2, on the other hand, is not capable of operating in two different modes.

Further, the inventors of the present disclosure discover that, by having the second voltage supply line Vdd2 independent of the first voltage supply line Vdd1, the pixel driving circuit can be operated with enhanced flexibility and selectivity.

Figure 5:
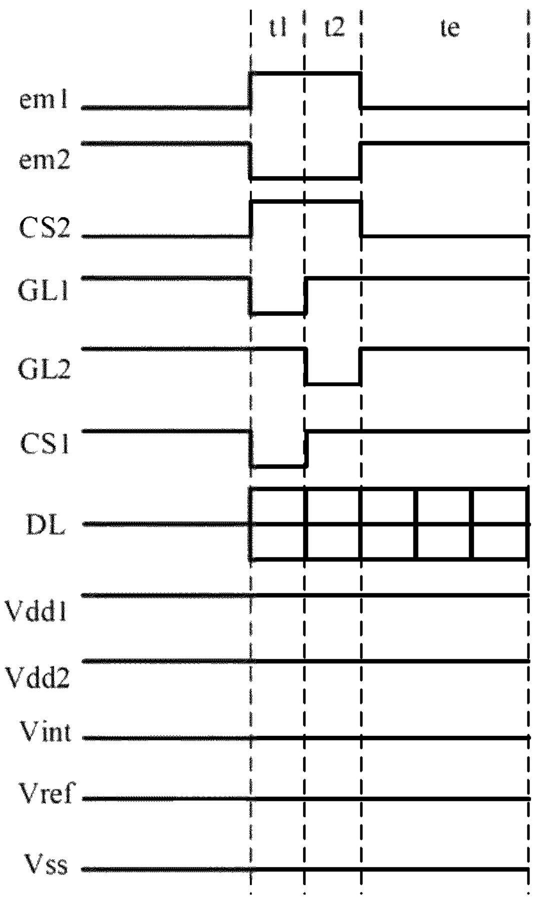
FIG. 5 is a timing diagram illustrating the operation of a pixel driving circuit in some embodiments according to the present disclosure.

FIG. 5 is a timing diagram illustrating the operation of a pixel driving circuit in some embodiments according to the present disclosure. FIG. 5 shows an operation of a pixel driving circuit in a compensation mode. Referring to FIG. 3 to FIG. 5, during one frame of image, the operation of the pixel driving circuit includes a first t1, a second phase 2, and a light emission phase te.

In some embodiments, in the first phase t1, a turning-on control signal is provided through the first control signal line CS1 to the gate electrode of the fourth transistor M4 to turn on the fourth transistor M4, allowing an initialization voltage signal from the reset signal line Vint to pass from the first electrode of the fourth transistor M4 to the second electrode of the fourth transistor M4; and in turn to the gate electrode of the second transistor M2. The gate electrode of the second transistor M2 is initialized. A turning-off control signal is provided through the second control signal line CS2 to the gate electrode of the fifth transistor M5, turning off the fifth transistor M5.

A turning-off control signal is provided through the first light emitting control signal line em1 to the gate electrodes of the third transistor M3, the sixth transistor M6, and the first light emitting control transistor Ms1, turning off the third transistor M3, the sixth transistor M6, and the first light emitting control transistor Ms1.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the respective third circuit. The reference signal from the reference signal line Vref is written to the first capacitor electrode of the second capacitor C2 in the respective third circuit, stabilizing the voltage level of the first capacitor electrode of the second capacitor C2 in the respective third circuit, preventing voltage level fluctuation at the gate electrode of the driving transistor Md1 when data signals are written into a third circuit in a row other than the row having the respective third circuit.

A turning-on control signal is provided through the respective gate line (e.g., the first gate line GL for the first row of third circuits) to the gate electrode of the data write transistor Mp1 in the respective third circuit, allowing a data signal from the respective data line (e.g., the first data line DL for the first column of third circuits) to pass from the first electrode of the data write transistor Mp1 to the second electrode of the data write transistor Mp1. The data signal is written to the gate electrode of the driving transistor Md1 in the respective third circuit.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the respective third circuit, preventing the driving transistor from abnormally turning on when the data signal is written to the gate electrode of the driving transistor Md1 in the respective third circuit.

In some embodiments, in the second phase t2, a turning-off control signal is provided through the first control signal line CS1 to the gate electrode of the fourth transistor M4 to turn off the fourth transistor M4. The initialization of the gate electrode of the second transistor M2 is complete.

A turning-off control signal is provided through the first gate line GL1 to the gate electrode of the data write transistor Mp1 in the respective third circuit, to turn off the data write transistor Mp1 in the respective third circuit. The writing of the data signal to the gate electrode of the driving transistor Md1 in the respective third circuit is complete.

A turning-on control signal is provided through the second gate line GL2 to the gate electrode of the data write transistor Mp1 in a third circuit in a next row (e.g., a second row when the respective third circuit is in a first row), allowing a data signal from the second gate line GL2 to pass from the first electrode of the data write transistor Mp1 in the third circuit in the next row to the second electrode of the data write transistor Mp1 in the third circuit in the next row. The data signal is written to the gate electrode of the driving transistor Md1 in the third circuit in the next row.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the third circuit in the next row. The reference signal from the reference signal line Vref is written to the first capacitor electrode of the second capacitor C2 in the third circuit in the next row, stabilizing the voltage level of the first capacitor electrode of the second capacitor C2 in the third circuit in the next row, preventing voltage level fluctuation at the gate electrode of the driving transistor Md1 when data signals are written into a third circuit in a row other than the next row.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the third circuit in the next row, preventing the driving transistor from abnormally turning on when the data signal is written to the gate electrode of the driving transistor Md1 in the third circuit in the next row.

For illustration purpose only, FIG. 4 and FIG. 5 depict an example in which the third circuits are arranged in an array having two columns and two rows. However, the pixel driving circuit may include more than two columns and more than two rows, or only one column and only one row.

Figure 6:
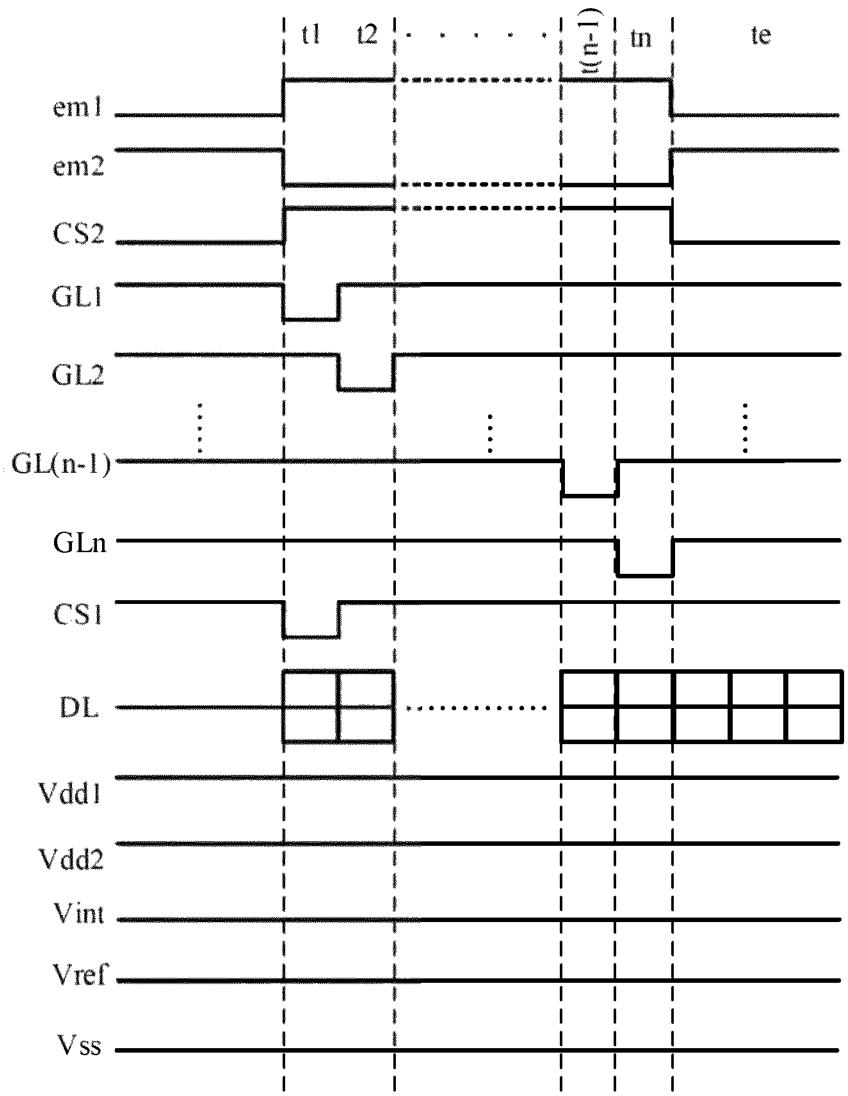
FIG. 6 is a timing diagram illustrating the operation of a pixel driving circuit in some embodiments according to the present disclosure.

FIG. 6 is a timing diagram illustrating the operation of a pixel driving circuit in some embodiments according to the present disclosure. FIG. 6 depict the operation of a pixel driving circuit in which the third circuits are arranged in an array having n rows. Referring to FIG. 6, the data writing step (t1 and 12 in FIG. 5) may be reiterated until the process is complete for all of n rows of third circuits. During one frame of image, the operation of the pixel driving circuit includes at least (n+1) number of phases, including a first phase t1, a second phase t2, a (n−1)-th phase t(n−1), an n-th phase tn, and a light emission phase te.

In some embodiments, in the light emission phase te, a turning-off control signal is provided through the first gate line GL1 to the gate electrode of the data write transistor Mp1 in the respective third circuit, to turn off the data write transistor Mp1 in the respective third circuit.

A turning-off control signal is provided through the second gate line GL2 to the gate electrode of the data write transistor Mp1 in the third circuit in the next row, to turn off the data write transistor Mp1 in the third circuit in the next row.

A turning-off control signal is provided through the (n−1)-th gate line GL(n−1) to the gate electrode of the data write transistor Mp1 in a third circuit in the (n−1)-th row, to turn off the data write transistor Mp1 in the third circuit in the (n−1)-th row.

A turning-off control signal is provided through the n-th gate line GLn to the gate electrode of the data write transistor Mp1 in a third circuit in the n-th row, to turn off the data write transistor Mp1 in the third circuit in the n-th row.

A turning-off control signal is provided through the second light emitting control signal line em2 to the gate electrode of the second light emitting control transistor Ms2, to turn off the second light emitting control transistor Ms2.

A turning-off control signal is provided through the second light emitting control signal line em2 to the gate electrode of the first transistor M1, to turn off the first transistor M1.

A turning-on control signal is provided through the second control signal line CS2 to the gate electrode of the fifth transistor M5, to turn on the fifth transistor M5.

A turning-on control signal is provided through the first light emitting control signal line em1 to the gate electrode of the sixth transistor M6, to turn on the sixth transistor M6.

When the fifth transistor M5 and the sixth transistor M6 are turned on, a voltage level at the gate electrode and the second electrode (e.g., a drain electrode) of the second transistor M2 is (a voltage level of the second voltage supply line Vdd2+a voltage level of the threshold voltage Vth).

A turning-on control signal is provided through the first light emitting control signal line em1 to the gate electrode of the third transistor M3, to turn on the third transistor M3. Because the fifth transistor M5 and the third transistor M3 are turned on, the voltage level at the gate electrode and the second electrode of the second transistor M2 is written to the first capacitor electrode of the second capacitor C2. The voltage level at the first capacitor electrode of the second capacitor C2 is then coupled to the gate electrode of the driving transistor Md1. As a result, a voltage difference Vgs between the gate electrode and the first electrode of the driving transistor Md1 is expressed as (a voltage level of the data signal written to the gate electrode of the driving transistor Md1+a voltage level of the second voltage supply line Vdd2+a voltage level of the threshold voltage Vth−a voltage level of the reference signal line Vref−a voltage level of the first voltage supply line Vdd1). A driving current I flowing through the driving transistor is expressed as K*(Vgs−a voltage level of the threshold voltage Vth)$^2$, which is equal to K*(a voltage level of the data signal written to the gate electrode of the driving transistor Md1+a voltage level of the second voltage supply line Vdd2−a voltage level of the reference signal line Vref−a voltage level of the first voltage supply line Vdd1)$^2$.

Figure 7A:
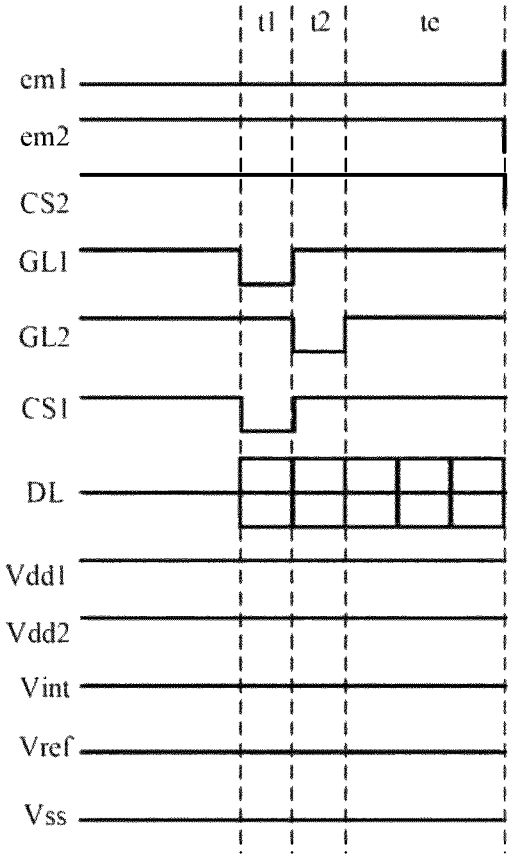
FIG. 7A is a timing diagram illustrating the operation of a pixel driving circuit in some embodiments according to the present disclosure.

FIG. 7A is a timing diagram illustrating the operation of a pixel driving circuit in some embodiments according to the present disclosure. FIG. 7A shows an operation of a pixel driving circuit in a non-compensation mode. Referring to FIG. 3, FIG. 4, and FIG. 7A, in the non-compensation mode, a turning-on control signal is provided by the first light emitting control signal line em1 throughout a frame of image, a turning-off control signal is provided by the second light emitting control signal line em2 throughout the frame of image, and a turning-off control signal is provided by the second control signal line CS2 throughout the frame of image. Accordingly, in the non-compensation mode, the second transistor M2, the third transistor M3, the sixth transistor M6, and the first light emitting control transistor Ms1 are turned on throughout the frame of image. A second voltage supply signal passed through the sixth transistor M6, the second transistor M2, and the third transistor M3, and in turn to the first capacitor electrode of the second capacitor C2. A data signal is written to the second capacitor electrode of the second capacitor C2. The operation of the pixel driving circuit does not involve coupling the voltage level at the first capacitor electrode of the second capacitor C2 to the gate electrode of the driving transistor Md1, and does not include extraction of the threshold voltage Vth.

For illustration purpose only, FIG. 4 and FIG. 7A depict an example in which the third circuits are arranged in an army having two columns and two rows. However, the pixel driving circuit may include more than two columns and more than two rows, or only one column and only one row.

Figure 8:
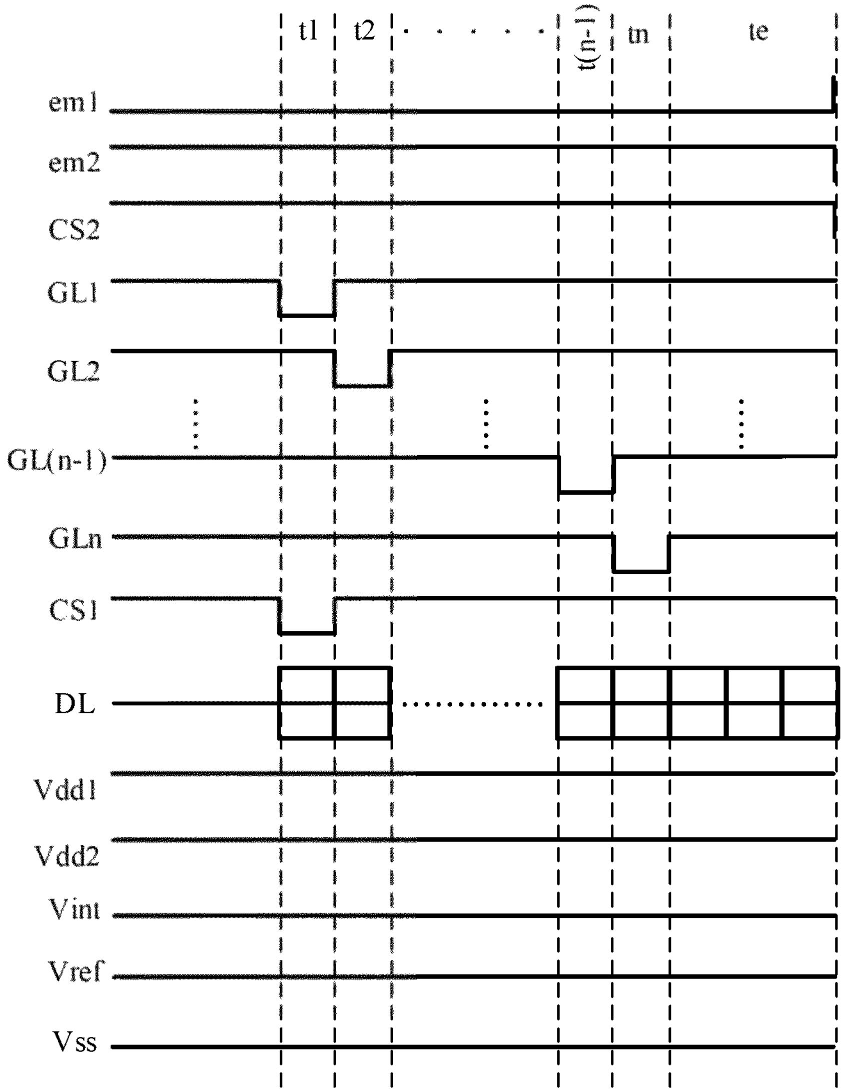
FIG. 8 is a timing diagram illustrating the operation of a pixel driving circuit in some embodiments according to the present disclosure.

FIG. 8 is a timing diagram illustrating the operation of a pixel driving circuit in some embodiments according to the present disclosure. FIG. 8 depict the operation of a pixel driving circuit in which the third circuits are arranged in an array having n rows. Referring to FIG. 8, the data writing step (t1 and 12 in FIG. 7A) may be reiterated until the process is complete for all of n rows of third circuits.

Figure 7B:
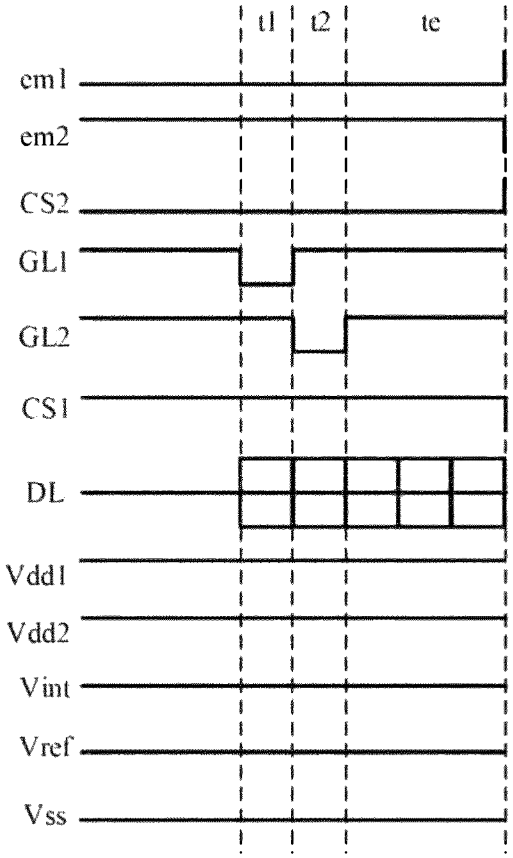
FIG. 7B is a timing diagram illustrating the operation of a pixel driving circuit in some embodiments according to the present disclosure.

FIG. 7B is a timing diagram illustrating the operation of a pixel driving circuit in some embodiments according to the present disclosure. FIG. 7B shows an operation of a pixel driving circuit in a non-compensation mode in an alternative embodiment. Referring to FIG. 3, FIG. 4, and FIG. 7B, in the non-compensation mode, a turning-on control signal is provided by the first light emitting control signal line em1 throughout a frame of image, a turning-off control signal is provided by the second light emitting control signal line em2 throughout the frame of image, a turning-off control signal is provided by the first control signal line CS1 throughout the frame of image, and a turning-on control signal is provided by the second control signal line CS2 throughout the frame of image. Accordingly, in the non-compensation mode, the third transistor M3, the sixth transistor M6, the fifth transistor M5, and the first light emitting control transistor Ms1 are turned on throughout the frame of image. The first transistor M1, the second transistor M2 and the fourth transistor M4 are turned off throughout the frame of image. The operation of the pixel driving circuit does not involve coupling the voltage level at the first capacitor electrode of the second capacitor C2 to the gate electrode of the driving transistor Md1, and does not include extraction of the threshold voltage Vth.

Figure 9:
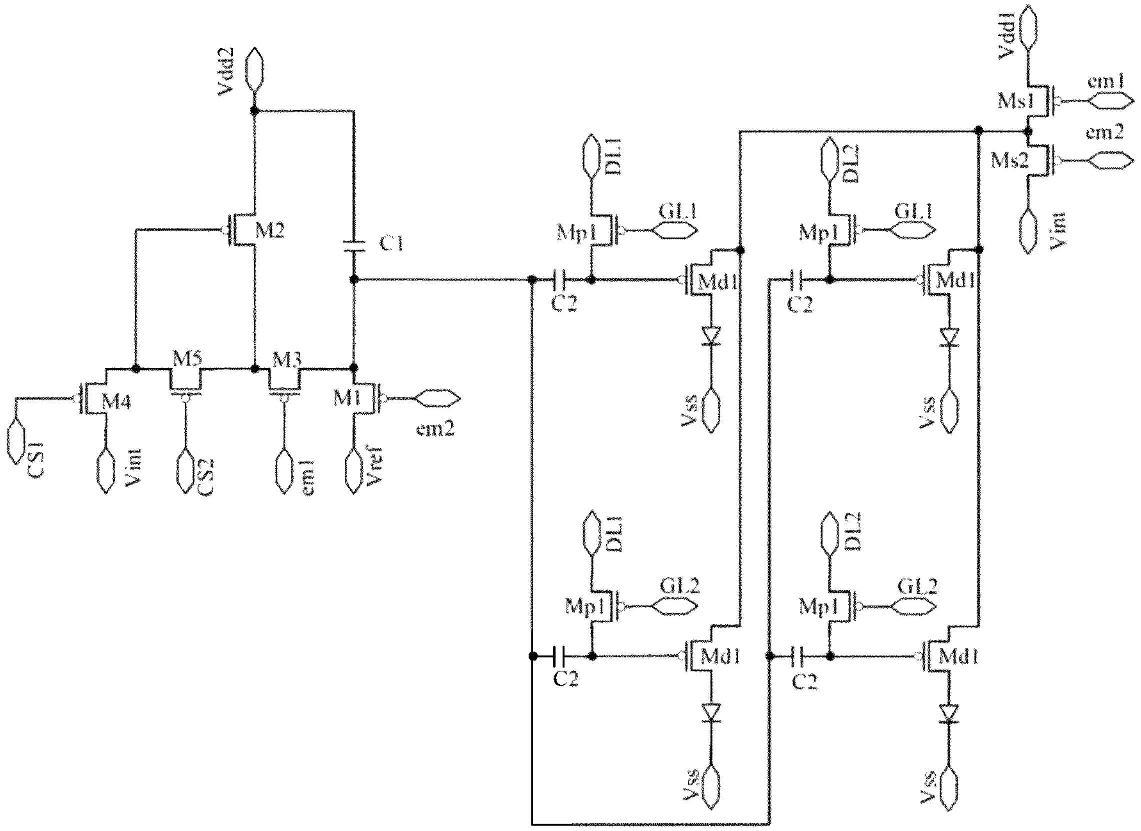
FIG. 9 is circuit diagram of a pixel driving circuit in some embodiments according to the present disclosure.

FIG. 9 is circuit diagram of a pixel driving circuit in some embodiments according to the present disclosure. Referring to FIG. 3 and FIG. 9, the first circuit Cir1 in some embodiments includes a first transistor M1, a second transistor M2, a third transistor M3, a fourth transistor M4, a fifth transistor M5, and a first capacitor C1. The pixel driving circuit depicted in FIG. 9 differs from the pixel driving circuit depicted in FIG. 4 in that the pixel driving circuit depicted in FIG. 9 does not include a sixth transistor M6.

In some embodiments, a gate electrode of the first transistor M1 is coupled to the second light emitting control signal line em2, a first electrode of the first transistor M1 is coupled to the reference signal line Vref, and a second electrode of the first transistor M1 is coupled to the second electrode of the third transistor M3 and a second capacitor electrode of the first capacitor C1.

In some embodiments, a gate electrode of the second transistor M2 is coupled to a second electrode of the fourth transistor M4 and a first electrode of the fifth transistor M5, a first electrode of the second transistor M2 is coupled to a second voltage supply line Vdd2, and a second electrode of the second transistor M2 is coupled to a first electrode of the third transistor M3 and a second electrode of the fifth transistor M5.

In some embodiments, a gate electrode of the third transistor M3 is coupled to the first light emitting control signal line em1; a first electrode of the third transistor M3 is coupled to the second electrode of the second transistor M2 and a second electrode of the fifth transistor M5; and a second electrode of the third transistor M3 is coupled to the second electrode of the first transistor M1 and the second capacitor electrode of the first capacitor C1.

In some embodiments, a gate electrode of the fourth transistor M4 is coupled to a first control signal line CS1; a first electrode of the fourth transistor M4 is coupled to the reset signal line Vint; and a second electrode of the fourth transistor M4 is coupled to the gate electrode of the second transistor M2, and a first electrode of the fifth transistor M5.

In some embodiments, a gate electrode of the fifth transistor M5 is coupled to the second control signal line CS2, a first electrode of the fifth transistor M5 is coupled to the gate electrode of the second transistor M2 and the second electrode of the fourth transistor M4, and a second electrode of the fifth transistor M5 is coupled to the first electrode of the third transistor M3 and the second electrode of the second transistor M2.

In some embodiments, a first capacitor electrode of the first capacitor C1 is coupled to the first electrode of the second transistor M2 and the second voltage supply line Vdd2, and the second capacitor electrode of the first capacitor C1 is coupled to the second electrode of the first transistor M1 and the second electrode of the third transistor M3.

In some embodiments, the second capacitor electrode of the first capacitor C1, the second electrode of the first transistor M1, and the second electrode of the third transistor M3 are coupled to the respective third circuit. Optionally, the second capacitor electrode of the first capacitor C1, the second electrode of the first transistor M1, and the second electrode of the third transistor M3 are coupled to a first capacitor electrode of a second capacitor C2 of the respective third circuit.

In some embodiments, the second circuit Cir2 includes a first light emitting control transistor Ms1 and a second light emitting control transistor Ms2.

In some embodiments, a gate electrode of the first light emitting control transistor Ms1 is coupled to the first light emitting control signal line em1, a first electrode of the first light emitting control transistor Ms1 is coupled to the first voltage supply line Vdd1, and a second electrode of the first light emitting control transistor Ms1 is coupled to a second electrode of the second light emitting control transistor Ms2.

In some embodiments, a gate electrode of the second light emitting control transistor Ms2 is coupled to the second light emitting control signal line em2, a first electrode of the second light emitting control transistor Ms2 is coupled to the reset signal line Vint, and a second electrode of the second light emitting control transistor Ms2 is coupled to the second electrode of the first light emitting control transistor Ms1.

In some embodiments, the second electrode of the first light emitting control transistor Ms1 and the second electrode of the second light emitting control transistor Ms2 are coupled to the respective third circuit. Optionally, the second electrode of the first light emitting control transistor Ms1 and the second electrode of the second light emitting control transistor Ms2 are coupled to a first electrode of a driving transistor Md1 of the respective third circuit.

In some embodiments, the respective third circuit includes a driving transistor Md1, a data write transistor Mp1, and a second capacitor C2.

In some embodiments, a gate electrode of the driving transistor Md1 is coupled to a second capacitor electrode of the second capacitor C2 and a second electrode of the data write transistor Mp1, a first electrode of the driving transistor Md1 is coupled to the second electrode of the first light emitting control transistor Ms1 and the second electrode of the second light emitting control transistor Ms2, and a second electrode of the driving transistor Md1 is coupled to an anode of a respective light emitting element LE.

In some embodiments, agate electrode of the data write transistor Mp1 is coupled to a respective gate line of the plurality of gate lines (e.g., a first gate line GL1 for a third circuit in a first row, a second gate line GL2 for a third circuit in a second row), a first electrode of the data write transistor Mp1 is coupled to a respective data line of the plurality of data lines (e.g., a first data line DL1 for a third circuit in a first column, a second data line DL2 for a third circuit in a second column), and a second electrode of the data write transistor Mp1 is coupled to the gate electrode of the driving transistor Md1 and the second capacitor electrode of the second capacitor C2.

In some embodiments, a first capacitor electrode of the second capacitor C2 is coupled to the first circuit Cir1. Optionally, the first capacitor electrode of the second capacitor C2 is coupled to the second capacitor electrode of the first capacitor C1, the second electrode of the first transistor M1, and the second electrode of the third transistor M3.

In some embodiments, a second capacitor electrode of the second capacitor C2 is coupled to the second electrode of the data write transistor Mp1 and the gate electrode of the driving transistor Md1.

The inventors of the present disclosure discover that, by having the second control signal line CS2 in addition to the first light emitting control signal line em1 and the second light emitting control signal line em2, the respective third circuit can be operated in a compensation mode (a first mode) or a non-compensation mode (a second mode) by having different control signals and light emitting control signals for different operation modes, respectively. The pixel driving circuits depicted in FIG. 1 and FIG. 2, on the other hand, is not capable of operating in two different modes.

Moreover, the inventors of the present disclosure discover that, by having the second voltage supply line Vdd2 independent of the first voltage supply line Vdd1, the pixel driving circuit can be operated with enhanced flexibility and selectivity.

The operation of the pixel driving circuit depicted in FIG. 9 in a compensation mode is substantially the same as those depicted in FIG. 5 and FIG. 6. Referring to FIG. 3 to FIG. 5, during one frame of image in the compensation mode, the operation of the pixel driving circuit includes a first t1, a second phase t2, and a light emission phase te.

In some embodiments, in the first phase t1, a turning-on control signal is provided through the first control signal line CS1 to the gate electrode of the fourth transistor M4 to turn on the fourth transistor M4, allowing an initialization voltage signal from the reset signal line Vint to pass from the first electrode of the fourth transistor M4 to the second electrode of the fourth transistor M4; and in turn to the gate electrode of the second transistor M2. The gate electrode of the second transistor M2 is initialized. A turning-off control signal is provided through the second control signal line CS2 to the gate electrode of the fifth transistor M5, turning off the fifth transistor M5.

A turning-off control signal is provided through the first light emitting control signal line em1 to the gate electrodes of the third transistor M3, and the first light emitting control transistor Ms1, turning off the third transistor M3, and the first light emitting control transistor Ms1.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the respective third circuit. The reference signal from the reference signal line Vref is written to the first capacitor electrode of the second capacitor C2 in the respective third circuit, stabilizing the voltage level of the first capacitor electrode of the second capacitor C2 in the respective third circuit, preventing voltage level fluctuation at the gate electrode of the driving transistor Md1 when data signals are written into a third circuit in a row other than the row having the respective third circuit.

A turning-on control signal is provided through the respective gate line (e.g., the first gate line GL1 for the first row of third circuits) to the gate electrode of the data write transistor Mp1 in the respective third circuit, allowing a data signal from the respective data line (e.g., the first data line DL for the first column of third circuits) to pass from the first electrode of the data write transistor Mp1 to the second electrode of the data write transistor Mp1. The data signal is written to the gate electrode of the driving transistor Md1 in the respective third circuit.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the respective third circuit, preventing the driving transistor from abnormally turning on when the data signal is written to the gate electrode of the driving transistor Md1 in the respective third circuit.

In some embodiments, in the second phase t2, a turning-off control signal is provided through the first control signal line CS1 to the gate electrode of the fourth transistor M4 to turn off the fourth transistor M4. The initialization of the gate electrode of the second transistor M2 is complete.

A turning-off control signal is provided through the first gate line GL1 to the gate electrode of the data write transistor Mp1 in the respective third circuit, to turn off the data write transistor Mp1 in the respective third circuit. The writing of the data signal to the gate electrode of the driving transistor Md1 in the respective third circuit is complete.

A turning-on control signal is provided through the second gate line GL2 to the gate electrode of the data write transistor Mp1 in a third circuit in a next row (e.g., a second row when the respective third circuit is in a first row), allowing a data signal from the second gate line GL2 to pass from the first electrode of the data write transistor Mp1 in the third circuit in the next row to the second electrode of the data write transistor Mp1 in the third circuit in the next row. The data signal is written to the gate electrode of the driving transistor Md1 in the third circuit in the next row.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the third circuit in the next row. The reference signal from the reference signal line Vref is written to the first capacitor electrode of the second capacitor C2 in the third circuit in the next row, stabilizing the voltage level of the first capacitor electrode of the second capacitor C2 in the third circuit in the next row, preventing voltage level fluctuation at the gate electrode of the driving transistor Md1 when data signals are written into a third circuit in a row other than the next row.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the third circuit in the next row, preventing the driving transistor from abnormally turning on when the data signal is written to the gate electrode of the driving transistor Md1 in the third circuit in the next row.

For illustration purpose only, FIG. 9 and FIG. 5 depict an example in which the third circuits are arranged in an array having two columns and two rows. However, the pixel driving circuit may include more than two columns and more than two rows, or only one column and only one row. FIG. 6 depict the operation of a pixel driving circuit in which the third circuits are arranged in an array having n rows. Referring to FIG. 6, the data writing step (t1 and t2 in FIG. 5) may be reiterated until the process is complete for all of n rows of third circuits. During one frame of image, the operation of the pixel driving circuit includes at least (n+1) number of phases, including a first phase t1, a second phase t2, a (n−1)-th phase t(n−1), an n-th phase tn, and a light emission phase te.

In some embodiments, in the light emission phase te, a turning-off control signal is provided through the first gate line GL1 to the gate electrode of the data write transistor Mp1 in the respective third circuit, to turn off the data write transistor Mp1 in the respective third circuit.

A turning-off control signal is provided through the second gate line GL2 to the gate electrode of the data write transistor Mp1 in the third circuit in the next row, to turn off the data write transistor Mp1 in the third circuit in the next row.

A turning-off control signal is provided through the (n−1)-th gate line GL(n−1) to the gate electrode of the data write transistor Mp1 in a third circuit in the (n−1)-th row, to turn off the data write transistor Mp1 in the third circuit in the (n−1)-th row.

A turning-off control signal is provided through the n-th gate line GLn to the gate electrode of the data write transistor Mp1 in a third circuit in the n-th row, to turn off the data write transistor Mp1 in the third circuit in the n-th row.

A turning-off control signal is provided through the second light emitting control signal line em2 to the gate electrode of the second light emitting control transistor Ms2, to turn off the second light emitting control transistor Ms2.

A turning-off control signal is provided through the second light emitting control signal line em2 to the gate electrode of the first transistor M1, to turn off the first transistor M1.

A turning-on control signal is provided through the second control signal line CS2 to the gate electrode of the fifth transistor M5, to turn on the fifth transistor M5.

When the fifth transistor M5 is turned on, a voltage level at the gate electrode and the second electrode (e.g., a drain electrode) of the second transistor M2 is (a voltage level of the second voltage supply line Vdd2+a voltage level of the threshold voltage Vth).

A turning-on control signal is provided through the first light emitting control signal line em1 to the gate electrode of the third transistor M3, to turn on the third transistor M3. Because the fifth transistor M5 and the third transistor M3 are turned on, the voltage level at the gate electrode and the second electrode of the second transistor M2 is written to the first capacitor electrode of the second capacitor C2. The voltage level at the first capacitor electrode of the second capacitor C2 is then coupled to the gate electrode of the driving transistor Md1. As a result, a voltage difference Vgs between the gate electrode and the first electrode of the driving transistor Md1 is expressed as (a voltage level of the data signal written to the gate electrode of the driving transistor Md1+a voltage level of the second voltage supply line Vdd2+a voltage level of the threshold voltage Vth−a voltage level of the reference signal line Vref−a voltage level of the first voltage supply line Vdd1). A driving current I flowing through the driving transistor is expressed as $K^*(\text{Vgs}-\text{a voltage level of the threshold voltage Vth})^2$, which is equal to $K^*(\text{a voltage level of the data signal written to the gate electrode of the driving transistor Md1}+\text{a voltage level of the second voltage supply line Vdd2}-\text{a voltage level of the reference signal line Vref}-\text{a voltage level of the first voltage supply line Vdd1})^2$.

Referring to FIG. 3, FIG. 9, and FIG. 7A, in the non-compensation mode, a turning-on control signal is provided by the first light emitting control signal line em1 throughout a frame of image, a turning-off control signal is provided by the second light emitting control signal line em2 throughout the frame of image, and a turning-off control signal is provided by the second control signal line CS2 throughout the frame of image. Accordingly, in the non-compensation mode, the second transistor M2, the third transistor M3, and the first light emitting control transistor Ms1 are turned on throughout the frame of image. A second voltage supply signal passed through the sixth transistor M6, the second transistor M2, and the third transistor M3, and in turn to the first capacitor electrode of the second capacitor C2. A data signal is written to the second capacitor electrode of the second capacitor C2. The operation of the pixel driving circuit does not involve coupling the voltage level at the first capacitor electrode of the second capacitor C2 to the gate electrode of the driving transistor Md1, and does not include extraction of the threshold voltage Vth.

Referring to FIG. 3, FIG. 9, and FIG. 7B, in the non-compensation mode, a turning-on control signal is provided by the first light emitting control signal line em1 throughout a frame of image, a turning-off control signal is provided by the second light emitting control signal line em2 throughout the frame of image, a turning-off control signal is provided by the first control signal line CS1 throughout the frame of image, and a turning-on control signal is provided by the second control signal line CS2 throughout the frame of image. Accordingly, in the non-compensation mode, the third transistor M3, the fifth transistor M5, and the first light emitting control transistor Ms1 are turned on throughout the frame of image. The first transistor M1, the second transistor M2 and the fourth transistor M4 are turned off throughout the frame of image. The operation of the pixel driving circuit does not involve coupling the voltage level at the first capacitor electrode of the second capacitor C2 to the gate electrode of the driving transistor Md1, and does not include extraction of the threshold voltage Vth.

For illustration purpose only, FIG. 9 and FIG. 7A depict an example in which the third circuits are arranged in an array having two columns and two rows. However, the pixel driving circuit may include more than two columns and more than two rows, or only one column and only one row. FIG. 8 depict the operation of a pixel driving circuit in which the third circuits are arranged in an array having n rows. Referring to FIG. 8, the data writing step (t1 and t2 in FIG. 7A) may be reiterated until the process is complete for all of n rows of third circuits.

Figure 10:
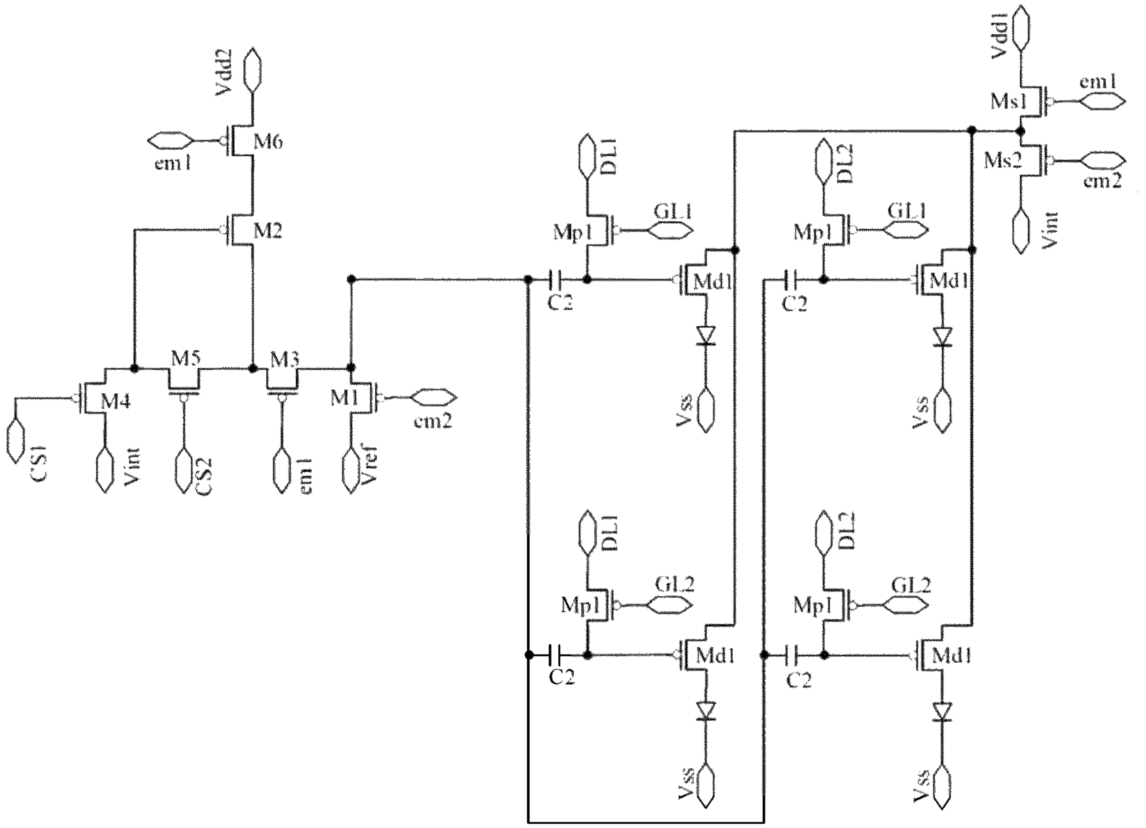
FIG. 10 is circuit diagram of a pixel driving circuit in some embodiments according to the present disclosure.

FIG. 10 is circuit diagram of a pixel driving circuit in some embodiments according to the present disclosure. The pixel driving circuit depicted in FIG. 10 differs from the pixel driving circuit depicted in FIG. 4 in that the first circuit does not include a first capacitor C1.

Figure 11:
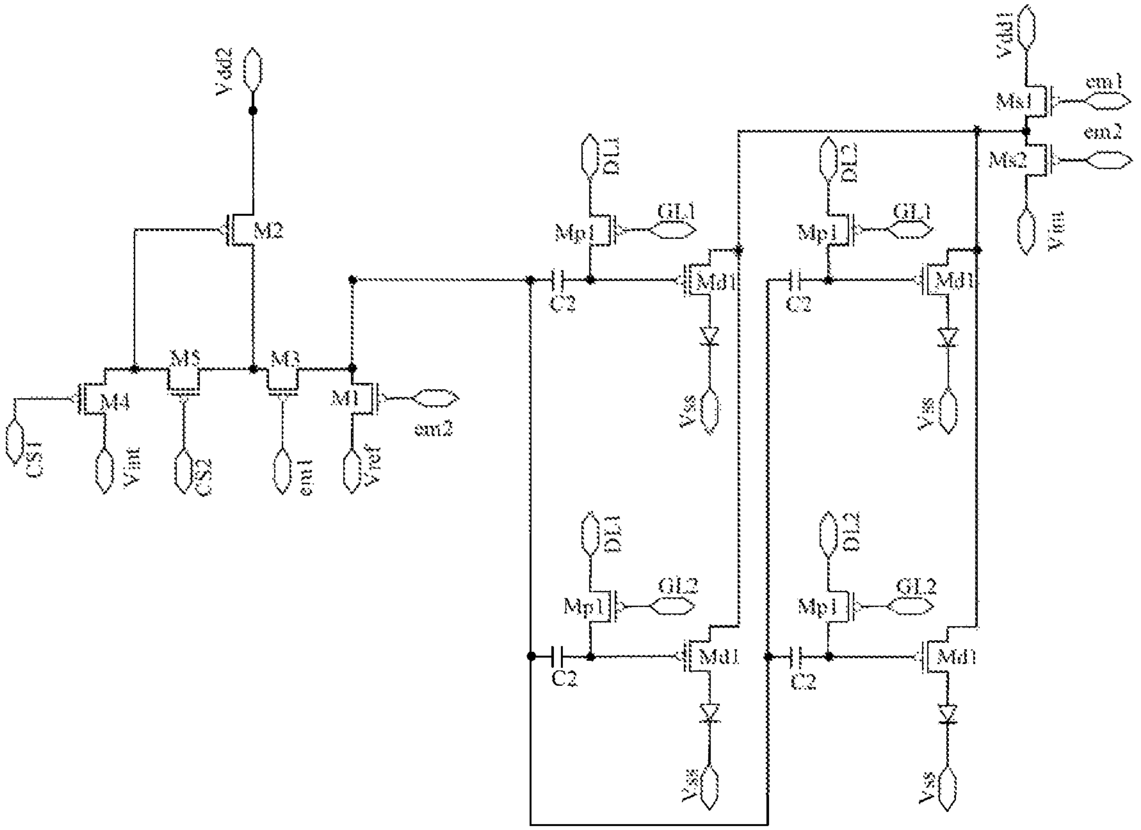
FIG. 11 is circuit diagram of a pixel driving circuit in some embodiments according to the present disclosure.

FIG. 11 is circuit diagram of a pixel driving circuit in some embodiments according to the present disclosure. The pixel driving circuit depicted in FIG. 11 differs from the pixel driving circuit depicted in FIG. 9 in that the first circuit does not include a first capacitor C1.

Figure 12:
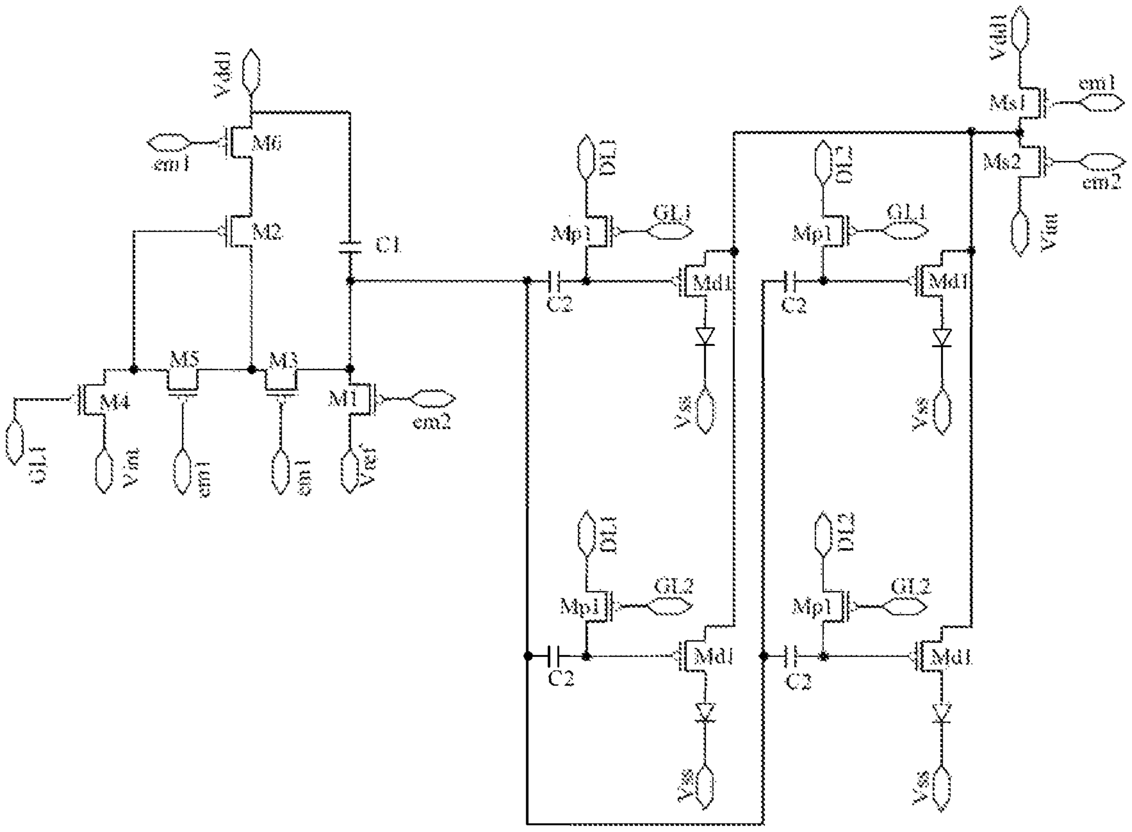
FIG. 12 is circuit diagram of a pixel driving circuit in some embodiments according to the present disclosure.

FIG. 12 is circuit diagram of a pixel driving circuit in some embodiments according to the present disclosure. The pixel driving circuit depicted in FIG. 12 differs from the pixel driving circuit depicted in FIG. 4 in that the gate electrode of the fourth transistor M4 is coupled to the first gate line GL1 (rather than to the first control signal line CS1), the gate electrode of the fifth transistor M5 is coupled to the first light emitting control signal line em1 (rather than to the second control signal line CS2), and the first electrode of the sixth transistor M6 is coupled to the first voltage supply line Vdd1 (rather than to the second voltage supply line Vdd2).

Figure 13:
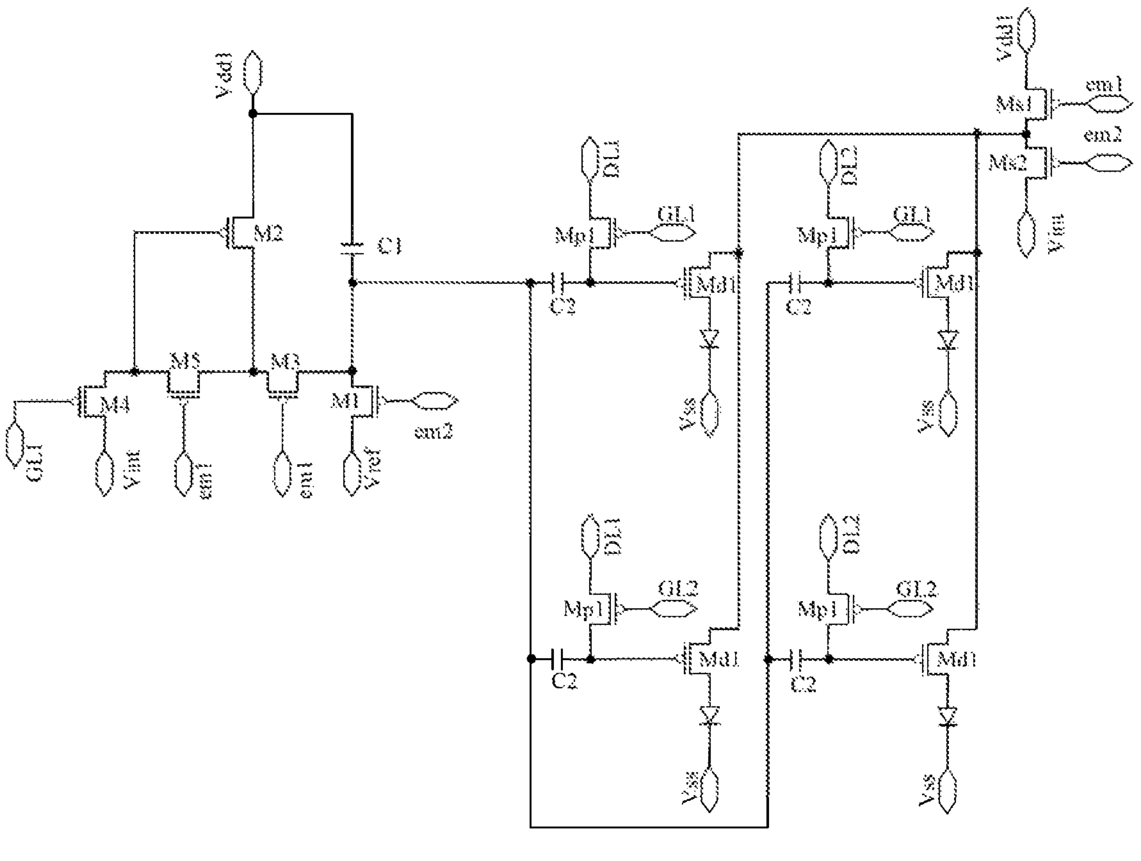
FIG. 13 is circuit diagram of a pixel driving circuit in some embodiments according to the present disclosure.

FIG. 13 is circuit diagram of a pixel driving circuit in some embodiments according to the present disclosure. The pixel driving circuit depicted in FIG. 13 differs from the pixel driving circuit depicted in FIG. 9 in that the gate electrode of the fourth transistor M4 is coupled to the first gate line GL1 (rather than to the first control signal line CS1), the gate electrode of the fifth transistor M5 is coupled to the first light emitting control signal line em1 (rather than to the second control signal line CS2), and the first electrode of the second transistor M2 is coupled to the first voltage supply line Vdd1 (rather than to the second voltage supply line Vdd2).

Figure 14:
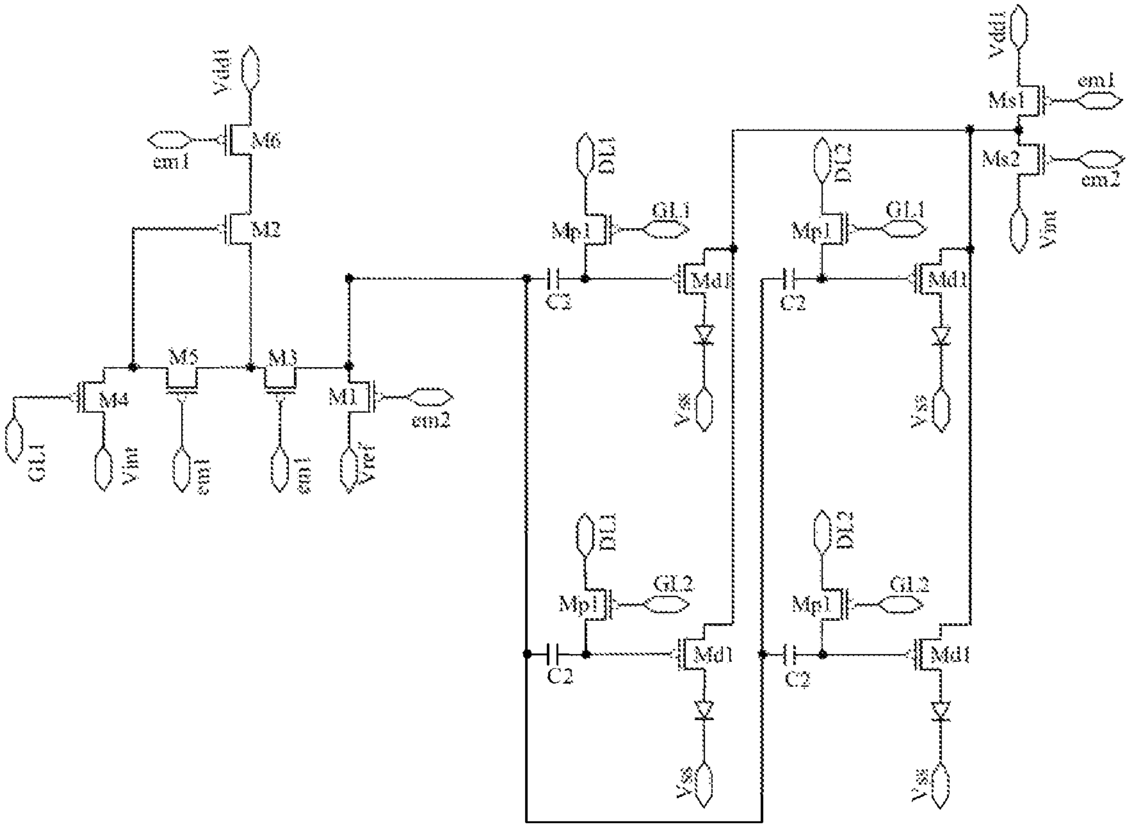
FIG. 14 is circuit diagram of a pixel driving circuit in some embodiments according to the present disclosure.

FIG. 14 is circuit diagram of a pixel driving circuit in some embodiments according to the present disclosure. The pixel driving circuit depicted in FIG. 14 differs from the pixel driving circuit depicted in FIG. 10 in that the gate electrode of the fourth transistor M4 is coupled to the first gate line GL1 (rather than to the first control signal line CS1), the gate electrode of the fifth transistor M5 is coupled to the first light emitting control signal line em1 (rather than to the second control signal line CS2), and the first electrode of the sixth transistor M6 is coupled to the first voltage supply line Vdd1 (rather than to the second voltage supply line Vdd2).

Figure 15:
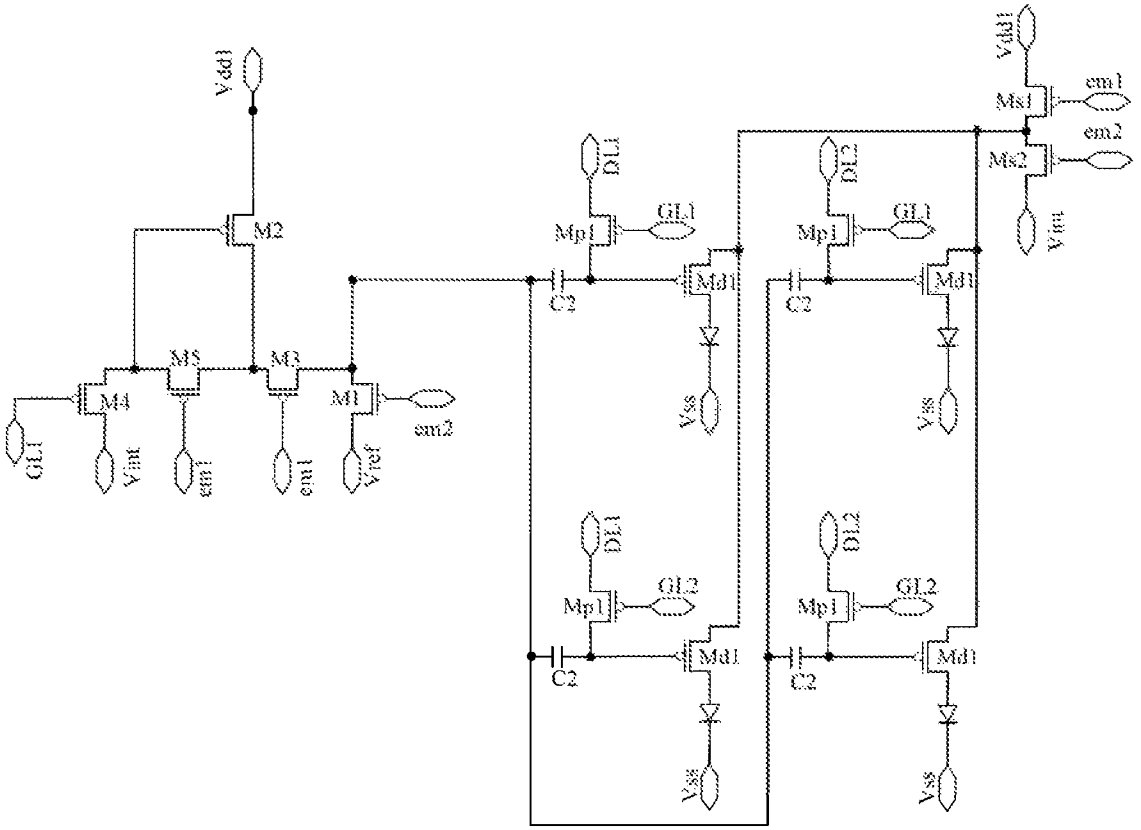
FIG. 15 is circuit diagram of a pixel driving circuit in some embodiments according to the present disclosure.

FIG. 15 is circuit diagram of a pixel driving circuit in some embodiments according to the present disclosure. The pixel driving circuit depicted in FIG. 15 differs from the pixel driving circuit depicted in FIG. 11 in that the gate electrode of the fourth transistor M4 is coupled to the first gate line GL1 (rather than to the first control signal line CS1), the gate electrode of the fifth transistor M5 is coupled to the first light emitting control signal line em1 (rather than to the second control signal line CS2), and the first electrode of the second transistor M2 is coupled to the first voltage supply line Vdd1 (rather than to the second voltage supply line Vdd2).

Figure 16:
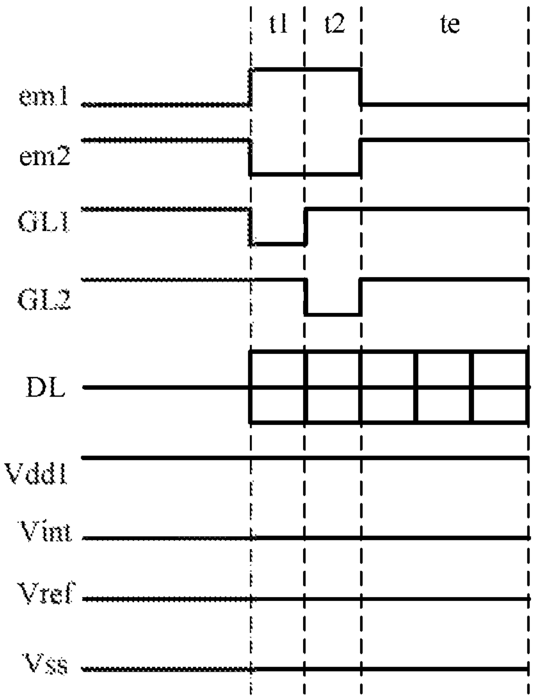
FIG. 16 is a timing diagram illustrating the operation of a pixel driving circuit in some embodiments according to the present disclosure.
Figure 17:
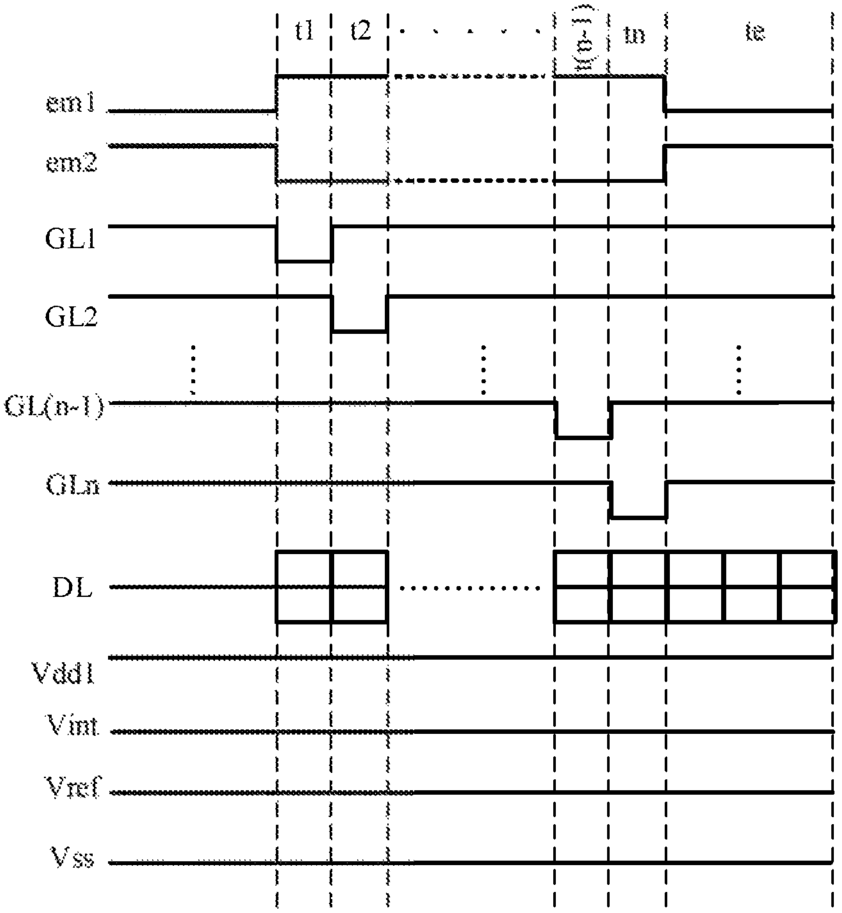
FIG. 17 is a timing diagram illustrating the operation of a pixel driving circuit in some embodiments according to the present disclosure.

FIG. 16 is a timing diagram illustrating the operation of a pixel driving circuit in some embodiments according to the present disclosure. FIG. 17 is a timing diagram illustrating the operation of a pixel driving circuit in some embodiments according to the present disclosure. FIG. 16 and FIG. 17 depict the operation in a compensation mode for the pixel driving circuit depicted in FIG. 12 to FIG. 15.

Figure 18:
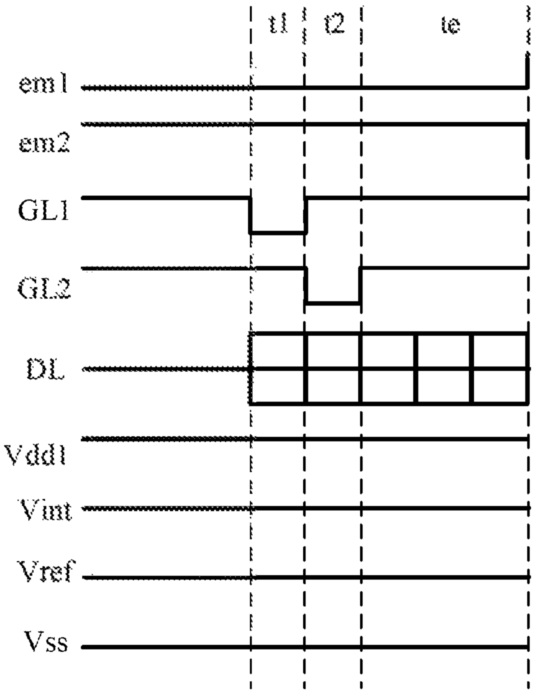
FIG. 18 is a timing diagram illustrating the operation of a pixel driving circuit in some embodiments according to the present disclosure.
Figure 19:
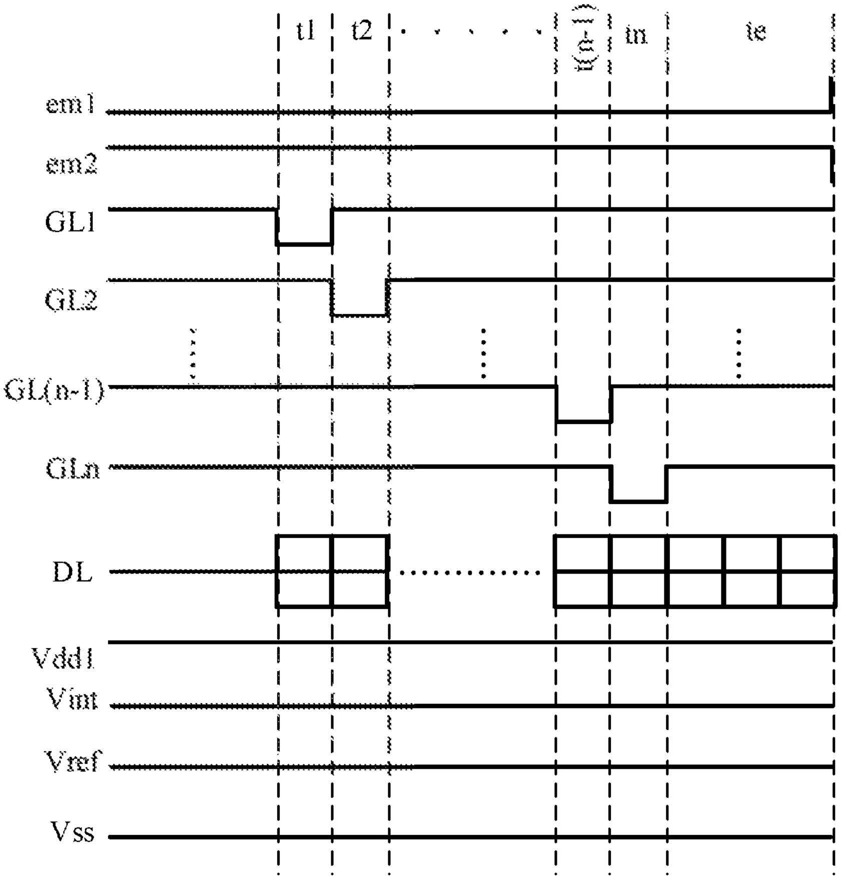
FIG. 19 is a timing diagram illustrating the operation of a pixel driving circuit in some embodiments according to the present disclosure.

FIG. 18 is a timing diagram illustrating the operation of a pixel driving circuit in some embodiments according to the present disclosure. FIG. 19 is a timing diagram illustrating the operation of a pixel driving circuit in some embodiments according to the present disclosure. FIG. 18 and FIG. 19 depict the operation in a non-compensation mode for the pixel driving circuit depicted in FIG. 12 to FIG. 15.

Referring to FIG. 12, FIG. 14, FIG. 16, and FIG. 17, during one frame of image, the operation of the pixel driving circuit includes a first t1, a second phase t2, and a light emission phase te. In some embodiments, in the first phase t1, a turning-on control signal is provided through the first gate line GL1 to the gate electrode of the fourth transistor M4 to turn on the fourth transistor M4, allowing an initialization voltage signal from the reset signal line Vint to pass from the first electrode of the fourth transistor M4 to the second electrode of the fourth transistor M4, and in turn to the gate electrode of the second transistor M2. The gate electrode of the second transistor M2 is initialized. A turning-off control signal is provided through the first light emitting control signal line em1 to the gate electrode of the fifth transistor M5, turning off the fifth transistor M5.

A turning-off control signal is provided through the first light emitting control signal line em1 to the gate electrodes of the third transistor M3, the sixth transistor M6, and the first light emitting control transistor Ms1, turning off the third transistor M3, the sixth transistor M6, and the first light emitting control transistor Ms1.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the respective third circuit. The reference signal from the reference signal line Vref is written to the first capacitor electrode of the second capacitor C2 in the respective third circuit, stabilizing the voltage level of the first capacitor electrode of the second capacitor C2 in the respective third circuit, preventing voltage level fluctuation at the gate electrode of the driving transistor Md1 when data signals are written into a third circuit in a row other than the row having the respective third circuit.

A turning-on control signal is provided through the respective gate line (e.g., the first gate line GL1 for the first row of third circuits) to the gate electrode of the data write transistor Mp1 in the respective third circuit, allowing a data signal from the respective data line (e.g., the first data line DL for the first column of third circuits) to pass from the first electrode of the data write transistor Mp1 to the second electrode of the data write transistor Mp1. The data signal is written to the gate electrode of the driving transistor Md1 in the respective third circuit.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the respective third circuit, preventing the driving transistor from abnormally turning on when the data signal is written to the gate electrode of the driving transistor Md1 in the respective third circuit.

In some embodiments, in the second phase t2, a turning-off control signal is provided through the first gate line GL1 to the gate electrode of the fourth transistor M4 to turn off the fourth transistor M4. The initialization of the gate electrode of the second transistor M2 is complete.

A turning-off control signal is provided through the first gate line GL1 to the gate electrode of the data write transistor Mp1 in the respective third circuit, to turn off the data write transistor Mp1 in the respective third circuit. The writing of the data signal to the gate electrode of the driving transistor Md1 in the respective third circuit is complete.

A turning-on control signal is provided through the second gate line GL2 to the gate electrode of the data write transistor Mp1 in a third circuit in a next row (e.g., a second row when the respective third circuit is in a first row), allowing a data signal from the second gate line GL2 to pass from the first electrode of the data write transistor Mp1 in the third circuit in the next row to the second electrode of the data write transistor Mp1 in the third circuit in the next row. The data signal is written to the gate electrode of the driving transistor Md1 in the third circuit in the next row.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the third circuit in the next row. The reference signal from the reference signal line Vref is written to the first capacitor electrode of the second capacitor C2 in the third circuit in the next row, stabilizing the voltage level of the first capacitor electrode of the second capacitor C2 in the third circuit in the next row, preventing voltage level fluctuation at the gate electrode of the driving transistor Md1 when data signals are written into a third circuit in a row other than the next row.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the third circuit in the next row, preventing the driving transistor from abnormally turning on when the data signal is written to the gate electrode of the driving transistor Md1 in the third circuit in the next row.

For illustration purpose only, FIG. 12, FIG. 14, and FIG. 16 depict an example in which the third circuits are arranged in an array having two columns and two rows. However, the pixel driving circuit may include more than two columns and more than two rows, or only one column and only one row.

FIG. 17 depict the operation of a pixel driving circuit in which the third circuits are arranged in an array having n rows. Referring to FIG. 17, the data writing step (t1 and t2 in FIG. 16) may be reiterated until the process is complete for all of n rows of third circuits. During one frame of image, the operation of the pixel driving circuit includes at least (n+1) number of phases, including a first phase t1, a second phase t2, a (n−1)-th phase t(n−1), an n-th phase tn, and a light emission phase te.

In some embodiments, in the light emission phase te, a turning-off control signal is provided through the first gate line GL1 to the gate electrode of the data write transistor Mp1 in the respective third circuit, to turn off the data write transistor Mp1 in the respective third circuit.

A turning-off control signal is provided through the second gate line GL2 to the gate electrode of the data write transistor Mp1 in the third circuit in the next row, to turn off the data write transistor Mp1 in the third circuit in the next row.

A turning-off control signal is provided through the (n−1)-th gate line GL(n−1) to the gate electrode of the data write transistor Mp1 in a third circuit in the (n−1)-th row, to turn off the data write transistor Mp1 in the third circuit in the (n−1)-th row.

A turning-off control signal is provided through the n-th gate line GLn to the gate electrode of the data write transistor Mp1 in a third circuit in the n-th row, to turn off the data write transistor Mp1 in the third circuit in the n-th row.

A turning-off control signal is provided through the second light emitting control signal line em2 to the gate electrode of the second light emitting control transistor Ms2, to turn off the second light emitting control transistor Ms2.

A turning-off control signal is provided through the second light emitting control signal line em2 to the gate electrode of the first transistor M1, to turn off the first transistor M1.

A turning-on control signal is provided through the first light emitting control signal line em1 to the gate electrode of the fifth transistor M5, to turn on the fifth transistor M5.

A turning-on control signal is provided through the first light emitting control signal line em1 to the gate electrode of the sixth transistor M6, to turn on the sixth transistor M6.

When the fifth transistor M5 and the sixth transistor M6 are turned on, a voltage level at the gate electrode and the second electrode (e.g., a drain electrode) of the second transistor M2 is (a voltage level of the first voltage supply line Vdd1+a voltage level of the threshold voltage Vth).

A turning-on control signal is provided through the first light emitting control signal line em1 to the gate electrode of the third transistor M3, to turn on the third transistor M3. Because the fifth transistor M5 and the third transistor M3 are turned on, the voltage level at the gate electrode and the second electrode of the second transistor M2 is written to the first capacitor electrode of the second capacitor C2. The voltage level at the first capacitor electrode of the second capacitor C2 is then coupled to the gate electrode of the driving transistor Md1. As a result, a voltage difference Vgs between the gate electrode and the first electrode of the driving transistor Md1 is expressed as (a voltage level of the data signal written to the gate electrode of the driving transistor Md1+a voltage level of the first voltage supply line Vdd1+a voltage level of the threshold voltage Vth−a voltage level of the reference signal line Vref−a voltage level of the first voltage supply line Vdd1)=(a voltage level of the data signal written to the gate electrode of the driving transistor Md1+a voltage level of the threshold voltage Vth−a voltage level of the reference signal line Vref). A driving current I flowing through the driving transistor is expressed as K*(Vgs−a voltage level of the threshold voltage Vth)$^2$, which is equal to K*(a voltage level of the data signal written to the gate electrode of the driving transistor Md1−a voltage level of the reference signal line Vref).

FIG. 18 shows an operation of a pixel driving circuit in a non-compensation mode. Referring to FIG. 12, FIG. 14, and FIG. 18, in the non-compensation mode, a turning-on control signal is provided by the first light emitting control signal line em1 throughout a frame of image, a turning-off control signal is provided by the second light emitting control signal line em2 throughout the frame of image. Accordingly, in the non-compensation mode, the second transistor M2, the third transistor M3, the sixth transistor M6, and the first light emitting control transistor Ms1 are turned on throughout the frame of image. A first voltage supply signal from the first voltage supply line Vdd1 passed through the sixth transistor M6, the second transistor M2, and the third transistor M3, and in turn to the first capacitor electrode of the second capacitor C2. A data signal is written to the second capacitor electrode of the second capacitor C2. The operation of the pixel driving circuit does not involve coupling the voltage level at the first capacitor electrode of the second capacitor C2 to the gate electrode of the driving transistor Md1, and does not include extraction of the threshold voltage Vth.

For illustration purpose only, FIG. 12, FIG. 14, and FIG. 18 depict an example in which the third circuits are arranged in an array having two columns and two rows. However, the pixel driving circuit may include more than two columns and more than two rows, or only one column and only one row.

FIG. 19 depict the operation of a pixel driving circuit in which the third circuits are arranged in an array having n rows. Referring to FIG. 19, the data writing step (11 and t2 in FIG. 18) may be reiterated until the process is complete for all of n rows of third circuits.

Referring to FIG. 13, FIG. 15, FIG. 16, and FIG. 17, during one frame of image in the compensation mode, the operation of the pixel driving circuit includes a first t1, a second phase t2, and a light emission phase te. In some embodiments, in the first phase t1, a turning-on control signal is provided through the first gate line GL1 to the gate electrode of the fourth transistor M4 to turn on the fourth transistor M4, allowing an initialization voltage signal from the reset signal line Vint to pass from the first electrode of the fourth transistor M4 to the second electrode of the fourth transistor M4; and in turn to the gate electrode of the second transistor M2. The gate electrode of the second transistor M2 is initialized. A turning-off control signal is provided through the first light emitting control signal line em1 to the gate electrode of the fifth transistor M5, turning off the fifth transistor M5.

A turning-off control signal is provided through the first light emitting control signal line em1 to the gate electrodes of the third transistor M3, and the first light emitting control transistor Ms1, turning off the third transistor M3, and the first light emitting control transistor Ms1.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the respective third circuit. The reference signal from the reference signal line Vref is written to the first capacitor electrode of the second capacitor C2 in the respective third circuit, stabilizing the voltage level of the first capacitor electrode of the second capacitor C2 in the respective third circuit, preventing voltage level fluctuation at the gate electrode of the driving transistor Md1 when data signals are written into a third circuit in a row other than the row having the respective third circuit.

A turning-on control signal is provided through the respective gate line (e.g., the first gate line GL1 for the first row of third circuits) to the gate electrode of the data write transistor Mp1 in the respective third circuit, allowing a data signal from the respective data line (e.g., the first data line DL for the first column of third circuits) to pass from the first electrode of the data write transistor Mp1 to the second electrode of the data write transistor Mp1. The data signal is written to the gate electrode of the driving transistor Md1 in the respective third circuit.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the respective third circuit, preventing the driving transistor from abnormally turning on when the data signal is written to the gate electrode of the driving transistor Md1 in the respective third circuit.

In some embodiments, in the second phase t2, a turning-off control signal is provided through the first gate line GL1 to the gate electrode of the fourth transistor M4 to turn off the fourth transistor M4. The initialization of the gate electrode of the second transistor M2 is complete.

A turning-off control signal is provided through the first gate line GL1 to the gate electrode of the data write transistor Mp1 in the respective third circuit, to turn off the data write transistor Mp1 in the respective third circuit. The writing of the data signal to the gate electrode of the driving transistor Md1 in the respective third circuit is complete.

A turning-on control signal is provided through the second gate line GL2 to the gate electrode of the data write transistor Mp1 in a third circuit in a next row (e.g., a second row when the respective third circuit is in a first row), allowing a data signal from the second gate line GL2 to pass from the first electrode of the data write transistor Mp1 in the third circuit in the next row to the second electrode of the data write transistor Mp1 in the third circuit in the next row. The data signal is written to the gate electrode of the driving transistor Md1 in the third circuit in the next row.

A turning-on control signal is provided through the second light emitting control signal line em2 to the gate electrode of the first transistor M1, allowing a reference signal from the reference signal line Vref to pass from the first electrode of the first transistor M1 to the second electrode of the first transistor M1; and in turn to the first capacitor electrode of the second capacitor C2 in the third circuit in the next row. The reference signal from the reference signal line Vref is written to the first capacitor electrode of the second capacitor C2 in the third circuit in the next row, stabilizing the voltage level of the first capacitor electrode of the second capacitor C2 in the third circuit in the next row, preventing voltage level fluctuation at the gate electrode of the driving transistor Md1 when data signals are written into a third circuit in a row other than the next row.

A turning-on control signal is provided through the second light emitting control signal line em2 to the gate electrode of the second light emitting control transistor Ms2, allowing an initialization voltage signal from the reset signal line Vint to pass from the first electrode of the second light emitting control transistor Ms2 to the second electrode of the second light emitting control transistor Ms2, and in turn to the first electrode of the driving transistor Md1 in the third circuit in the next row, preventing the driving transistor from abnormally turning on when the data signal is written to the gate electrode of the driving transistor Md1 in the third circuit in the next row.

For illustration purpose only, FIG. 13, FIG. 15, and FIG. 16 depict an example in which the third circuits are arranged in an array having two columns and two rows. However, the pixel driving circuit may include more than two columns and more than two rows, or only one column and only one row. FIG. 17 depict the operation of a pixel driving circuit in which the third circuits are arranged in an array having n rows. Referring to FIG. 17, the data writing step (t1 and t2 in FIG. 16) may be reiterated until the process is complete for all of n rows of third circuits. During one frame of image, the operation of the pixel driving circuit includes at least (n+1) number of phases, including a first phase t1, a second phase t2, a (n−1)-th phase t(n−1), an n-th phase in, and a light emission phase te.

In some embodiments, in the light emission phase te, a turning-off control signal is provided through the first gate line GL1 to the gate electrode of the data write transistor Mp1 in the respective third circuit, to turn off the data write transistor Mp1 in the respective third circuit.

A turning-off control signal is provided through the second gate line GL2 to the gate electrode of the data write transistor Mp1 in the third circuit in the next row, to turn off the data write transistor Mp1 in the third circuit in the next row.

A turning-off control signal is provided through the (n−1)-th gate line GL(n−1) to the gate electrode of the data write transistor Mp1 in a third circuit in the (n−1)-th row, to turn off the data write transistor Mp1 in the third circuit in the (n−1)-th row.

A turning-off control signal is provided through the n-th gate line GLn to the gate electrode of the data write transistor Mp1 in a third circuit in the n-th row, to turn off the data write transistor Mp1 in the third circuit in the n-th row.

A turning-off control signal is provided through the second light emitting control signal line em2 to the gate electrode of the second light emitting control transistor Ms2, to turn off the second light emitting control transistor Ms2.

A turning-off control signal is provided through the second light emitting control signal line em2 to the gate electrode of the first transistor M1, to turn off the first transistor M1.

A turning-on control signal is provided through the first light emitting control signal line em1 to the gate electrode of the fifth transistor M5, to turn on the fifth transistor M5.

When the fifth transistor M5 is turned on, a voltage level at the gate electrode and the second electrode (e.g., a drain electrode) of the second transistor M2 is (a voltage level of the first voltage supply line Vdd1+a voltage level of the threshold voltage Vth).

A turning-on control signal is provided through the first light emitting control signal line em1 to the gate electrode of the third transistor M3, to turn on the third transistor M3. Because the fifth transistor M5 and the third transistor M3 are turned on, the voltage level at the gate electrode and the second electrode of the second transistor M2 is written to the first capacitor electrode of the second capacitor C2. The voltage level at the first capacitor electrode of the second capacitor C2 is then coupled to the gate electrode of the driving transistor Md1. As a result, the voltage difference Vgs between the gate electrode and the first electrode of the driving transistor Md1 is expressed as (a voltage level of the data signal written to the gate electrode of the driving transistor Md1+a voltage level of the first voltage supply line Vdd1+a voltage level of the threshold voltage Vth−a voltage level of the reference signal line Vref−a voltage level of the first voltage supply line Vdd1)=(a voltage level of the data signal written to the gate electrode of the driving transistor Md1+a voltage level of the threshold voltage Vth−a voltage level of the reference signal line Vref). A driving current I flowing through the driving transistor is expressed as K*(Vgs−a voltage level of the threshold voltage Vth), which is equal to K*(a voltage level of the data signal written to the gate electrode of the driving transistor Md1−a voltage level of the reference signal line Vref)$^2$.

Referring to FIG. 3, FIG. 13, FIG. 15, and FIG. 18, in the non-compensation mode, a turning-on control signal is provided by the first light emitting control signal line em1 throughout a frame of image, a turning-off control signal is provided by the second light emitting control signal line em2 throughout the frame of image. Accordingly, in the non-compensation mode, the second transistor M2, the third transistor M3, and the first light emitting control transistor Ms1 are turned on throughout the frame of image. A first voltage supply signal from the first voltage supply line Vdd1 passed through the sixth transistor M6, the second transistor M2, and the third transistor M3, and in turn to the first capacitor electrode of the second capacitor C2. A data signal is written to the second capacitor electrode of the second capacitor C2. The operation of the pixel driving circuit does not involve coupling the voltage level at the first capacitor electrode of the second capacitor C2 to the gate electrode of the driving transistor Md1, and does not include extraction of the threshold voltage Vth.

For illustration purpose only, FIG. 13, FIG. 15, and FIG. 18 depict an example in which the third circuits are arranged in an array having two columns and two rows. However, the pixel driving circuit may include more than two columns and more than two rows, or only one column and only one row. FIG. 19 depict the operation of a pixel driving circuit in which the third circuits are arranged in an array having n rows. Referring to FIG. 19, the data writing step (t1 and t2 in FIG. 18) may be reiterated until the process is complete for all of n rows of third circuits.

Figure 20:
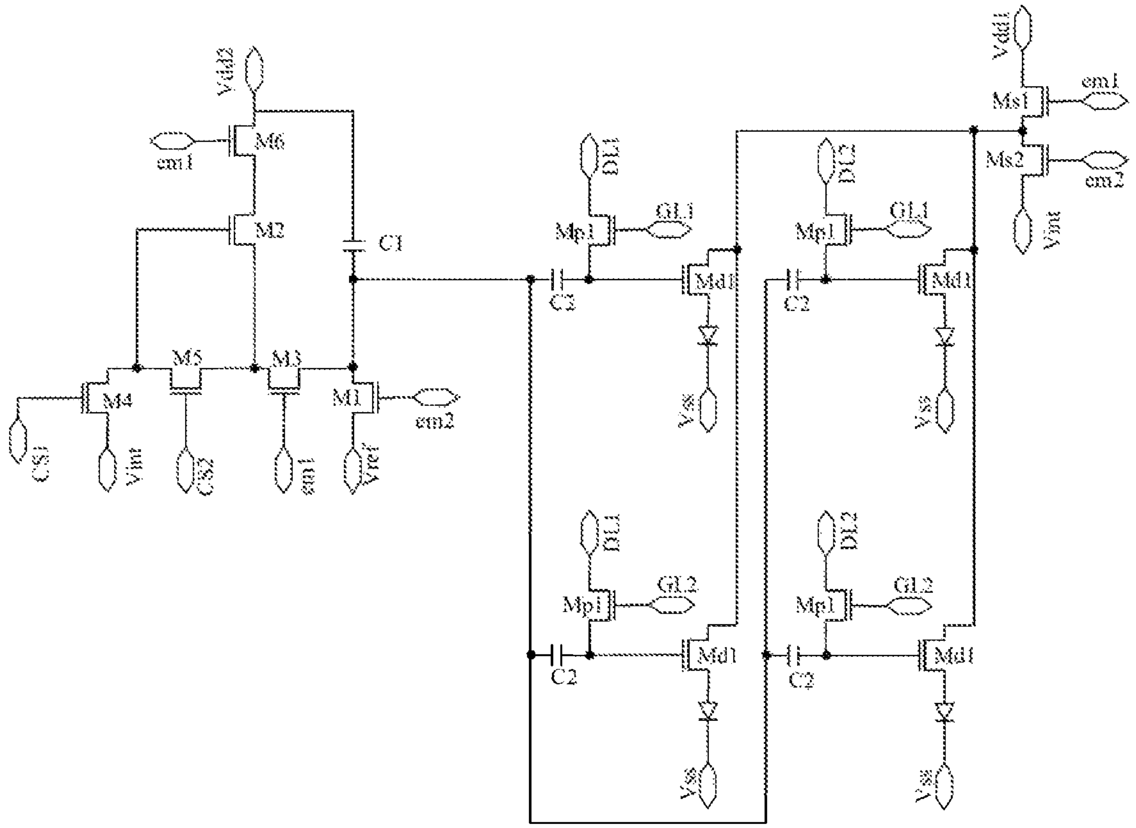
FIG. 20 is circuit diagram of a pixel driving circuit in some embodiments according to the present disclosure.

FIG. 20 is circuit diagram of a pixel driving circuit in some embodiments according to the present disclosure. The pixel driving circuit depicted in FIG. 20 differs from the pixel driving circuit depicted in FIG. 4 in that the transistors in the pixel driving circuit depicted in FIG. 20 are n-type transistors whereas the transistors in the pixel driving circuit depicted in FIG. 4 are p-type transistors.

Figure 21:
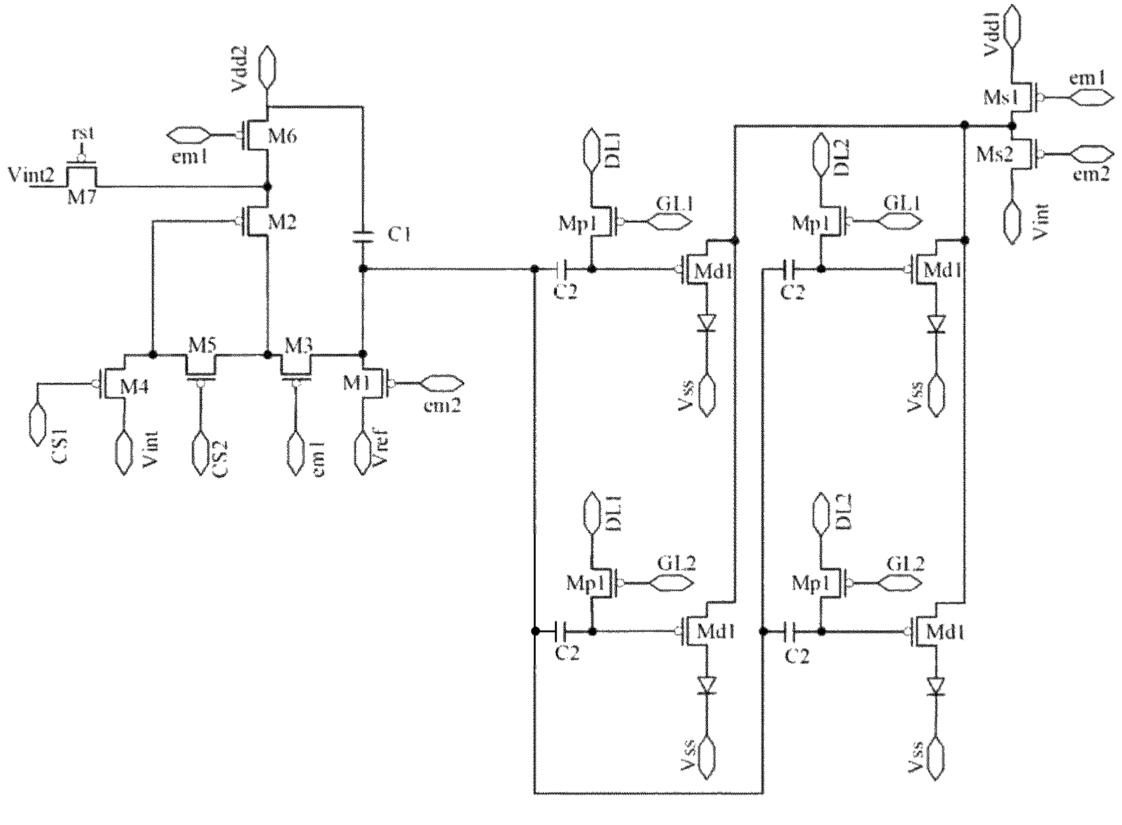
FIG. 21 is circuit diagram of a pixel driving circuit in some embodiments according to the present disclosure.

FIG. 21 is circuit diagram of a pixel driving circuit in some embodiments according to the present disclosure. Referring to FIG. 3 and FIG. 21, the first circuit Cir1 in some embodiments includes a first transistor M1, a second transistor M2, a third transistor M3, a fourth transistor M4, a fifth transistor M5, a sixth transistor M6, a seventh transistor M7, and a first capacitor C1.

In some embodiments, a gate electrode of the first transistor M1 is coupled to the second light emitting control signal line em2, a first electrode of the first transistor M1 is coupled to the reference signal line Vref, and a second electrode of the first transistor M1 is coupled to the second electrode of the third transistor M3 and a second capacitor electrode of the first capacitor C1.

In some embodiments, a gate electrode of the second transistor M2 is coupled to a second electrode of the fourth transistor M4 and a first electrode of the fifth transistor M5, a first electrode of the second transistor M2 is coupled to a second electrode of the sixth transistor M6 and a second electrode of the seventh transistor M7, and a second electrode of the second transistor M2 is coupled to a first electrode of the third transistor M3 and a second electrode of the fifth transistor M5.

In some embodiments, a gate electrode of the third transistor M3 is coupled to the first light emitting control signal line em1; a first electrode of the third transistor M3 is coupled to the second electrode of the second transistor M2 and a second electrode of the fifth transistor M5; and a second electrode of the third transistor M3 is coupled to the second electrode of the first transistor M1 and the second capacitor electrode of the first capacitor C1.

In some embodiments, a gate electrode of the fourth transistor M4 is coupled to a first control signal line CS1; a first electrode of the fourth transistor M4 is coupled to the reset signal line Vint; and a second electrode of the fourth transistor M4 is coupled to the gate electrode of the second transistor M2, and a first electrode of the fifth transistor M5.

In some embodiments, a gate electrode of the fifth transistor M5 is coupled to the second control signal line CS2, a first electrode of the fifth transistor M5 is coupled to the gate electrode of the second transistor M2 and the second electrode of the fourth transistor M4, and a second electrode of the fifth transistor M5 is coupled to the first electrode of the third transistor M3 and the second electrode of the second transistor M2.

In some embodiments, a gate electrode of the sixth transistor M6 is coupled to the first light emitting control signal line em1, a first electrode of the sixth transistor M6 is coupled to a second voltage supply line Vdd2, and a second electrode of the sixth transistor M6 is coupled to the first electrode of the second transistor M2.

In some embodiments, a gate electrode of the seventh transistor M7 is coupled to a reset control signal line rst, a first electrode of the seventh transistor M7 is coupled to a second reset signal line Vint2, and a second electrode of the seventh transistor M7 is coupled to the first electrode of the second transistor M2 and the second electrode of the sixth transistor M6. In one example, the reset control signal line rst is an independent signal line. In another example, the reset control signal line rst is the same as the first control signal line CS1. In another example, the reset control signal line rst is the same as the first gate line GL1. In one example, the second reset signal line Vint2 is an independent signal line. In another example, the second reset signal line Vint2 is the same as the reset signal line Vint.

In some embodiments, a first capacitor electrode of the first capacitor C1 is coupled to the first electrode of the sixth transistor M6 and the second voltage supply line Vdd2, and the second capacitor electrode of the first capacitor C1 is coupled to the second electrode of the first transistor M1 and the second electrode of the third transistor M3.

In some embodiments, the second capacitor electrode of the first capacitor C1, the second electrode of the first transistor M1, and the second electrode of the third transistor M3 are coupled to the respective third circuit. Optionally, the second capacitor electrode of the first capacitor C1, the second electrode of the first transistor M1, and the second electrode of the third transistor M3 are coupled to a first capacitor electrode of a second capacitor C2 of the respective third circuit.

The structures of the second circuit Cir2 and the one or more third circuit Cir3 of the pixel driving circuit depicted in FIG. 21 are largely similar to those depicted in FIG. 4.

Figure 22:
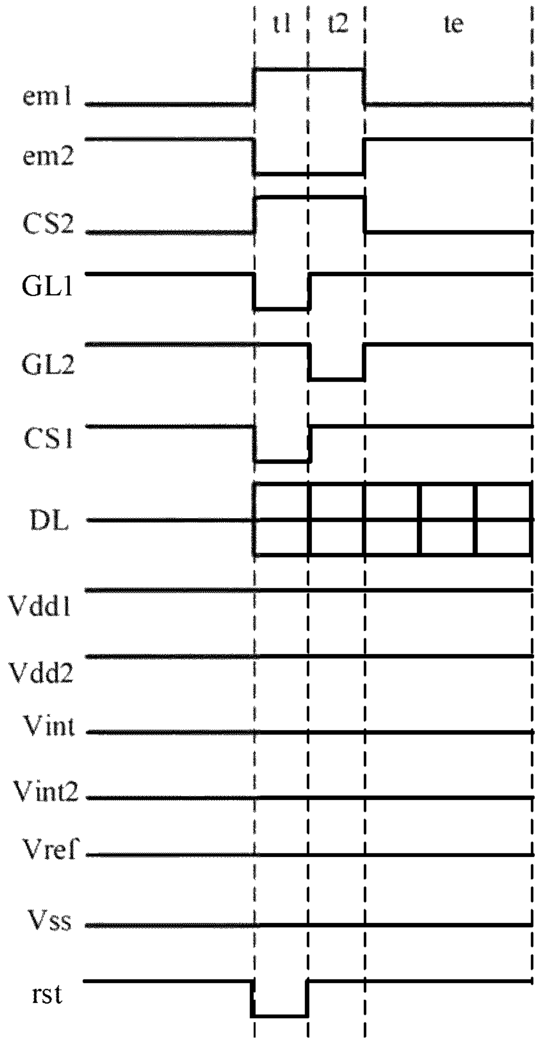
FIG. 22 is a timing diagram illustrating the operation of a pixel driving circuit in some embodiments according to the present disclosure.

FIG. 22 is a timing diagram illustrating the operation of a pixel driving circuit in some embodiments according to the present disclosure. Referring to FIG. 22, the operation of the pixel driving circuit depicted in FIG. 22 is largely similar to the operation of the pixel driving circuit depicted in FIG. 5 and FIG. 6. The operation of the pixel driving circuit depicted in FIG. 22 further includes the involvement of the reset control signal line rst. In some embodiments, in the first phase 11, a turning-on control signal is provided through the reset control signal line rst to the gate electrode of the seventh transistor M7 to turn on the seventh transistor M7, allowing an initialization voltage signal from a second reset signal line Vint2 to pass from the first electrode of the seventh transistor M7 to the second electrode of the seventh transistor M7; and in turn to the first electrode of the second transistor M2. The first electrode of the second transistor M2 is initialized. The inventors of the present disclosure discover that, by having the seventh transistor M7, the variation in the threshold voltage in a driving transistor in the one or more third circuits can be better compensated.

The operations of the pixel driving circuit in the second phase t2 and the light emission phase te depicted in FIG. 22 are largely similar to those depicted in FIG. 5 and FIG. 6.

Figure 23:
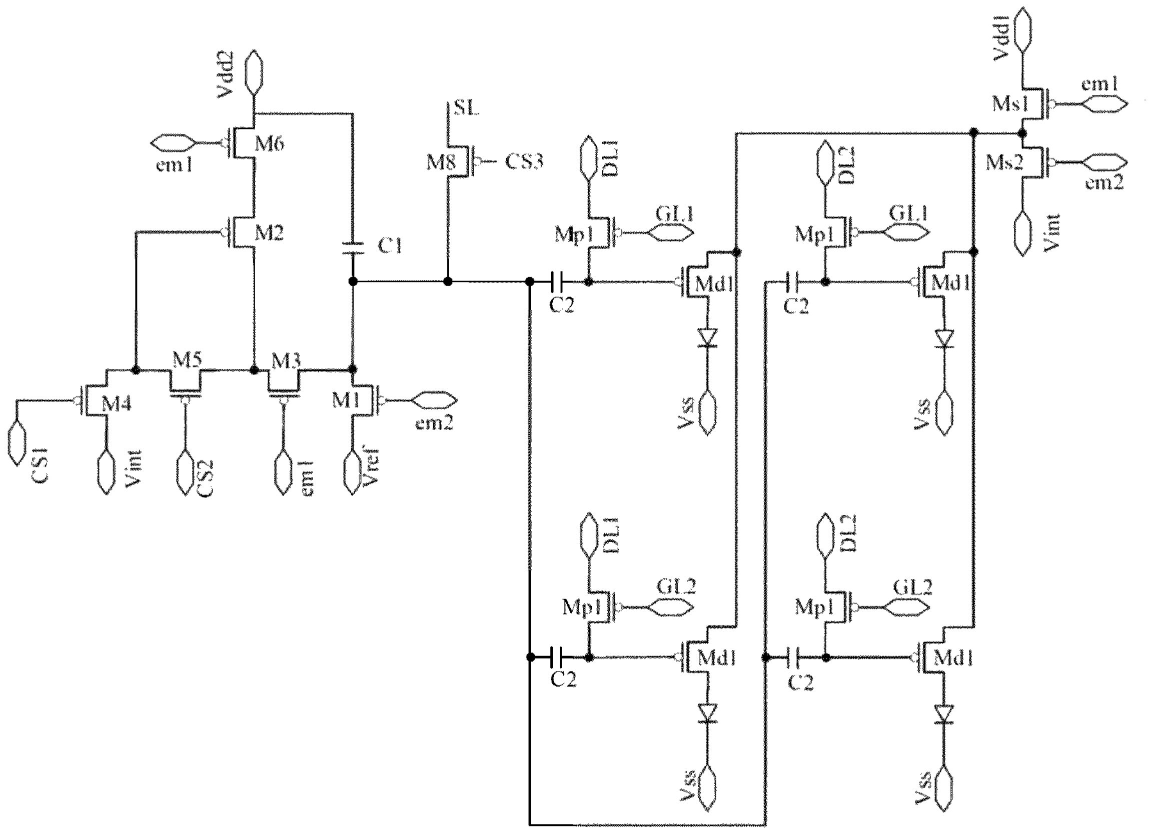
FIG. 23 is circuit diagram of a pixel driving circuit in some embodiments according to the present disclosure.

FIG. 23 is circuit diagram of a pixel driving circuit in some embodiments according to the present disclosure. Referring to FIG. 3 and FIG. 23, the first circuit Cir1 in some embodiments includes a first transistor M1, a second transistor M2, a third transistor M3, a fourth transistor M4, a fifth transistor M5, a sixth transistor M6, an eighth transistor M8, and a first capacitor C1.

In some embodiments, a gate electrode of the first transistor M1 is coupled to the second light emitting control signal line em2, a first electrode of the first transistor M1 is coupled to the reference signal line Vref, and a second electrode of the first transistor M1 is coupled to the second electrode of the third transistor M3 and a second capacitor electrode of the first capacitor C1.

In some embodiments, a gate electrode of the second transistor M2 is coupled to a second electrode of the fourth transistor M4 and a first electrode of the fifth transistor M5, a first electrode of the second transistor M2 is coupled to a second electrode of the sixth transistor M6, and a second electrode of the second transistor M2 is coupled to a first electrode of the third transistor M3 and a second electrode of the fifth transistor M5.

In some embodiments, a gate electrode of the third transistor M3 is coupled to the first light emitting control signal line em1; a first electrode of the third transistor M3 is coupled to the second electrode of the second transistor M2 and a second electrode of the fifth transistor M5; and a second electrode of the third transistor M3 is coupled to the second electrode of the first transistor M1 and the second capacitor electrode of the first capacitor C1.

In some embodiments, a gate electrode of the fourth transistor M4 is coupled to a first control signal line CS1; a first electrode of the fourth transistor M4 is coupled to the reset signal line Vint; and a second electrode of the fourth transistor M4 is coupled to the gate electrode of the second transistor M2, and a first electrode of the fifth transistor M5.

In some embodiments, agate electrode of the fifth transistor M5 is coupled to the second control signal line CS2, a first electrode of the fifth transistor M5 is coupled to the gate electrode of the second transistor M2 and the second electrode of the fourth transistor M4, and a second electrode of the fifth transistor M5 is coupled to the first electrode of the third transistor M3 and the second electrode of the second transistor M2.

In some embodiments, a gate electrode of the sixth transistor M6 is coupled to the first light emitting control signal line em1, a first electrode of the sixth transistor M6 is coupled to a second voltage supply line Vdd2, and a second electrode of the sixth transistor M6 is coupled to the first electrode of the second transistor M2.

In some embodiments, a first capacitor electrode of the first capacitor C1 is coupled to the first electrode of the sixth transistor M6 and the second voltage supply line Vdd2, and the second capacitor electrode of the first capacitor C1 is coupled to the second electrode of the first transistor M1 and the second electrode of the third transistor M3.

In some embodiments, the second capacitor electrode of the first capacitor C1, the second electrode of the first transistor M1, and the second electrode of the third transistor M3 are coupled to the respective third circuit. Optionally, the second capacitor electrode of the first capacitor C1, the second electrode of the first transistor M1, and the second electrode of the third transistor M3 are coupled to a first capacitor electrode of a second capacitor C2 of the respective third circuit.

In some embodiments, a gate electrode of the eighth transistor M8 is coupled to a third control signal line CS3; a first electrode of the eighth transistor M8 is coupled to the first capacitor electrode of the first capacitor C1 and the second electrodes of the first transistor M1 and the third transistor M3; and a second electrode of the eighth transistor M8 is coupled to a sense line SL. The sense line SL is coupled to an external compensation circuit configured to further compensate the variation in the threshold voltage in a driving transistor in the one or more third circuits. The inventors of the present disclosure discover that, by having the eighth transistor M8 coupled to the external compensation circuit, the variation in the threshold voltage in a driving transistor in the one or more third circuits can be better compensated. In one example, the third control signal line CS3 is an independent signal line. In another example, the third control signal line CS3 is the same as the second light emitting control signal line em2.

The structures of the second circuit Cir2 and the one or more third circuit Cir3 of the pixel driving circuit depicted in FIG. 23 are largely similar to those depicted in FIG. 4.

Figure 24:
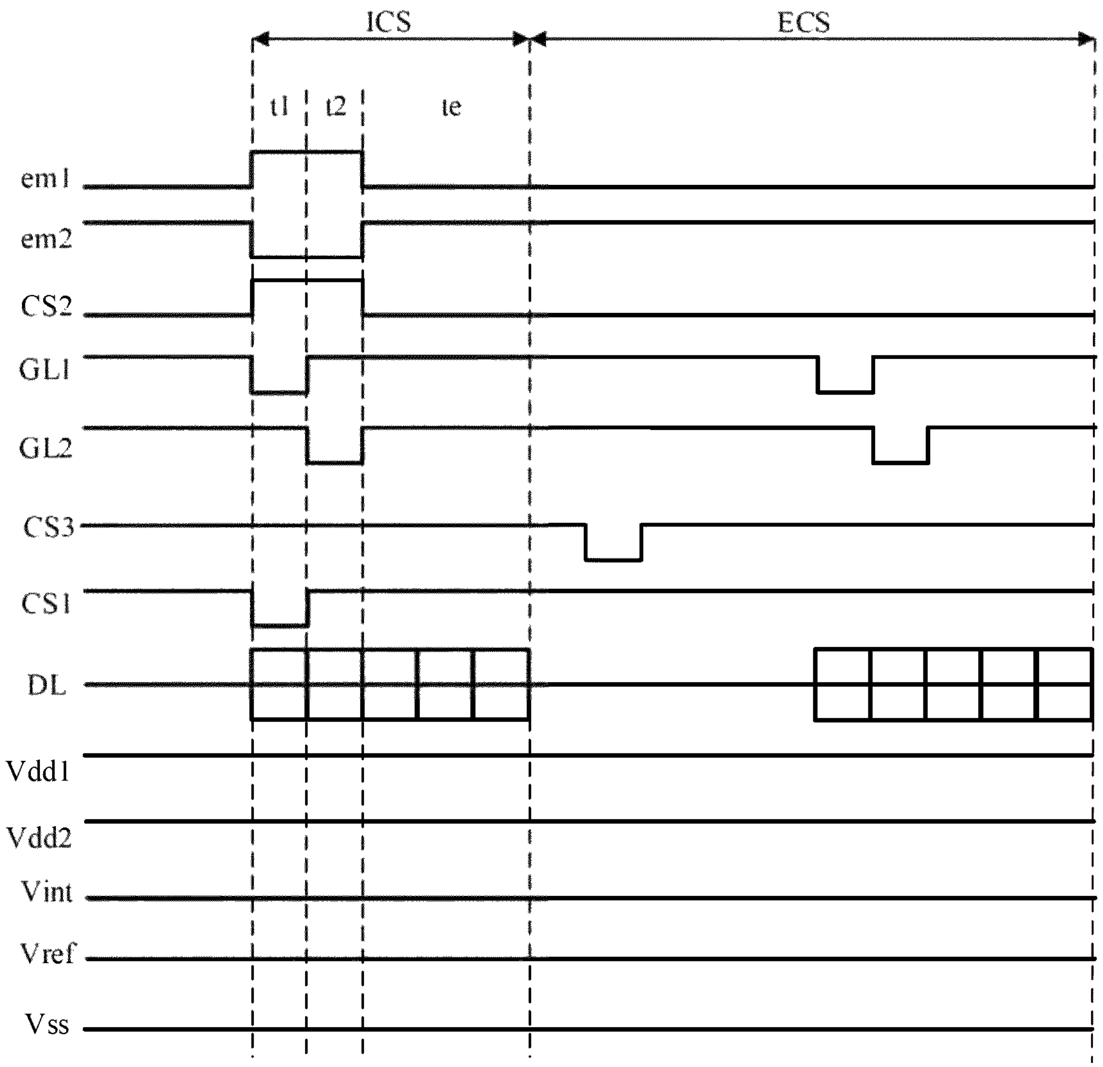
FIG. 24 is a timing diagram illustrating the operation of a pixel driving circuit in some embodiments according to the present disclosure.

FIG. 24 is a timing diagram illustrating the operation of a pixel driving circuit in some embodiments according to the present disclosure. Referring to FIG. 24, the operation of the pixel driving circuit includes an internal compensation stage ICS and an external compensation stage ECS. The operation of the pixel driving circuit in the internal compensation stage ICS depicted in FIG. 24 is largely similar to those depicted in FIG. 5 and FIG. 6. The operation of the pixel driving circuit depicted in FIG. 24 further includes the involvement of the third control signal line CS3. Referring to FIG. 24, in some embodiments, in the external compensation stage, a turning-on control signal is provided through the third control signal line CS3 to the gate electrode of the eighth transistor M8 to turn on the eighth transistor M8, allowing a voltage signal at the first capacitor electrode of the first capacitor C1 and the second electrodes of the first transistor M1 and the third transistor M3 to pass from the first electrode of the eighth transistor M8 to the second electrode of the eighth transistor M8; and in turn to the external compensation circuit. The inventors of the present disclosure discover that, by having the eighth transistor M8, the variation in the threshold voltage in a driving transistor in the one or more third circuits can be better compensated.

Figure 25:
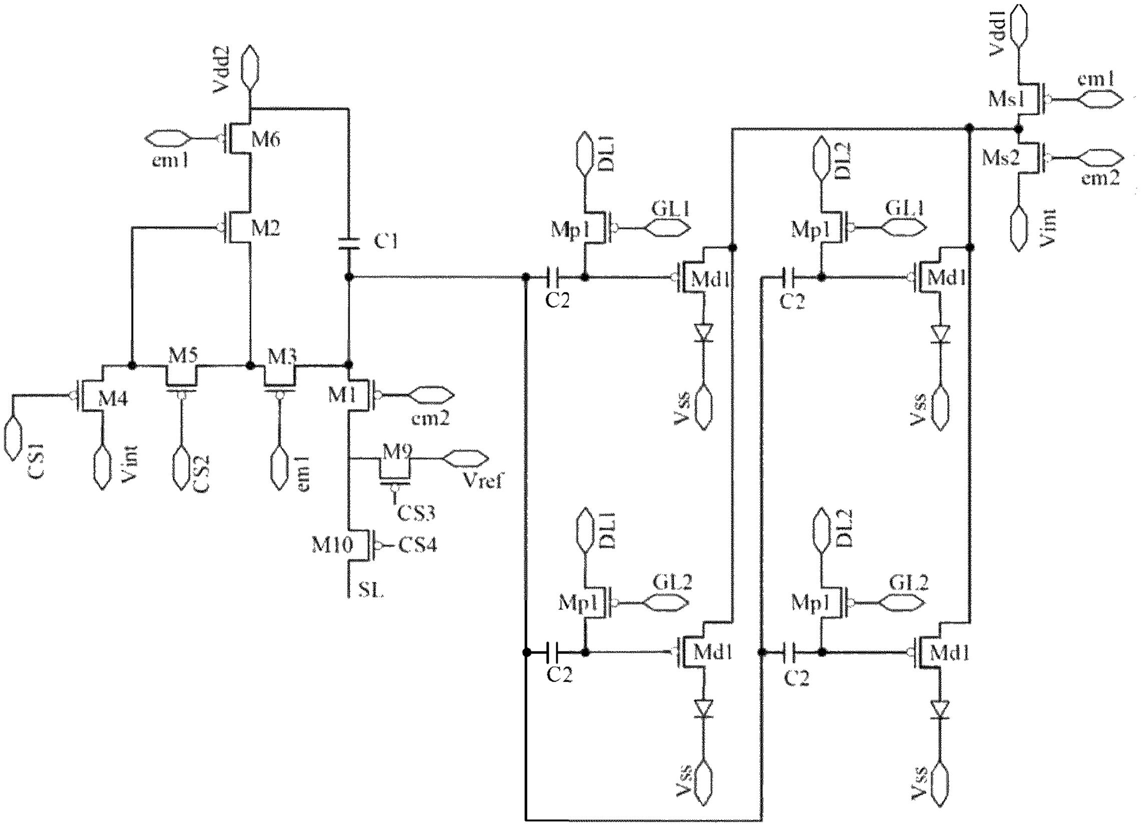
FIG. 25 is circuit diagram of a pixel driving circuit in some embodiments according to the present disclosure.

FIG. 25 is circuit diagram of a pixel driving circuit in some embodiments according to the present disclosure. Referring to FIG. 3 and FIG. 25, the first circuit Cir1 in some embodiments includes a first transistor M1, a second transistor M2, a third transistor M3, a fourth transistor M4, a fifth transistor M5, a sixth transistor M6, a ninth transistor M9, a tenth transistor M10, and a first capacitor C1.

In some embodiments, a gate electrode of the first transistor M1 is coupled to the second light emitting control signal line em2, a first electrode of the first transistor M1 is coupled to the reference signal line Vref, and a second electrode of the first transistor M1 is coupled to the second electrode of the third transistor M3 and a second capacitor electrode of the first capacitor C1.

In some embodiments, a gate electrode of the second transistor M2 is coupled to a second electrode of the fourth transistor M4 and a first electrode of the fifth transistor M5, a first electrode of the second transistor M2 is coupled to a second electrode of the sixth transistor M6, and a second electrode of the second transistor M2 is coupled to a first electrode of the third transistor M3 and a second electrode of the fifth transistor M5.

In some embodiments, a gate electrode of the third transistor M3 is coupled to the first light emitting control signal line em1; a first electrode of the third transistor M3 is coupled to the second electrode of the second transistor M2 and a second electrode of the fifth transistor M5; and a second electrode of the third transistor M3 is coupled to the second electrode of the first transistor M1 and the second capacitor electrode of the first capacitor C1.

In some embodiments, a gate electrode of the fourth transistor M4 is coupled to a first control signal line CS1; a first electrode of the fourth transistor M4 is coupled to the reset signal line Vint; and a second electrode of the fourth transistor M4 is coupled to the gate electrode of the second transistor M2, and a first electrode of the fifth transistor M5.

In some embodiments, agate electrode of the fifth transistor M5 is coupled to the second control signal line CS2, a first electrode of the fifth transistor M5 is coupled to the gate electrode of the second transistor M2 and the second electrode of the fourth transistor M4, and a second electrode of the fifth transistor M5 is coupled to the first electrode of the third transistor M3 and the second electrode of the second transistor M2.

In some embodiments, a gate electrode of the sixth transistor M6 is coupled to the first light emitting control signal line em1, a first electrode of the sixth transistor M6 is coupled to a second voltage supply line Vdd2, and a second electrode of the sixth transistor M6 is coupled to the first electrode of the second transistor M2.

In some embodiments, a first capacitor electrode of the first capacitor C1 is coupled to the first electrode of the sixth transistor M6 and the second voltage supply line Vdd2, and the second capacitor electrode of the first capacitor C1 is coupled to the second electrode of the first transistor M1 and the second electrode of the third transistor M3.

In some embodiments, the second capacitor electrode of the first capacitor C1, the second electrode of the first transistor M1, and the second electrode of the third transistor M3 are coupled to the respective third circuit. Optionally, the second capacitor electrode of the first capacitor C1, the second electrode of the first transistor M1, and the second electrode of the third transistor M3 are coupled to a first capacitor electrode of a second capacitor C2 of the respective third circuit.

In some embodiments, a gate electrode of the ninth transistor M9 is coupled to a third control signal line CS3, a first electrode of the ninth transistor M9 is coupled to a reference signal line Vref, and a second electrode of the ninth transistor M9 is coupled to the first electrode of the first transistor M1 and a first electrode of the tenth transistor M10. In one example, the third control signal line CS3 is an independent signal line. In another example, the third control signal line CS3 is the same as a fourth control signal line CS4. In another example, the third control signal line CS3 is the same as the second light emitting control signal line em2.

In some embodiments, a gate electrode of the tenth transistor M10 is coupled to a fourth control signal line CS4, a first electrode of the tenth transistor M10 is coupled to the first electrode of the first transistor M1 and the second electrode of the ninth transistor M9, and a second electrode of the tenth transistor M10 is coupled to a sense line SL. The sense line SL is coupled to an external compensation circuit configured to further compensate the variation in the threshold voltage in a driving transistor in the one or more third circuits. In one example, the fourth control signal line CS4 is an independent signal line. In another example, the fourth control signal line CS4 is the same as the third control signal line CS3. In another example, the fourth control signal line CS4 is the same as the second light emitting control signal line em2. In another example, the third control signal line CS3, the fourth control signal line CS4, and the second light emitting control signal line em2 are a same signal line.

The inventors of the present disclosure discover that, by having the ninth transistor M9, and the tenth transistor M10 coupled to the external compensation circuit, the variation in the threshold voltage in a driving transistor in the one or more third circuits can be better compensated.

The structures of the second circuit Cir2 and the one or more third circuit Cir3 of the pixel driving circuit depicted in FIG. 25 are largely similar to those depicted in FIG. 4.

Figure 26:
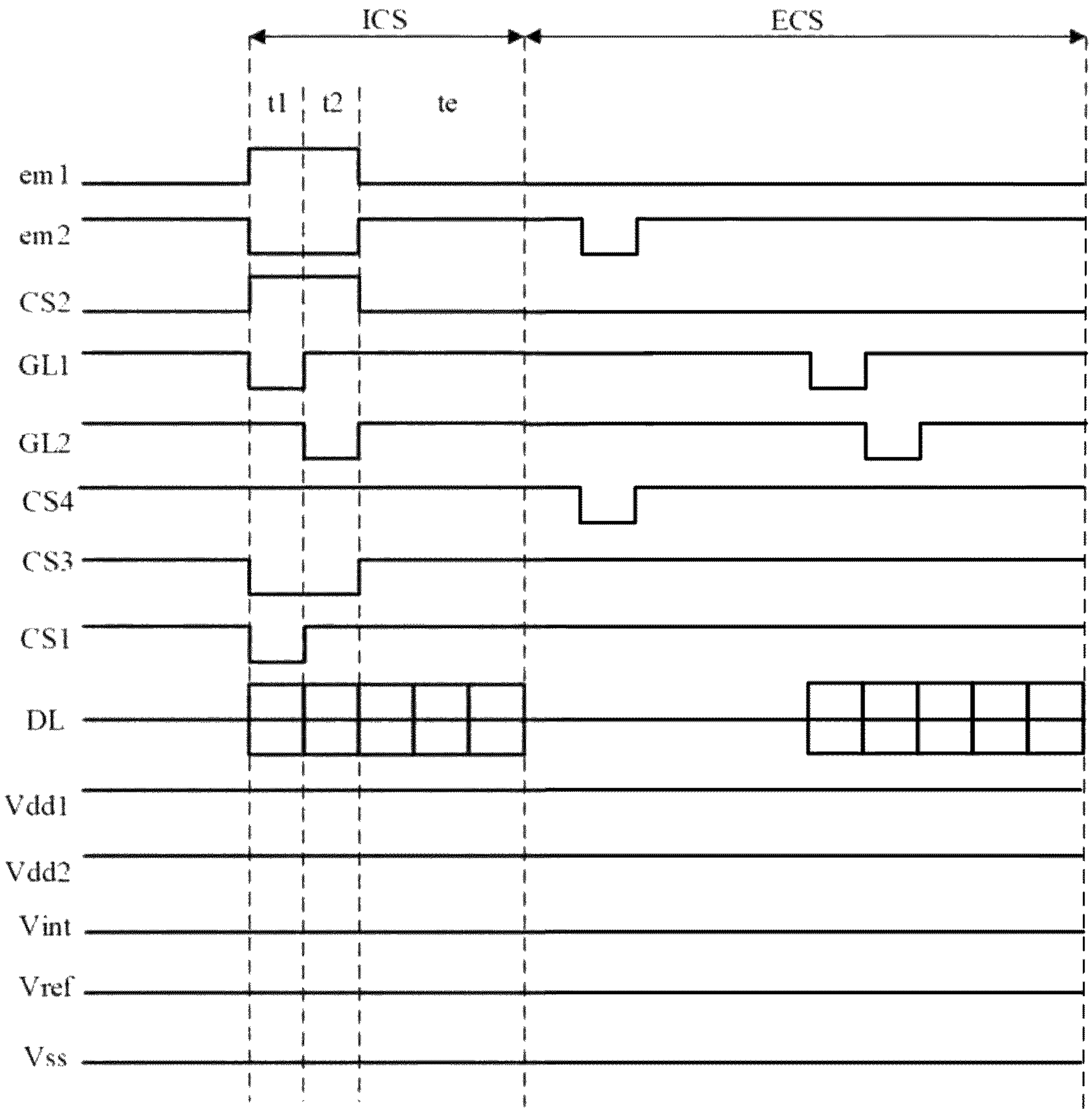
FIG. 26 is a timing diagram illustrating the operation of a pixel driving circuit in some embodiments according to the present disclosure.

FIG. 26 is a timing diagram illustrating the operation of a pixel driving circuit in some embodiments according to the present disclosure. Referring to FIG. 24, the operation of the pixel driving circuit includes an internal compensation stage ICS and an external compensation stage ECS. The operation of the pixel driving circuit in the internal compensation stage ICS depicted in FIG. 26 is largely similar to those depicted in FIG. 5 and FIG. 6. The operation of the pixel driving circuit depicted in FIG. 26 further includes the involvement of the third control signal line CS3 and the fourth control signal line CS4. Referring to FIG. 26, in some embodiments, in the first phase t1 or the second phase t2 in the internal compensation stage ICS, a turning-on control signal is provided through the third control signal line CS3 to the gate electrode of the ninth transistor M9 to turn on the ninth transistor M9, allowing a reference signal to pass from the first electrode of the ninth transistor M9 to the second electrode of the ninth transistor M9; and in turn to the first electrode of the first transistor M1.

In the first phase 11 or the second phase t2 in the internal compensation stage ICS, a turning-on control signal is provided through the second light emitting control signal em2 to the gate electrode of the first transistor M1 to turn on the first transistor M1, allowing the reference signal to pass from the first electrode of the first transistor M1 to the second electrode of the first transistor M1; and in turn to the first capacitor electrode of the second capacitor C2 in a third circuit (e.g., a third circuit in the present row with respect to the first phase t1 or a third circuit in the next row with respect to the second phase t2).

In the external compensation stage ECS, a turning-on control signal is provided through the fourth control signal line CS4 to the gate electrode of the tenth transistor M10 to turn on the tenth transistor M10, allowing a voltage signal at the first electrode of the first transistor M1 (which maintain a voltage level of a voltage signal at the first capacitor electrode of the first capacitor C1 and the second electrodes of the first transistor M1 and the third transistor M3 in the internal compensation stage ICS) to pass from the first electrode of the tenth transistor M10 to the second electrode of the tenth transistor M10; and in turn to the external compensation circuit. The inventors of the present disclosure discover that, by having the tenth transistor M10, the variation in the threshold voltage in a driving transistor in the one or more third circuits can be better compensated.

Figure 27:
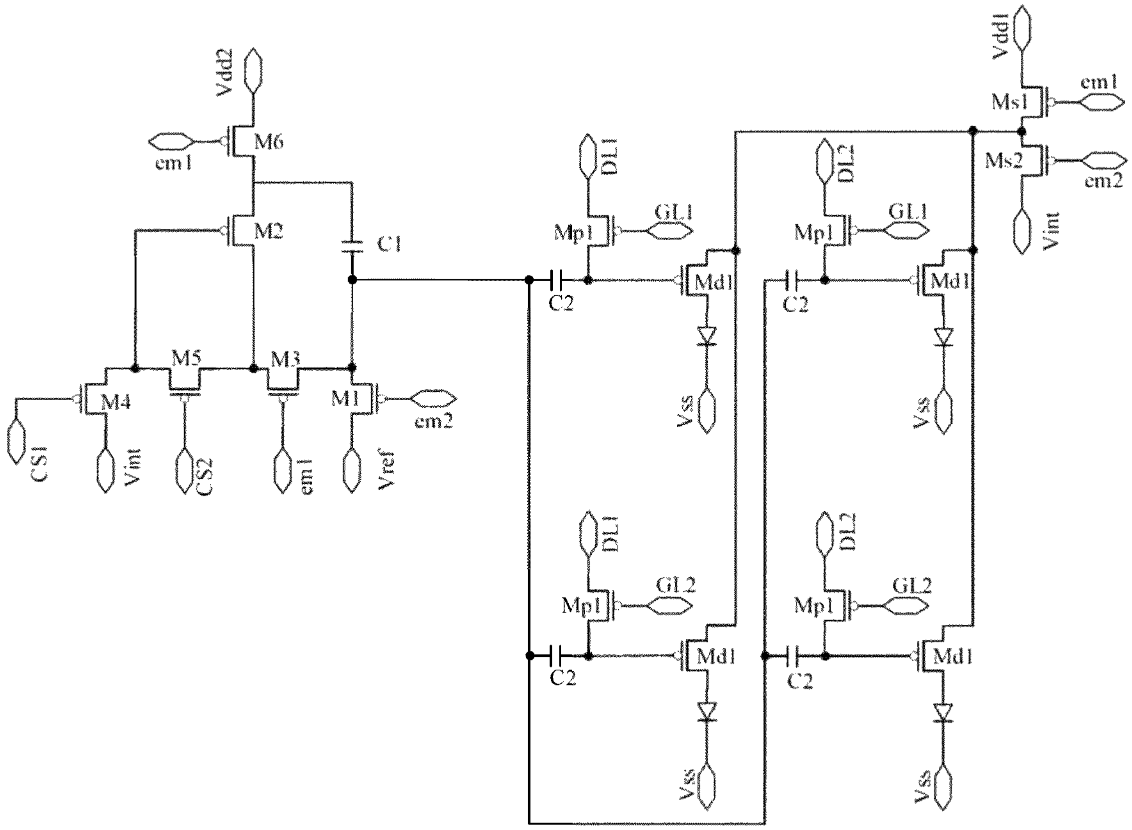
FIG. 27 is circuit diagram of a pixel driving circuit in some embodiments according to the present disclosure.

FIG. 27 is circuit diagram of a pixel driving circuit in some embodiments according to the present disclosure. Referring to FIG. 3 and FIG. 27, the first circuit Cir1 in some embodiments includes a first transistor M1, a second transistor M2, a third transistor M3, a fourth transistor M4, a fifth transistor M5, a sixth transistor M6, and a first capacitor C1.

In some embodiments, a gate electrode of the first transistor M1 is coupled to the second light emitting control signal line em2, a first electrode of the first transistor M1 is coupled to the reference signal line Vref, and a second electrode of the first transistor M1 is coupled to the second electrode of the third transistor M3 and a second capacitor electrode of the first capacitor C1.

In some embodiments, a gate electrode of the second transistor M2 is coupled to a second electrode of the fourth transistor M4 and a first electrode of the fifth transistor M5, a first electrode of the second transistor M2 is coupled to a second electrode of the sixth transistor M6, and a second electrode of the second transistor M2 is coupled to a first electrode of the third transistor M3 and a second electrode of the fifth transistor M5.

In some embodiments, a gate electrode of the third transistor M3 is coupled to the first light emitting control signal line em1; a first electrode of the third transistor M3 is coupled to the second electrode of the second transistor M2 and a second electrode of the fifth transistor M5; and a second electrode of the third transistor M3 is coupled to the second electrode of the first transistor M1 and the second capacitor electrode of the first capacitor C1.

In some embodiments, a gate electrode of the fourth transistor M4 is coupled to a first control signal line CS1; a first electrode of the fourth transistor M4 is coupled to the reset signal line Vint; and a second electrode of the fourth transistor M4 is coupled to the gate electrode of the second transistor M2, and a first electrode of the fifth transistor M5.

In some embodiments, a gate electrode of the fifth transistor M5 is coupled to the second control signal line CS2, a first electrode of the fifth transistor M5 is coupled to the gate electrode of the second transistor M2 and the second electrode of the fourth transistor M4, and a second electrode of the fifth transistor M5 is coupled to the first electrode of the third transistor M3 and the second electrode of the second transistor M2.

In some embodiments, a gate electrode of the sixth transistor M6 is coupled to the first light emitting control signal line em1, a first electrode of the sixth transistor M6 is coupled to a second voltage supply line Vdd2, and a second electrode of the sixth transistor M6 is coupled to the first electrode of the second transistor M2.

In some embodiments, a first capacitor electrode of the first capacitor C1 is coupled to the second electrode of the sixth transistor M6 and the first electrode of the second transistor M2, and the second capacitor electrode of the first capacitor C1 is coupled to the second electrode of the first transistor M1 and the second electrode of the third transistor M3.

In some embodiments, the second capacitor electrode of the first capacitor C1, the second electrode of the first transistor M1, and the second electrode of the third transistor M3 are coupled to the respective third circuit. Optionally, the second capacitor electrode of the first capacitor C1, the second electrode of the first transistor M1, and the second electrode of the third transistor M3 are coupled to a first capacitor electrode of a second capacitor C2 of the respective third circuit.

The structures of the second circuit Cir2 and the one or more third circuit Cir3 of the pixel driving circuit depicted in FIG. 27 are largely similar to those depicted in FIG. 4. The operations of the pixel driving circuit depicted in FIG. 27 are largely similar to those depicted in FIG. 5 and FIG. 6.

Figure 28:
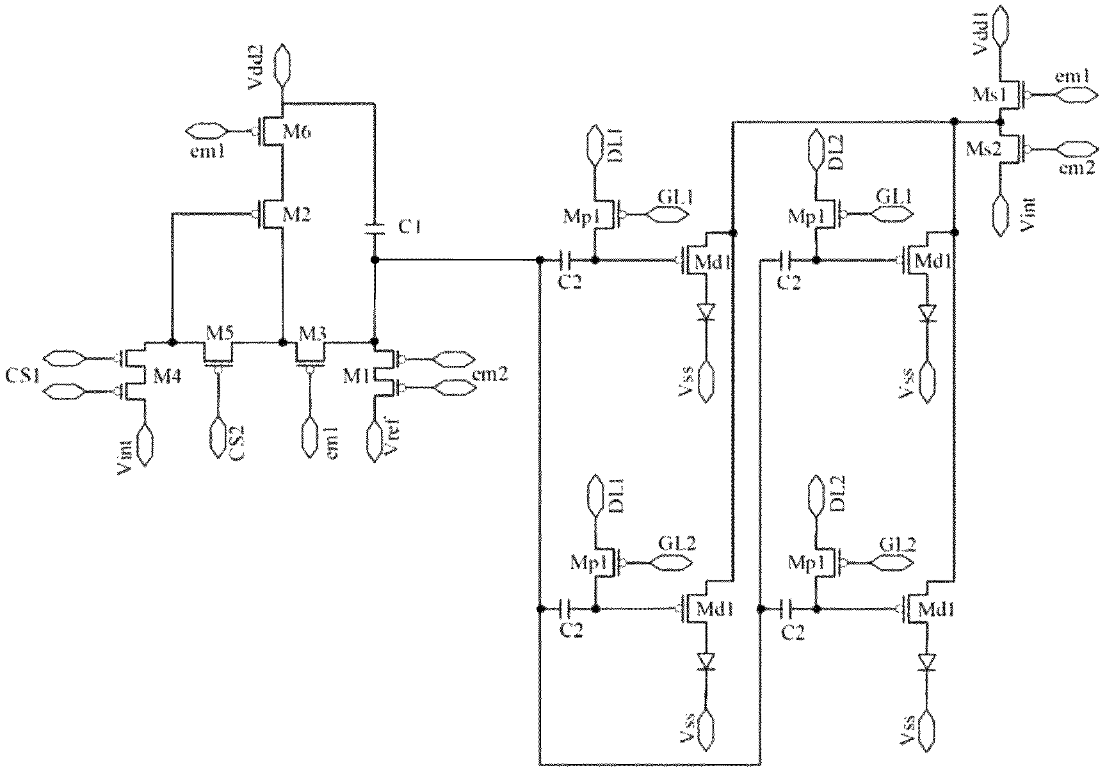
FIG. 28 is circuit diagram of a pixel driving circuit in some embodiments according to the present disclosure.

FIG. 28 is circuit diagram of a pixel driving circuit in some embodiments according to the present disclosure. Referring to FIG. 28, in some embodiments, at least one (e.g., both) of the first transistor M1 and the fourth transistor M4 is a double-gate transistor. The inventors of the present disclosure discover that, by having at least one of the first transistor M1 and the fourth transistor M4 as a double-gate transistor, the leakage current in the first circuit can be further reduced.

Figure 29:
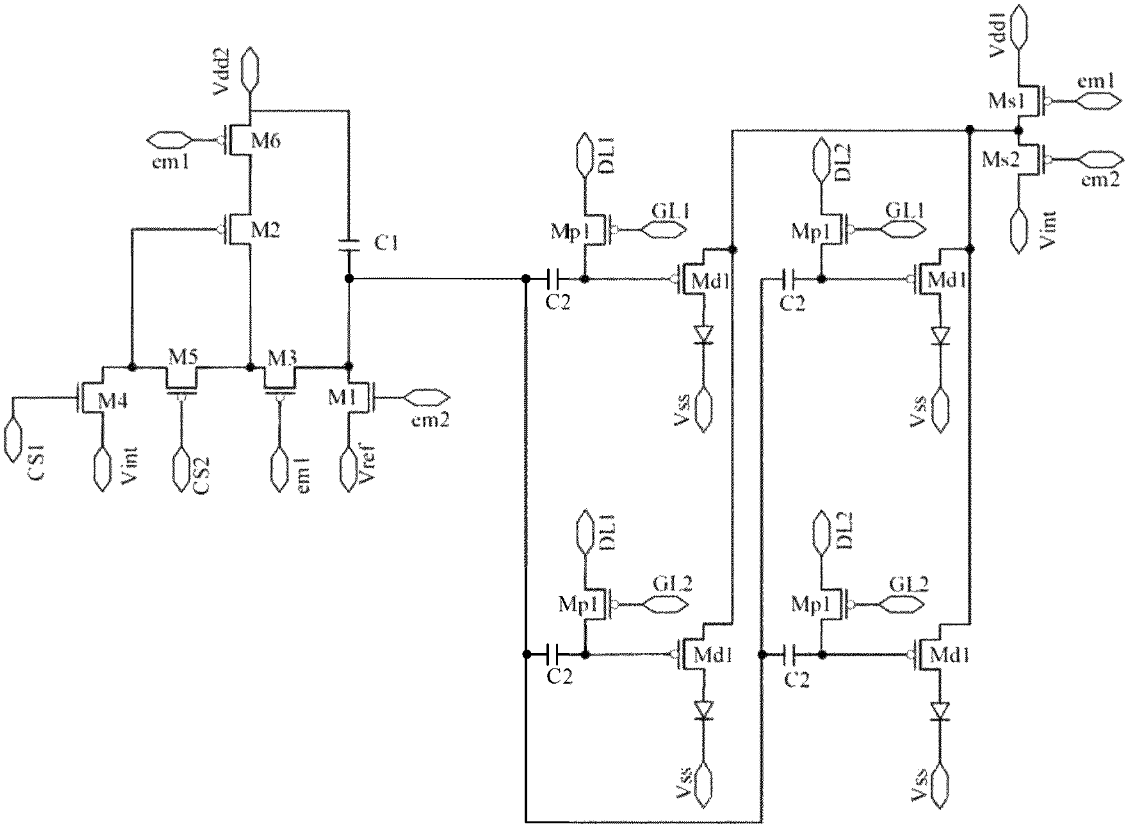
FIG. 29 is circuit diagram of a pixel driving circuit in some embodiments according to the present disclosure.

FIG. 29 is circuit diagram of a pixel driving circuit in some embodiments according to the present disclosure. The pixel driving circuit depicted in FIG. 29 differs from the pixel driving circuit depicted in FIG. 4 in that the first transistor M1 and the fourth transistor M4 in the pixel driving circuit depicted in FIG. 29 are n-type transistors whereas the first transistor M1 and the fourth transistor M4 in the pixel driving circuit depicted in FIG. 4 are p-type transistors. The inventors of the present disclosure discover that, by having at least one of the first transistor M1 and the fourth transistor M4 as an n-type transistor, the leakage current in the first circuit can be further reduced. n-type transistors such as metal oxide transistors have a relatively smaller leakage current. p-type transistors such as low-temperature polysilicon transistors have a relative higher mobility rate and an enhanced driving ability.

Referring to FIG. 3, FIG. 4, FIG. 9 to FIG. 15, FIG. 17, FIG. 20, FIG. 21, FIG. 23, FIG. 25, and FIG. 27 to FIG. 29, in some embodiments, the one or more third circuits are arranged in an array having rows and columns. In some embodiments, third circuits in a same column are coupled to a same data line, third circuits in a same row are coupled to a same gate line. In some embodiments, second capacitors in third circuits in different rows have different capacitances. In some embodiments, capacitances of the second capacitors in third circuits decrease gradually row-by-row (e.g., from the first row to the second row).

In some embodiments, the pixel driving circuit is configured to drive light emission in a plurality of subpixels, includes a first subpixel configured to emit a light of a first color, a second subpixel configured to emit a light of a second color, and a third subpixel configured to emit a light of a third color. In one example, the first color is a red color, the second color is a green color, and the third color is a blue color. In some embodiments, driving transistors in third circuits in a pixel driving circuit configured to driving light emission in the first subpixel, the second subpixel, and the third subpixel have a same ratio of channel length to channel width; and $$\left|\frac{W2*Ld1}{L2*Wd1}-1\right|<0.05\text{, e.g., }\left|\frac{W2*Ld1}{L2*Wd1}-1\right|<0.04,$$
$$\left|\frac{W2*Ld1}{L2*Wd1}-1\right|<0.03,\ \left|\frac{W2*Ld1}{L2*Wd1}-1\right|<0.02\text{, or }\left|\frac{W2*Ld1}{L2*Wd1}-1\right|<0.01;$$

wherein W2 stands for a channel width of the second transistor M2, L2 stands for a channel length of the second transistor M2, Wd1 stands for a channel width of the driving transistor Md1 in the respective third circuit, Ld1 stands for a channel length of the driving transistor Md1 in the respective third circuit.

In some embodiments, the array substrate having the pixel driving circuit is a silicon-based array substrate. The silicon-based semiconductor process can ensure uniformity of transistors (e.g., the driving transistors in the one or more third circuits and the second transistor in the first circuit).

Figure 30:
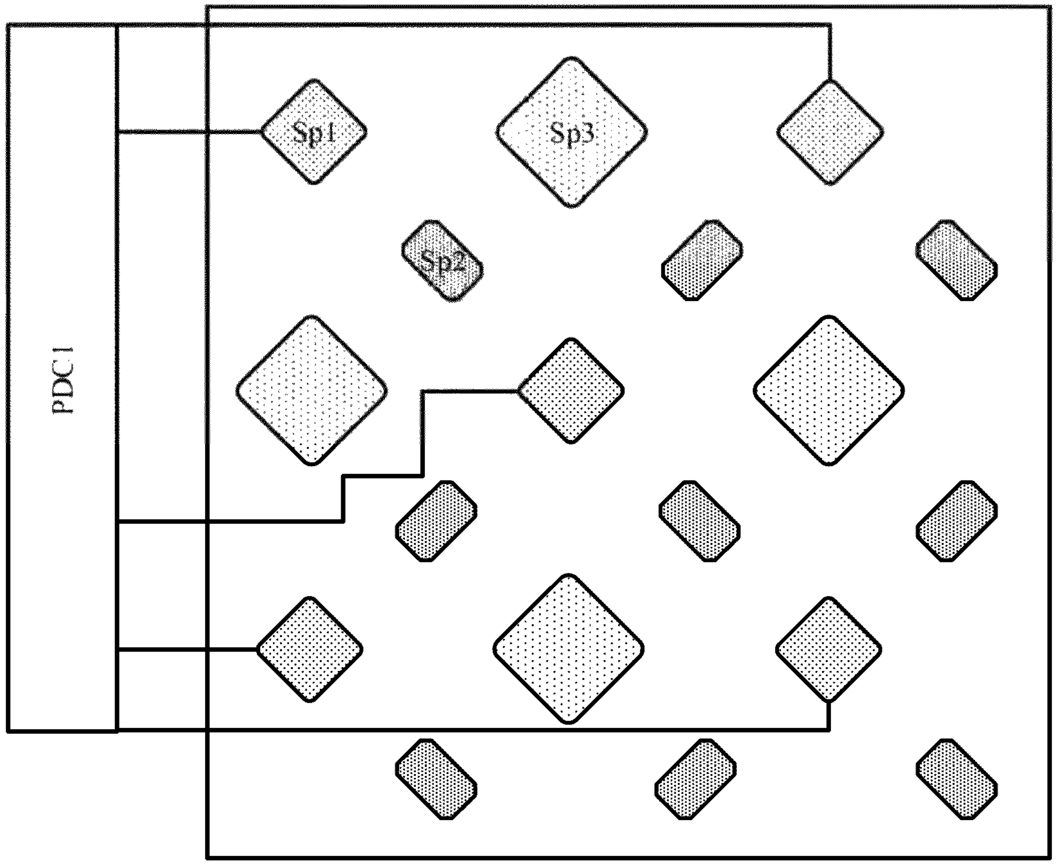
FIG. 30 is schematic diagram illustrating the structure of a display panel in some embodiments according to the present disclosure.

FIG. 30 is schematic diagram illustrating the structure of a display panel in some embodiments according to the present disclosure. Referring to FIG. 30, the display panel in some embodiments includes a plurality of subpixels, includes a first subpixel Sp1 configured to emit a light of a first color, a second subpixel Sp2 configured to emit a light of a second color, and a third subpixel Sp3 configured to emit a light of a third color. In one example, the first color is a red color, the second color is a green color, and the third color is a blue color.

In some embodiments, a same pixel driving circuit is configured to drive light emission in subpixel of a same color. In one example, a first pixel driving circuit is configured to drive light emission in first subpixels of the first color. In another example, a second pixel driving circuit is configured to drive light emission in second subpixels of the second color. In another example, a third pixel driving circuit is configured to drive light emission in third subpixels of the third color. FIG. 30 illustrates a first pixel driving circuit PDC1 configured to drive light emission in first subpixels of the first color (e.g., Sp1).

In some embodiments, driving transistors in third circuits in a first pixel driving circuit configured to driving light emission in first subpixels of the first color (e.g., red subpixels) have a same ratio of channel length to channel width; and $$\left|\frac{W12*Ld11}{L12*Wd11}-1\right|<0.05,\text{ e.g., }\left|\frac{W12*Ld11}{L12*Wd11}-1\right|<0.04,\ \left|\frac{W12*Ld11}{L12*Wd11}-1\right|<0.03,\ \left|\frac{W12*Ld11}{L12*Wd11}-1\right|<0.02,\text{ or }\left|\frac{W12*Ld11}{L12*Wd11}-1\right|<0.01;$$

wherein W12 stands for a channel width of the second transistor M2 in the first pixel driving circuit, L12 stands for a channel length of the second transistor M2 in the first pixel driving circuit, Wd11 stands for a channel width of the driving transistor Md1 in a respective third circuit in the first pixel driving circuit, Ld11 stands for a channel length of the driving transistor Md1 in the respective third circuit in the first pixel driving circuit.

In some embodiments, driving transistors in third circuits in a second pixel driving circuit configured to driving light emission in second subpixels of the second color (e.g., green subpixels) have a same ratio of channel length to channel width; and $$\left|\frac{W22*Ld21}{L22*Wd21}-1\right|<0.05,\text{ e.g., }\left|\frac{W22*Ld21}{L22*Wd21}-1\right|<0.04,\ \left|\frac{W22*Ld21}{L22*Wd21}-1\right|<0.03,\ \left|\frac{W22*Ld21}{L22*Wd21}-1\right|<0.02,\text{ or }\left|\frac{W22*Ld21}{L22*Wd21}-1\right|<0.01;$$

wherein W22 stands for a channel width of the second transistor M2 in the second pixel driving circuit, L22 stands for a channel length of the second transistor M2 in the second pixel driving circuit, Wd21 stands for a channel width of the driving transistor Md1 in a respective third circuit in the second pixel driving circuit, Ld21 stands for a channel length of the driving transistor Md1 in the respective third circuit in the second pixel driving circuit.

In some embodiments, driving transistors in third circuits in a third pixel driving circuit configured to driving light emission in third subpixels of the third color (e.g., blue subpixels) have a same ratio of channel length to channel width; and $$\left|\frac{W32*Ld31}{L32*Wd31}-1\right|<0.05,\text{ e.g., }\left|\frac{W32*Ld31}{L32*Wd31}-1\right|<0.04,\ \left|\frac{W32*Ld31}{L32*Wd31}-1\right|<0.03,\ \left|\frac{W32*Ld31}{L32*Wd31}-1\right|<0.02,\text{ or }\left|\frac{W32*Ld31}{L32*Wd31}-1\right|<0.01;$$

wherein W32 stands for a channel width of the second transistor M2 in the third pixel driving circuit, L32 stands for a channel length of the second transistor M2 in the third pixel driving circuit, Wd31 stands for a channel width of the driving transistor Md1 in a respective third circuit in the third pixel driving circuit. Ld31 stands for a channel length of the driving transistor Md1 in the respective third circuit in the third pixel driving circuit.

Figure 31:
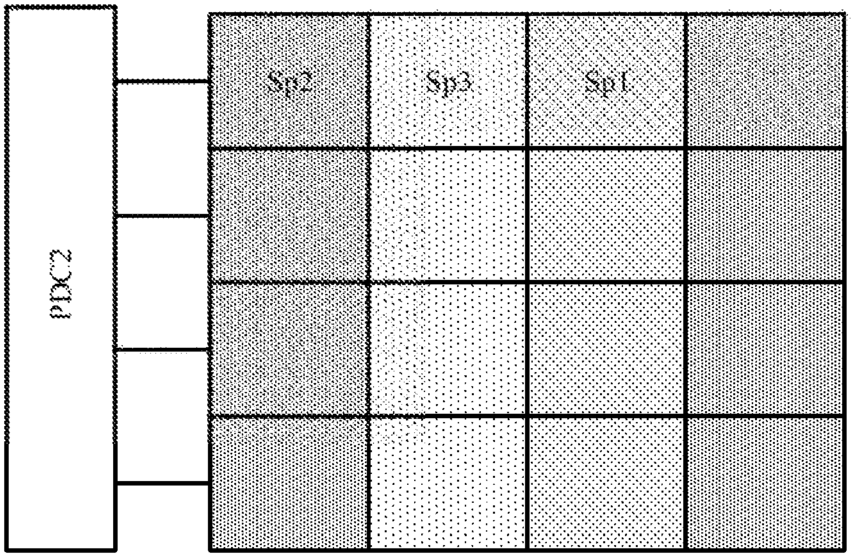
FIG. 31 is schematic diagram illustrating the structure of a display panel in some embodiments according to the present disclosure.
Figure 32:
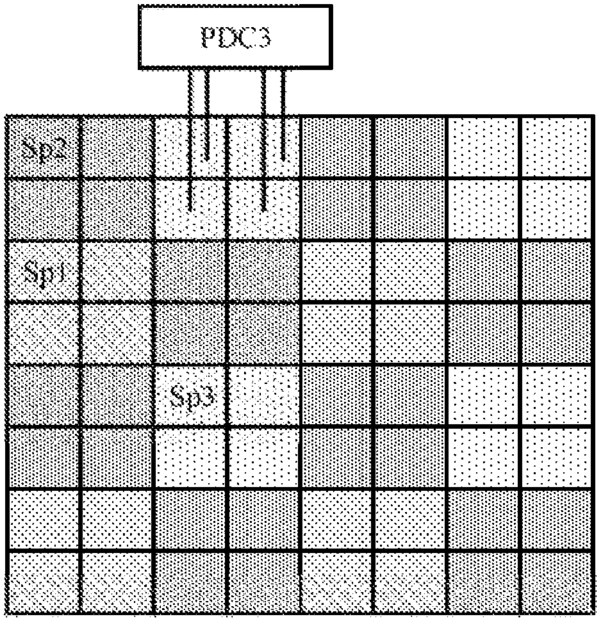
FIG. 32 is schematic diagram illustrating the structure of a display panel in some embodiments according to the present disclosure.

FIG. 31 is schematic diagram illustrating the structure of a display panel in some embodiments according to the present disclosure. FIG. 32 illustrates a display panel having a different pixel arrangement. In some embodiments, a same pixel driving circuit is configured to drive light emission in subpixel of a same color. In one example, a first pixel driving circuit is configured to drive light emission in first subpixels of the first color. In another example, a second pixel driving circuit is configured to drive light emission in second subpixels of the second color. In another example, a third pixel driving circuit is configured to drive light emission in third subpixels of the third color. FIG. 31 illustrates a second pixel driving circuit PDC2 configured to drive light emission in second subpixels of the second color (e.g., Sp2).

FIG. 32 is schematic diagram illustrating the structure of a display panel in some embodiments according to the present disclosure. In some embodiments, a same pixel driving circuit is configured to drive light emission in subpixel of a same color. In one example, a first pixel driving circuit is configured to drive light emission in first subpixels of the first color. In another example, a second pixel driving circuit is configured to drive light emission in second subpixels of the second color. In another example, a third pixel driving circuit is configured to drive light emission in third subpixels of the third color. FIG. 32 illustrates a third pixel driving circuit PDC3 configured to drive light emission in third subpixels of the third color (e.g., Sp3).

In another aspect, the present invention provides a display apparatus, including the pixel driving circuit described herein or fabricated by a method described herein, and a plurality of light emitting elements connected to the pixel driving circuit. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In another aspect, the present disclosure provides a method of driving a display apparatus. In some embodiments, the display apparatus comprises a pixel driving circuit, and a plurality of light emitting elements coupled to the pixel driving circuit. The pixel driving circuit comprises a first circuit, a second circuit, and one or more third circuits. The first circuit is coupled to a first control signal line, a second control signal line, a first light emitting control signal line, and a second light emitting control signal line. The second circuit is coupled to the first light emitting control signal line and the second light emitting control signal line. In some embodiments, the method includes providing a first light emitting control signal through the first light emitting control signal line to the first circuit and to the second circuit; and providing a second light emitting control signal through the second light emitting control signal line to the first circuit and to the second circuit. Optionally, the first light emitting control signal line and the second light emitting control signal line are configured to transmit light emitting control signals having reversed phases.

In some embodiments, the method further includes operating the one or more third circuits in one of a compensation mode or a non-compensation mode; in the compensation mode, driving, by the one or more third circuits, a light emitting element to emit light with a variation in the threshold voltage in the driving transistor in the one or more third circuits being compensated; and in the non-compensation mode, driving, by the one or more third circuits, the light emitting element to emit light without the variation in the threshold voltage in the driving transistor in the one or more third circuits being compensated.

In some embodiments, the method further includes operating the one or more third circuits in one of a compensation mode or a non-compensation mode; in the compensation mode, providing the second control signal line and the second light emitting control signal line with light emitting control signals having reversed phases, respectively; and in the non-compensation mode, providing the second control signal line and the second light emitting control signal line with light emitting control signals having a same phase.

In some embodiments, the first circuit comprises a first transistor having a gate electrode coupled to the second light emitting control signal line, a first electrode coupled to a reference signal line, and a second electrode coupled to a second electrode of the third transistor; a second transistor having a gate electrode coupled to a second electrode of the fourth transistor and a first electrode of the fifth transistor, a first electrode configured to receive a second voltage signal from a second voltage supply line, and a second electrode coupled to a first electrode of the third transistor and a second electrode of the fifth transistor; a third transistor having a gate electrode coupled to the first light emitting control signal line, a first electrode coupled to the second electrode of the second transistor and a second electrode of the fifth transistor, and a second electrode coupled to the second electrode of the first transistor; a fourth transistor having a gate electrode coupled to a first control signal line, a first electrode coupled to a reset signal line, and a second electrode coupled to the gate electrode and the second electrode of the second transistor M2, and a first electrode of the fifth transistor; and a fifth transistor having a gate electrode coupled to the second control signal line, a first electrode coupled to the gate electrode of the second transistor and the second electrode of the fourth transistor, and a second electrode coupled to the first electrode of the third transistor and the second electrode of the second transistor.

In some embodiments, in the compensation mode, the method includes in a first phase, providing a turning-on control signal through the first control signal line to the gate electrode of the fourth transistor, providing a turning-off control signal through the second control signal line to the gate electrode of the fifth transistor, providing a turning-off control signal through the first light emitting control signal line to the gate electrodes of the third transistor, providing a turning-on control signal through the second light emitting control signal line to the gate electrode of the first transistor; in a second phase, providing a turning-off control signal through the first control signal line to the gate electrode of the fourth transistor, providing a turning-on control signal through the second light emitting control signal line to the gate electrode of the first transistor; and in a light emission phase, providing a turning-off control signal through the second light emitting control signal line to the gate electrode of the first transistor, providing a turning-on control signal through the second control signal line to the gate electrode of the fifth transistor, providing a turning-on control signal through the first light emitting control signal line to the gate electrode of the third transistor.

In some embodiments, in the non-compensation mode, the method includes providing a turning-on control signal by the first light emitting control signal line throughout a frame of image; providing a turning-off control signal by the second light emitting control signal line throughout the frame of image; and providing a turning-off control signal by the second control signal line throughout the frame of image.

In some embodiments, the second control signal line is the same as the first light emitting control signal line. Optionally, the method includes providing a first light emitting control signal through the first light emitting control signal line to the gate electrode of the fifth transistor.

In some embodiments, the first control signal line is the same as a first gate line configured to provide gate scanning signal to a row of third circuit. Optionally, the method includes providing a gate scanning signal through the first gate line to the gate electrode of the fourth transistor.

In some embodiments, the second voltage supply line is the same as a first voltage supply line. Optionally, the method includes providing a first voltage supply signal through the first voltage supply line to the second circuit and to the first electrode of the second transistor.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel driving circuit, comprising a first circuit, a second circuit, and one or more third circuits;

wherein the first circuit is configured to compensate for a variation in a threshold voltage in a driving transistor in the one or more third circuits;

wherein the first circuit is coupled to a first control signal line, a second control signal line, a first light emitting control signal line, and a second light emitting control signal line;

the second circuit is coupled to the first light emitting control signal line and the second light emitting control signal line; and the first light emitting control signal line and the second light emitting control signal line are configured to transmit light emitting control signals having reversed phases;

wherein the first circuit comprises a first transistor, a second transistor, a third transistor, a fourth transistor, and a fifth transistor;

wherein the first transistor comprises a gate electrode coupled to the second light emitting control signal line, a first electrode coupled to a reference signal line, and a second electrode coupled to a second electrode of the third transistor;

the second transistor comprises a gate electrode coupled to a second electrode of the fourth transistor and a first electrode of the fifth transistor, a first electrode configured to receive a second voltage signal from a second voltage supply line, and a second electrode coupled to a first electrode of the third transistor and a second electrode of the fifth transistor;

the third transistor comprises a gate electrode coupled to the first light emitting control signal line, a first electrode coupled to the second electrode of the second transistor and a second electrode of the fifth transistor, and a second electrode coupled to the second electrode of the first transistor;

the fourth transistor comprises a gate electrode coupled to a first control signal line, a first electrode coupled to a reset signal line, and a second electrode coupled to the gate electrode and the second electrode of the second transistor, and a first electrode of the fifth transistor; and the fifth transistor comprises a gate electrode coupled to the second control signal line, a first electrode coupled to the gate electrode of the second transistor and the second electrode of the fourth transistor, and a second electrode coupled to the first electrode of the third transistor and the second electrode of the second transistor.

2. The pixel driving circuit of claim 1, wherein the one or more third circuits are capable of being operated in a compensation mode or a non-compensation mode;

in the compensation mode, the one or more third circuits are configured to drive a light emitting element to emit light with the variation in the threshold voltage in the driving transistor in the one or more third circuits being compensated;

in the non-compensation mode, the one or more third circuits are configured to drive the light emitting element to emit light without the variation in the threshold voltage in the driving transistor in the one or more third circuits being compensated.

3. The pixel driving circuit of claim 1, wherein the one or more third circuits are capable of being operated in a compensation mode or a non-compensation mode;

in the compensation mode, the second control signal line and the second light emitting control signal line are configured to transmit light emitting control signals having reversed phases; and in the non-compensation mode, the second control signal line and the second light emitting control signal line are configured to transmit light emitting control signals having a same phase.

4. The pixel driving circuit of claim 1, wherein the first circuit further comprises a sixth transistor having a gate electrode coupled to the first light emitting control signal line, a first electrode coupled to the second voltage supply line, and a second electrode coupled to the first electrode of the second transistor.

5. The pixel driving circuit of claim 4, wherein the first circuit further comprises a seventh transistor having a gate electrode coupled to a reset control signal line, a first electrode coupled to a second reset signal line, and a second electrode coupled to the first electrode of the second transistor and the second electrode of the sixth transistor.

6. The pixel driving circuit of claim 4, wherein the first circuit further comprises a first capacitor having a first capacitor electrode coupled to the second electrode of the sixth transistor and the first electrode of the second transistor, and a second capacitor electrode coupled to the second electrode of the first transistor and the second electrode of the third transistor.

7. The pixel driving circuit of claim 1, wherein the first circuit further comprises an eighth transistor having a gate electrode coupled to a third control signal line, a first electrode coupled to the second electrodes of the first transistor and the third transistor, and a second electrode coupled to a sense line.

8. The pixel driving circuit of claim 1, wherein the first circuit further comprises a ninth transistor and a tenth transistor;

a gate electrode of the ninth transistor is coupled to a third control signal line, a first electrode of the ninth transistor is coupled to the reference signal line, and a second electrode of the ninth transistor is coupled to the first electrode of the first transistor and a first electrode of the tenth transistor;

a gate electrode of the tenth transistor is coupled to a fourth control signal line, a first electrode of the tenth transistor is coupled to the first electrode of the first transistor and the second electrode of the ninth transistor, and a second electrode of the tenth transistor is coupled to a sense line; and the sense line is coupled to an external compensation circuit configured to further compensate the variation in the threshold voltage in a driving transistor in the one or more third circuits.

9. The pixel driving circuit of claim 1, wherein the first circuit further comprises a first capacitor having a first capacitor electrode coupled to the second voltage supply line, and a second capacitor electrode coupled to the second electrode of the first transistor and the second electrode of the third transistor.

10. The pixel driving circuit of claim 1, wherein the second control signal line is the same as the first light emitting control signal line; and the gate electrode of the fifth transistor is configured to receive a first light emitting control signal from the first light emitting control signal line.

11. The pixel driving circuit of claim 1, wherein the first control signal line is the same as a first gate line configured to provide gate scanning signal to a row of third circuit; and the gate electrode of the fourth transistor is configured to receive a gate scanning signal from the first gate line.

12. The pixel driving circuit of claim 1, wherein the second voltage supply line is the same as a first voltage supply line; and the first voltage supply line is configured to provide a first voltage supply signal to the second circuit and to the first electrode of the second transistor.

13. The pixel driving circuit of claim 1, wherein the second circuit comprises a first light emitting control transistor and a second light emitting control transistor;

wherein the first light emitting control transistor comprises a gate electrode coupled to the first light emitting control signal line, a first electrode coupled to a first voltage supply line, and a second electrode coupled to a second electrode of the second light emitting control transistor; and the second light emitting control transistor comprises a gate electrode coupled to the second light emitting control signal line, a first electrode coupled to a reset signal line, and a second electrode coupled to the second electrode of the first light emitting control transistor.

14. The pixel driving circuit of claim 1, wherein a respective third circuit of the one or more third circuits comprises a driving transistor, a data write transistor, and a second capacitor;

wherein the driving transistor comprises a gate electrode coupled to a second capacitor electrode of the second capacitor and a second electrode of the data write transistor, a first electrode coupled to a second electrode of a first light emitting control transistor and a second electrode of a second light emitting control transistor in the second circuit, and a second electrode coupled to an anode of a light emitting element;

the data write transistor comprises a gate electrode coupled to a respective gate line of a plurality of gate lines, a first electrode coupled to a respective data line of a plurality of data lines, and a second electrode coupled to the gate electrode of the driving transistor and the second capacitor electrode of the second capacitor; and the second capacitor comprises a first capacitor electrode coupled to a second electrode of a first transistor and a second electrode of a third transistor in the first circuit.

15. The pixel driving circuit of claim 1, wherein the one or more third circuits are arranged in an array having rows and columns;

third circuits in a same column are coupled to a same data line;

third circuits in a same row are coupled to a same gate line;

second capacitors in third circuits in different rows have different capacitances; and capacitances of the second capacitors in third circuits decrease gradually row-by-row.

16. The pixel driving circuit of claim 1, wherein the pixel driving circuit is configured to drive light emission in a plurality of subpixels, including a first subpixel configured to emit a light of a first color, a second subpixel configured to emit a light of a second color, and a third subpixel configured to emit a light of a third color;

driving transistors in third circuits in the pixel driving circuit configured to driving light emission in the first subpixel, the second subpixel, and the third subpixel have a same ratio of channel length to channel width; and $$\left|\frac{W2*Ld1}{L2*Wd1}-1\right|<0.05;$$

wherein W2 stands for a channel width of the second transistor, L2 stands for a channel length of the second transistor, Wd1 stands for a channel width of the driving transistor in the respective third circuit, Ld1 stands for a channel length of the driving transistor in the respective third circuit.

17. The pixel driving circuit of claim 1, wherein pixel driving circuit is configured to drive light emission in first subpixels of the same color;

driving transistors in third circuits in the pixel driving circuit configured to driving light emission in the first subpixels of a same color have a same ratio of channel length to channel width; and $$\left|\frac{W12*Ld11}{L12*Wd11}-1\right|<0.05;$$

wherein W12 stands for a channel width of the second transistor in the pixel driving circuit, L12 stands for a channel length of the second transistor in the pixel driving circuit, Wd11 stands for a channel width of the driving transistor in a respective third circuit in the pixel driving circuit, Ld11 stands for a channel length of the driving transistor in the respective third circuit in the pixel driving circuit.

18. A display apparatus, comprising the pixel driving circuit of claim 1, and a plurality of light emitting elements coupled to the pixel driving circuit.

19. A method of driving a display apparatus, wherein the display apparatus comprises a pixel driving circuit, and a plurality of light emitting elements coupled to the pixel driving circuit;

wherein the pixel driving circuit comprises a first circuit, a second circuit, and one or more third circuits;

wherein the first circuit is coupled to a first control signal line, a second control signal line, a first light emitting control signal line, and a second light emitting control signal line; and the second circuit is coupled to the first light emitting control signal line and the second light emitting control signal line; and wherein the method comprises:

providing a first light emitting control signal through the first light emitting control signal line to the first circuit and to the second circuit; and providing a second light emitting control signal through the second light emitting control signal line to the first circuit and to the second circuit;

wherein the first light emitting control signal line and the second light emitting control signal line are configured to transmit light emitting control signals having reversed phases;

wherein the first circuit comprises a first transistor, a second transistor, a third transistor, a fourth transistor, and a fifth transistor;

wherein the first transistor comprises a gate electrode coupled to the second light emitting control signal line, a first electrode coupled to a reference signal line, and a second electrode coupled to a second electrode of the third transistor;

the second transistor comprises a gate electrode coupled to a second electrode of the fourth transistor and a first electrode of the fifth transistor, a first electrode configured to receive a second voltage signal from a second voltage supply line, and a second electrode coupled to a first electrode of the third transistor and a second electrode of the fifth transistor;

the third transistor comprises a gate electrode coupled to the first light emitting control signal line, a first electrode coupled to the second electrode of the second transistor and a second electrode of the fifth transistor, and a second electrode coupled to the second electrode of the first transistor;

the fourth transistor comprises a gate electrode coupled to a first control signal line, a first electrode coupled to a reset signal line, and a second electrode coupled to the gate electrode and the second electrode of the second transistor, and a first electrode of the fifth transistor; and the fifth transistor comprises a gate electrode coupled to the second control signal line, a first electrode coupled to the gate electrode of the second transistor and the second electrode of the fourth transistor, and a second electrode coupled to the first electrode of the third transistor and the second electrode of the second transistor;

wherein, in the compensation mode, the method comprises:

in a first phase, providing a turning-on control signal through the first control signal line to the gate electrode of the fourth transistor, providing a turning-off control signal through the second control signal line to the gate electrode of the fifth transistor, providing a turning-off control signal through the first light emitting control signal line to the gate electrodes of the third transistor, providing a turning-on control signal through the second light emitting control signal line to the gate electrode of the first transistor;

in a second phase, providing a turning-off control signal through the first control signal line to the gate electrode of the fourth transistor, providing a turning-on control signal through the second light emitting control signal line to the gate electrode of the first transistor; and in a light emission phase, providing a turning-off control signal through the second light emitting control signal line to the gate electrode of the first transistor, providing a turning-on control signal through the second control signal line to the gate electrode of the fifth transistor, providing a turning-on control signal through the first light emitting control signal line to the gate electrode of the third transistor.

20. The method of claim 19, further comprising:

operating the one or more third circuits in one of a compensation mode or a non-compensation mode;

in the compensation mode, driving, by the one or more third circuits, a light emitting element to emit light with a variation in a threshold voltage in a driving transistor in the one or more third circuits being compensated; and in the non-compensation mode, driving, by the one or more third circuits, the light emitting element to emit light without the variation in the threshold voltage in the driving transistor in the one or more third circuits being compensated.

* * * * *